United States Patent
Tokuchi

(10) Patent No.: US 10,992,756 B2
(45) Date of Patent: Apr. 27, 2021

(54) INFORMATION PROCESSING APPARATUS AND NON-TRANSITORY COMPUTER READABLE MEDIUM GENERATING A NOTIFICATION INCLUDING A WARNING

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/109,075

(22) Filed: Aug. 22, 2018

(65) Prior Publication Data

US 2019/0260832 A1 Aug. 22, 2019

(30) Foreign Application Priority Data

Feb. 16, 2018 (JP) .............................. JP2018-026019

(51) Int. Cl.
H04L 29/08 (2006.01)
H04L 12/24 (2006.01)

(52) U.S. Cl.
CPC .......... *H04L 67/125* (2013.01); *H04L 41/046* (2013.01); *H04L 41/22* (2013.01)

(58) Field of Classification Search
CPC ...... H04L 67/125; H04L 41/046; H04L 41/22
See application file for complete search history.

(56) References Cited

U.S. PATENT DOCUMENTS

| | | | |
|---|---|---|---|
| 2010/0179708 A1* | 7/2010 | Watson ................. | G06Q 50/06 700/296 |
| 2012/0150359 A1* | 6/2012 | Westergaard ............ | H02J 3/14 700/291 |
| 2012/0153725 A1* | 6/2012 | Grohman ................. | H02J 3/14 307/39 |
| 2014/0244836 A1* | 8/2014 | Goel ...................... | H04W 4/08 709/224 |
| 2014/0316599 A1* | 10/2014 | Tomita ............... | H04L 12/2823 700/295 |
| 2015/0005973 A1* | 1/2015 | Kinugasa ................. | H02J 3/14 700/295 |
| 2015/0120077 A1* | 4/2015 | Kumazawa ........ | G05B 13/0205 700/297 |
| 2015/0370228 A1* | 12/2015 | Kohn .................... | G06Q 50/06 700/31 |
| 2016/0061869 A1* | 3/2016 | Dittmer .............. | G01R 21/1338 702/61 |

FOREIGN PATENT DOCUMENTS

JP 2010-166690 A 7/2010

* cited by examiner

*Primary Examiner* — Sargon N Nano
*Assistant Examiner* — Sanjoy Roy
(74) *Attorney, Agent, or Firm* — Oliff PLC

(57) ABSTRACT

An information processing apparatus includes a reception unit and a notification unit. The reception unit receives a function of an apparatus. The notification unit transmits a notification indicating a warning in a case where when the function is executed, it is presumed that electric power exceeds a threshold and at least one of the function received by the reception unit and a function does not operate normally.

14 Claims, 23 Drawing Sheets

| APPARATUS ID | USER ID | NAME (WHOLE, PART) | ADDRESS | FUNCTION |
|---|---|---|---|---|
| APPARATUS 1 | USER A | DOOR OPENING/CLOSING SENSOR A | XXX.XXX.XXX | DOOR OPENING/CLOSING DETECTION FUNCTION, ... |
| APPARATUS 2 | USER B | DOOR OPENING/CLOSING SENSOR A | XXX.XXX.XXX | DOOR OPENING/CLOSING DETECTION FUNCTION, ... |
| APPARATUS 3 | USER B | LIGHTING APPARATUS B | YYY.YYY.YYY | LIGHTING FUNCTION, ... |
| APPARATUS 4 | USER B | SCANNER C | ZZZ.ZZZ.ZZZ | IMAGE READING FUNCTION, ... |
| APPARATUS 5 | USER C | SCANNER C | ZZZ.ZZZ.ZZZ | IMAGE READING FUNCTION, ... |
| ... | ... | ... | ... | ... |

FIG. 5

| APPARATUS ID | USER ID | NAME (WHOLE, PART) | ADDRESS | FUNCTION |
|---|---|---|---|---|
| APPARATUS 1 | USER A | DOOR OPENING/CLOSING SENSOR A | XXX.XXX.XXX | DOOR OPENING/CLOSING DETECTION FUNCTION, ... |
| APPARATUS 2 | USER B | DOOR OPENING/CLOSING SENSOR A | XXX.XXX.XXX | DOOR OPENING/CLOSING DETECTION FUNCTION, ... |
| APPARATUS 3 | USER B | LIGHTING APPARATUS B | YYY.YYY.YYY | LIGHTING FUNCTION, ... |
| APPARATUS 4 | USER B | SCANNER C | ZZZ.ZZZ.ZZZ | IMAGE READING FUNCTION, ... |
| APPARATUS 5 | USER C | SCANNER C | ZZZ.ZZZ.ZZZ | IMAGE READING FUNCTION, ... |
| ... | ... | ... | ... | ... |

FIG. 6

| FUNCTION ID | USER ID | APPARATUS (WHOLE, PART) | SOFTWARE | TARGET | CONTENTS |
|---|---|---|---|---|---|
| FUNCTION 1 | USER A | ·DOOR OPENING/CLOSING SENSOR A<br>·LIGHTING APPARATUS B | | | TURN ON LIGHTING APPARATUS WHEN OPENING OF DOOR IS DETECTED. |
| FUNCTION 2 | USER B | ·SCANNER C | ·OCR SOFTWARE D<br>·FORM PREPARATION SOFTWARE E | ·RECEIPT<br>·ACCOUNTING FILE F | ADD CONTENTS OF RECEIPT TO ACCOUNTING FILE WHEN RECEIPT IS SCANNED. |
| ... | ... | ... | ... | ... | ... |

| USER ID | ADDRESS |
|---------|---------|
| USER A  | AAA.AAA.BBB |
| USER B  | BBB.BBB.BBB |
| USER C  | CCC.CCC.CCC |
| ...     | ... |

CONNECTION SETTING SCREEN

ACCOUNT: USER A
CONNECTION TARGET APPARATUS: APPARATUS X

DO YOU WISH TO CONNECT APPARATUS X TO RELAY APPARATUS?

YES/NO

FIG. 17

| APPARATUS (WHOLE, PART) | SOFTWARE | TARGET | CONTENTS |
|---|---|---|---|
| ·DOOR OPENING/CLOSING SENSOR<br>·LIGHTING APPARATUS | | | TURN ON LIGHTING APPARATUS WHEN OPENING OF DOOR IS DETECTED. |
| ·PC<br>·MULTIFUNCTION APPARATUS | | | ·SCAN TRANSFER FUNCTION<br>·PRINT FUNCTION |
| ·MULTIFUNCTION APPARATUS<br>·PROJECTOR | | | ·PROJECTION FUNCTION<br>·PRINT FUNCTION |
| ·SCANNER | ·OCR SOFTWARE<br>·FORM PREPARATION SOFTWARE | ·RECEIPT<br>·ACCOUNTING FILE | ADD CONTENTS OF RECEIPT TO ACCOUNTING FILE WHEN RECEIPT IS SCANNED. |
| ... | ... | ... | ... |

FIG. 18

| APPARATUS ID | USER ID | NAME (WHOLE, PART) | ADDRESS | FUNCTION |
|---|---|---|---|---|
| APPARATUS 1 | USER A | CAMERA G | XXX.XXX.XXX | PROJECTION FUNCTION |
| APPARATUS 2 | USER A | CAMERA H | YYY.YYY.YYY | PROJECTION FUNCTION |
| APPARATUS 3 | USER A | ROBOT J | YYY.YYY.YYY | ... |
| ... | ... | ... | ... | ... |

FIG. 19

| FUNCTION ID | USER ID | APPARATUS (WHOLE, PART) | CONTENTS | SPARE FUNCTION |
|---|---|---|---|---|
| FUNCTION 1 | USER A | ·CAMERA G (CAMERA H) ·ROBOT J | CAUSE ROBOT TO TRAVEL TO PLACE WHERE SUSPICIOUS PERSON IS DETECTED. | USE DETECTION RESULT BY CAMERA H WHEN CAMERA G DOES NOT OPERATE NORMALLY. |
| ... | ... | ... | ... | ... |

FIG. 23

| APPARATUS ID | USER ID | NAME (WHOLE, PART) | ADDRESS | FUNCTION | INSTALLED PLACE | OPERATION RANGE | PERFORMANCE | OPERATION STATE | USAGE CHARGE |
|---|---|---|---|---|---|---|---|---|---|
| APPARATUS 1 | USER A | CAMERA G | XXX.XXX.XXX | PROJECTION FUNCTION | ... | ... | ... | ... | ... |
| APPARATUS 2 | USER A | CAMERA H | YYY.YYY.YYY | PROJECTION FUNCTION | ... | ... | ... | ... | ... |
| APPARATUS 3 | USER A | ROBOT J | YYY.YYY.YYY | ... | ... | ... | ... | ... | ... |
| ... | ... | ... | ... | | | | | | |

INFORMATION PROCESSING APPARATUS AND NON-TRANSITORY COMPUTER READABLE MEDIUM GENERATING A NOTIFICATION INCLUDING A WARNING

CROSS-REFERENCE TO RELATED APPLICATIONS

This application is based on and claims priority under 35 USC 119 from Japanese Patent Application No. 2018-026019 filed Feb. 16, 2018.

BACKGROUND

Technical Field

The present invention relates to an information processing apparatus and a non-transitory computer readable medium.

SUMMARY

According to an aspect of the invention, there is provided an information processing apparatus including a reception unit and a notification unit. The reception unit receives a function of an apparatus. The notification unit transmits a notification indicating a warning in a case where when the function is executed, it is presumed that electric power exceeds a threshold and at least one of the function and a previously received function that has been already received by the reception unit before does not operate normally.

BRIEF DESCRIPTION OF THE DRAWINGS

Exemplary embodiments of the present invention will be described in detail based on the following figures, wherein:

FIG. 5 is a diagram illustrating an apparatus management table;

FIG. 6 is a diagram illustrating a function management table;

FIG. 17 is a diagram illustrating an executable function management table;

FIG. 18 is a diagram illustrating an apparatus management table;

FIG. 19 is a diagram illustrating a function management table;

FIG. 23 is a diagram illustrating an apparatus management table according to the second modification;

DETAILED DESCRIPTION

First Exemplary Embodiment

Figure 1:
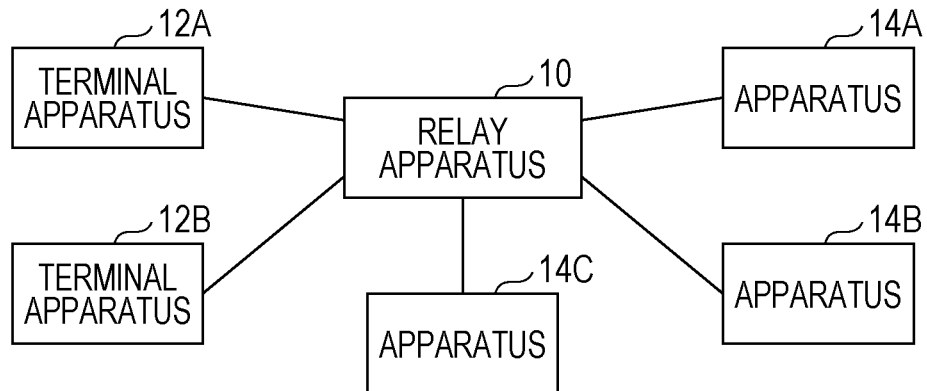
FIG. 1 is a block diagram illustrating a configuration of an information processing system according to a first exemplary embodiment of the present invention.

An information processing system according to a first exemplary embodiment of the present invention will be explained with reference to FIG. 1. FIG. 1 illustrates an example of an information processing system according to the first exemplary embodiment.

The information processing system according to the first exemplary embodiment includes, for example, one or more terminal apparatuses, one or more apparatuses, and one or more relay apparatuses. In the example illustrated in FIG. 1, the information processing system includes a relay apparatus 10, terminal apparatuses 12A and 12B, and apparatuses 14A, 14B, and 14C. The numbers of the relay apparatuses, the terminal apparatuses, and the apparatuses are merely examples. The information processing system may include different numbers of relay apparatuses, terminal apparatuses, and apparatuses. Hereinafter, in the case where the terminal apparatuses 12A and 12B do not need to be distinguished from each other, they will be referred to as "terminal apparatuses 12". In a similar manner, in the case where the apparatuses 14A, 14B, and 14C do not need to be distinguished from one another, they will be referred to as "apparatuses 14".

The relay apparatus 10, each of the terminal apparatuses 12, and each of the apparatuses 14 include a function of communicating with other apparatuses. Communication may be performed in a wireless or wired manner. For example, the relay apparatus 10 may function as a hub that allows connection between plural apparatuses. By connecting each of the terminal apparatuses 12 and each of the apparatuses 14 to the relay apparatus 10, the terminal apparatuses 12 and the apparatuses 14 may communicate with one another via the relay apparatus 10. Obviously, each of the terminal apparatuses 12 and each of the apparatuses 14 may directly, not via the relay apparatus 10, communicate with other apparatuses or may communicate with other apparatuses via a communication path such as the Internet or other networks. An apparatus such as a server may be included in the information processing system.

The relay apparatus 10 is an apparatus that controls an operation of each of the apparatuses 14. The relay apparatus 10 may control an operation of each of the terminal apparatuses 12 and different relay apparatuses 10. The relay apparatus 10 includes a function of communicating with other apparatuses. The relay apparatus 10 may acquire various types of information by using, for example, the Internet. The relay apparatus 10 may function as a server or perform, for example, management of data and user information. The relay apparatus 10 may be a so-called smart speaker (an apparatus including a wireless communication function and a speaker function) or may be an apparatus including a communication function but not including a speaker function. The relay apparatus 10 may be installed indoors (for example, the floor or ceiling of a room, a table inside the room, or the like) or outdoors. Furthermore, the relay apparatus 10 may be a movable apparatus (for example, a self-propelled apparatus). The terminal apparatuses 12 or the apparatuses 14 may function as the relay apparatus 10.

In the first exemplary embodiment, the relay apparatus 10 manages the number of other apparatuses (for example, the terminal apparatuses 12, the apparatuses 14, and different relay apparatuses 10) that are connected to the relay apparatus 10. In the case where a different apparatus is connected to the relay apparatus 10, the relay apparatus 10 notifies a terminal apparatus 12 that is linked with a user who uses the relay apparatus 10 of connection information of the relay apparatus 10. The connection information of the relay apparatus 10 includes, for example, information regarding the number of different apparatuses (for example, the terminal apparatuses 12, the apparatuses 14, and different relay apparatuses 10) that are connected to the relay apparatus 10, information regarding the upper limit number of different apparatuses that are able to be connected to the relay apparatus 10, information regarding the number of further different apparatuses that are connected to the different apparatuses that are connected to the relay apparatus 10, information regarding the upper limit number of further different apparatuses that are able to be connected to the different apparatuses that are connected to the relay apparatus 10, and the like. Furthermore, the connection information of the relay apparatus 10 may also include information regarding the number of different apparatuses (the number of different apparatuses connected and the upper limit number of different apparatuses that are able to be connected) for each type.

The terminal apparatuses 12 are apparatuses such as personal computers (PCs), tablet PCs, smartphones, cellular phones, or the like and include a function of communicating with other apparatuses. The terminal apparatuses 12 may be wearable terminals (wrist watch type terminals, wrist band type terminals, eyeglass type terminals, ring type terminals, contact lens type terminals, body embedded type terminals, hearable terminals, or the like). Furthermore, the terminal apparatuses 12 may include a flexible display as a display device. As a flexible display, for example, an organic electroluminescence display (flexible organic EL display), an electronic paper type display, a flexible liquid crystal display, or the like is used. Flexible displays adopting other display methods may be used. A flexible display is a display having a flexibly deformable display part. For example, a flexible display may be bent, folded, wound, twisted, stretched, or the like. The entire terminal apparatuses 12 may be flexible displays. Alternatively, a flexible display and other configuration features may be functionally or physically separated.

The apparatuses 14 are apparatuses that include functions. The apparatuses 14 are, for example, image forming apparatuses including image forming functions (a scan function, a print function, a copy function, a facsimile function, and the like), PCs, tablet PCs, smartphones, cellular phones, robots (humanoid robots, animal-type robots other than humanoid robots, and other types of robots), projectors, display devices such as liquid crystal displays, recording devices, playback devices, imaging devices such as cameras, refrigerators, rice cookers, microwave ovens, coffee makers, vacuum cleaners, washing machines, air-conditioners, lighting apparatuses, clocks, monitoring cameras, automobiles, two-wheeled vehicles, aircrafts (for example, unmanned aircrafts (so-called drones)), game machines, various sensing apparatuses (for example, temperatures sensors, humidity sensors, voltage sensors, current sensors, and the like), or the like. The apparatuses 14 may be apparatuses (for example, image forming apparatuses, PCs, or the like) that provide output to users or apparatuses (for example, sensing apparatuses) that do not provide output to users. Furthermore, all of plural apparatuses that execute a cooperative function, which will be described later, may be apparatuses that provide output to users, some of them may be apparatuses that provide output to users and the other apparatuses may be apparatus that do not provide output to users, or all of them may be apparatuses that do not provide output to users. All types of apparatuses may be included in the concept of the apparatuses 14. For example, information apparatuses, video apparatuses, audio apparatuses, and other types of apparatuses may be included in the concept of the apparatuses 14. Furthermore, the apparatuses 14 include a function of communicating with other apparatuses.

Furthermore, the apparatuses 14 may manage the number of different apparatuses (for example, the terminal apparatuses 12, different apparatuses 14, and the relay apparatuses 10) that are connected to the apparatuses 14. In the case where a different apparatus is connected to an apparatus 14, the apparatus 14 may notify a terminal apparatus 12 that is linked with a user who uses the apparatus 14 of connection information of the apparatus 14. The connection information of the apparatus 14 includes, for example, information regarding the number of different apparatuses (for example, the terminal apparatuses 12, different apparatuses 14, and the relay apparatuses 10) that are connected to the apparatus 14, information regarding the upper limit number of different apparatuses that are able to be connected to the apparatus 14, information regarding the number of further different apparatuses that are connected to the different apparatuses that are connected to the apparatus 14, information regarding the upper limit number of further different apparatuses that are able to be connected to the different apparatuses that are connected to the apparatus 14, and the like. Furthermore, the connection information of the apparatus 14 may also include information regarding the number of different apparatuses (the number of different apparatuses connected and the upper limit number of different apparatuses that are able to be connected) for each type.

The terminal apparatuses 12 may manage the number of different apparatuses (for example, different terminal apparatuses 12, the apparatuses 14, and the relay apparatuses 10) that are connected to the terminal apparatuses 12. In the case where a different apparatus is connected to the terminal apparatus 12, the terminal apparatus 12 may transmit connection information of the terminal apparatus 12. The connection information of the terminal apparatus 12 includes, for example, information regarding the number of different apparatuses (for example, different terminal apparatuses 12, the apparatuses 14, and the relay apparatuses 10) that are connected to the terminal apparatus 12, information regarding the upper limit number of different apparatuses that are able to be connected to the terminal apparatus 12, information regarding the number of further different apparatuses that are connected to the different apparatuses that are connected to the terminal apparatus 12, information regarding the upper limit number of further different apparatuses that are able to be connected to the different apparatuses that are connected to the terminal apparatus 12, and the like. Furthermore, the connection information of the terminal apparatus 12 may also include information regarding the number of different apparatuses (the number of different apparatuses connected and the upper limit number of different apparatuses that are able to be connected) for each type.

Figure 2:
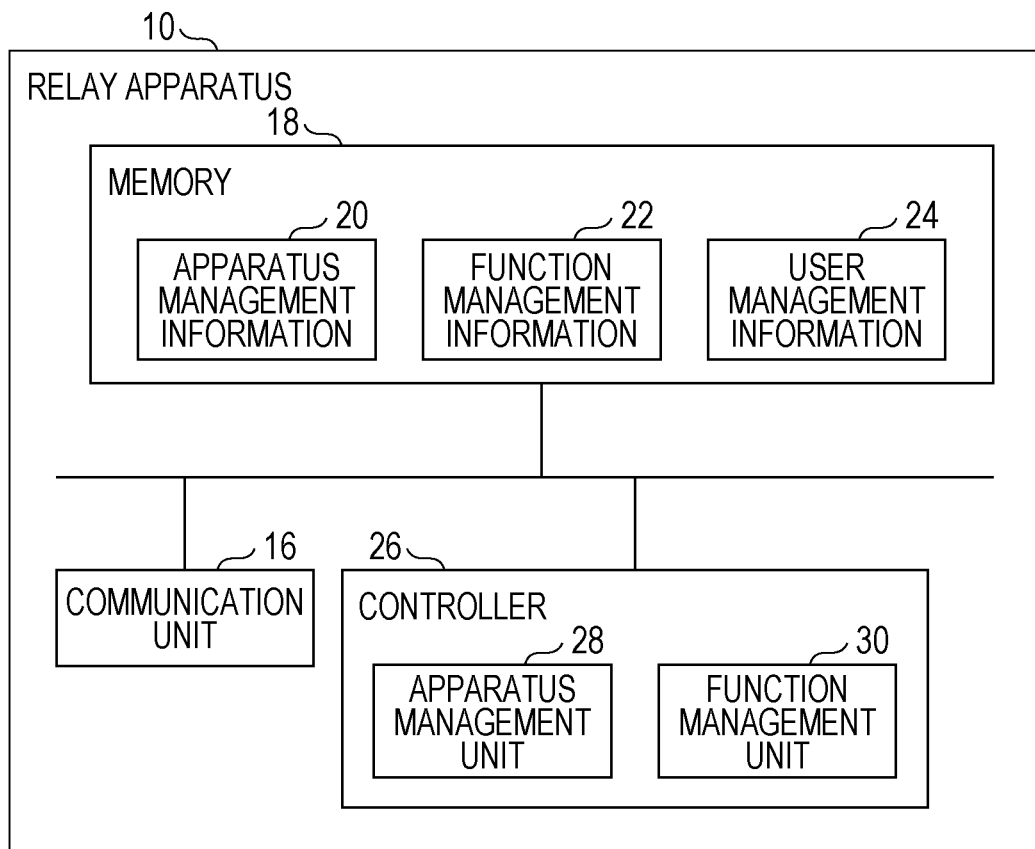
FIG. 2 is a block diagram illustrating a configuration of a relay apparatus according to the first exemplary embodiment.

A configuration of the relay apparatus 10 will be explained in detail below with reference to FIG. 2. FIG. 2 illustrates a configuration of the relay apparatus 10.

A communication unit 16 is a communication interface and includes a function of transmitting data to other apparatuses and a function of receiving data from other apparatuses. The communication unit 16 may be a communication interface that includes a wireless communication function or a communication interface that includes a wired communication function. The communication unit 16 may support, for example, one or more types of communication systems and may communicate with a communication partner in accordance with a communication system suitable for the communication partner (that is, a communication system supported by the communication partner). A communication system is, for example, infrared communication, visible light communication, Wi-Fi® communication, short-range wireless communication (for example, near field communication (NFC) or the like), or the like. Felica®, Bluetooth®, radio frequency identifier (RFID), or the like is used as short-range wireless communication. Obviously, wireless communication of other types may be used as short-range wireless communication. The communication unit 16 may switch a communication system and a frequency band according to a communication partner. The communication unit 16 may also switch a communication system and a frequency band according to surrounding environment.

A memory 18 is a memory device such as a hard disk and a memory (for example, a solid-state drive (SSD)). In the memory 18, for example, apparatus management information 20, function management information 22, user management information 24, various data, various programs (for example, an operating system (OS) and various application programs (application software)), and the like are stored. In addition, address information of a server and the like may also be stored in the memory 18. Data, information, programs, and the like may be stored in different memory devices or may be stored in a single memory device.

The apparatus management information 20, the function management information 22, and the user management information 24 will be explained below.

The apparatus management information 20 is information for managing the apparatuses 14 connected to the relay apparatus 10. In the apparatus management information 20, for example, information (apparatus identification information) for identifying an apparatus 14 connected to the relay apparatus 10 and information (user identification information) for identifying a user who has connected the apparatus 14 to the relay apparatus 10 are associated with each other. Other types of information may be included in the apparatus management information 20. Furthermore, in the case where the terminal apparatus 12 is connected to the relay apparatus 10, the terminal apparatus 12 may be managed by the apparatus management information 20. In this case, information (terminal identification information) for identifying the terminal apparatus 12 and user identification information for identifying a user who has connected the terminal apparatus 12 to the relay apparatus 10 are registered in association with each other in the apparatus management information 20.

An apparatus 14 and a terminal apparatus 12 that are connected to the relay apparatus 10 are apparatuses that may communicate with (transmit and receive information to and from) the relay apparatus 10 and do not necessarily always communicate with the relay apparatus 10. For example, the apparatus 14 and the terminal apparatus 12 that are connected to the relay apparatus 10 may always communicate with the relay apparatus 10, may intermittently communicate with the relay apparatus 10, or may communicate with the relay apparatus 10 when a predetermined trigger occurs and not communicate with the relay apparatus 10 when the predetermined trigger does not occur. For example, in the case where a monitoring and notification function is set for a robot apparatus as an apparatus 14, when the robot apparatus detects a suspicious person, communication is performed between the robot apparatus and the relay apparatus 10, and a notification such as a warning is transmitted to a terminal apparatus 12 that is linked with a user. A notification may be transmitted from the robot apparatus to the terminal apparatus 12 without going through the relay apparatus 10. Communication may be established only when a notification is transmitted and disconnected during other periods.

Apparatus identification information is, for example, the name of an apparatus 14, the ID of the apparatus 14, information indicating the type of the apparatus 14, the model number of the apparatus 14, information for managing the apparatus 14 (for example, asset management information or the like), information indicating the position at which the apparatus 14 is installed (positional information of the apparatus 14), an image linked with the apparatus 14 (apparatus image), information indicating the address of the apparatus 14 (apparatus address information), and the like. An apparatus image is, for example, an appearance image representing the apparatus 14. An appearance image may be an image representing an external appearance of the apparatus 14 (for example, the housing of the apparatus 14), an image representing an internal appearance of the apparatus 14 that may be seen from the outside when the housing is opened (for example, an internal structure), or an image representing a state in which the apparatus 14 is covered with a sheet for packing or the like. An apparatus image may be an image generated by photographing the apparatus 14 using a photographing apparatus such as a camera (an image representing the external appearance of the apparatus 14, an image representing inside the apparatus 14, or the like) or an image schematically representing the apparatus 14 (for example, an icon or the like). An apparatus image may be a static; image or a moving image. Data of an apparatus image may be stored in the memory 18 or stored in a different apparatus such as the terminal apparatus 12, the apparatus 14, or the like. Apparatus address information is, for example, information representing the media access control (MAC) address, Internet protocol (IP) address, or the like of the apparatus 14.

Terminal identification information is, for example, the name of the terminal apparatus 12, the ID of the terminal apparatus 12, information indicating the type of the terminal apparatus 12, the model number of the terminal apparatus 12, information for managing the terminal apparatus 12 (for example, asset management information or the like), information indicating the position at which the terminal apparatus 12 is installed (positional information of the terminal apparatus 12), an image linked with the terminal apparatus 12 (terminal image), information indicating the address of the terminal apparatus 12 (terminal address information), and the like. A terminal image is an image similar to the apparatus image described above. Terminal address information is, for example, information indicating the MAC address, IP address, and the like of the terminal apparatus 12.

User identification information is, for example, the name of a user, the ID of the user, user account information linked with the user, address information (terminal address information) of a terminal apparatus 12 linked with the user, electronic mail address information allocated to the user, and the like.

The function management information 22 is information for managing a function that is able to be executed by using a configuration (for example, an apparatus 14 as hardware, software, a target, and the like). A target as a configuration is a file (data) to which a function is applied, a physical object, and the like. A function may be a single function or a cooperative function. A single function is, for example, a function that is able to be executed by using a single configuration. A cooperative function is a function that is able to be executed by using plural configurations. For example, a cooperative function is a function that is able to be executed by causing plural configurations to cooperate with each other. Furthermore, a cooperative function may be a function that is able to be executed by using plural functions provided in an apparatus 14 or one piece of software. Furthermore, the terminal apparatus 12 or the relay apparatus 10 may be used as a function of executing a cooperative function. A function provided in the terminal apparatus 12 or the relay apparatus 10 may also be used as part of a cooperative function.

The entire apparatus 14, a particular part of the apparatus, a particular function of software, a group function including plural functions, or the like may be used as a configuration. For example, in the case where a function is allocated to each part of an apparatus, cooperative function may be a function using the part. Furthermore, in the case where software includes plural functions, a cooperative function may be a function using part of the plural functions. A group function includes plural functions. When the plural functions are simultaneously or sequentially executed, processing based on the group function is executed. Furthermore, a cooperative function may be a function using only hardware, a function using only software, or a function using both hardware and software.

The function management information 22 is, for example, information indicating association between a configuration (configuration identification information for identifying each configuration) to be used for a function and functional information regarding the function. For example, a single configuration to be used for a single function and functional information regarding the single function are registered in association with each other in function management information. Furthermore, a combination of plural configurations to be used for a cooperative function (combination of plural pieces of configuration identification information for identifying individual configurations) and functional information regarding the cooperative function are registered in association with each other in function management information.

In the case where a configuration is an apparatus, configuration identification information is information (apparatus identification information) for identifying the apparatus. In the case where a configuration is software, configuration identification information is information (software identification information) for identifying the software. In the case where a configuration is a target, configuration identification information is information (target identification information) for identifying the target. Configuration identification information for identifying an apparatus may include information indicating a function provided in the apparatus. In a similar manner, configuration identification information for identifying software may include information indicating a function provided in the software.

Software identification information includes, for example, the name of software, the ID of the software, information indicating the type of the software, the model number of the software, information for managing the software, an image (software image) linked with the software, and the like. A software image is, for example, an image (for example, an icon or the like) representing a function of the software. A software image may be a static image or a moving image. Data of a software image may be stored in the memory 18 or may be stored in a different apparatus such as the terminal apparatus 12 or the apparatus 14.

Target identification information includes, for example, the name of a target, the ID of the target, information indicating the type of the target, an image (target image) linked with the target, and the like. For example, in the case where a target is a file (data), the name or the like of the file (for example, an image file, a document file, or the like) is used as target identification information. Furthermore, in the case where a target is a physical object (for example, an item or the like), the name or the like of the object is used as target identification information. A target image may be an image (a static image or a moving image) generated by photographing a physical target using a photographing apparatus such as a camera or an image (for example, an icon or the like) schematically representing the target. Data of a target image may be stored in the memory 18 or may be stored in a different apparatus such as the terminal apparatus 12 or the apparatus 14.

Functional information includes, for example, identification information such as the name and ID of a function and contents information indicating contents of the function. Functional information regarding a single function includes identification information of the single function and contents information indicating contents of the single function. Functional information regarding a cooperative function includes identification information of the cooperative function and contents information indicating contents of the cooperative function.

A cooperative function may be a function that is able to be executed by causing plural different configurations to cooperate with each other or a function that is able to be executed by causing same configurations to cooperate with each other. A cooperative function may be a function that is not able to be used before cooperation of plural functions. For example, by causing an apparatus (printer) including a print function and an apparatus (scanner) including a scan function to cooperate with each other, a copy function as a cooperative function becomes able to be executed. That is, by causing the print function and the scan function to cooperate with each other, the copy function becomes able to be executed. In this case, the copy function as a cooperative function is associated with a combination of the print function and the scan function.

The concept of a cooperative function may include a composite function of enabling a new function to be executed by causing plural apparatuses or plural pieces of software to cooperate with each other. For example, by combining plural displays together, an extension display function as a composite function may be implemented. As another example, by combining television and a recorder together, a recording function as a composite function may be implemented. The recording function may be a function of recording an image displayed on television. Furthermore, by combining plural cameras together, a photographing region extension function as a composite function may be implemented. The extension function is, for example, a function of performing photographing for connected photographing regions of the plural cameras. Furthermore, by combining a telephone and a translation machine or translation software together, a translation conversation function (function of translating conversation on telephone) as a composite function may be implemented. As described above, the concept of a cooperative function may include a function that is able to be implemented by causing plural apparatuses of same type or plural pieces of software of same type to cooperate with each other and a function that is able to be implemented by causing plural apparatuses of different types or plural pieces of software of different types to cooperate with each other.

The user management information 24 is information for managing a user who uses the relay apparatus 10 and includes, for example, information (user identification information) for identifying the user.

For example, in the case where a user uses a terminal apparatus 12 to connect an apparatus 14 to the relay apparatus 10, user identification information linked with the user is registered in the user management information 24, and apparatus identification information linked with the apparatus 14 is registered in the apparatus management information 20. Furthermore, in the case where the user issues an instruction to set a function that is able to be executed using the apparatus 14, function information regarding the function is registered in the function management information 22.

A controller 26 is configured to control an operation of each unit of the relay apparatus 10. For example, the controller 26 executes various programs, controls communication by the communication unit 16, writes information to the memory 18, reads information from the memory 18, and the like.

Furthermore, the controller 26 controls a configuration of the apparatus 14 or the like in accordance with contents registered in the function management information 22 to control execution of a function registered in the function management information 22.

Furthermore, the controller 26 functions as an example of a communication unit. That is, in the case where a different apparatus is connected to the relay apparatus 10, the controller 26 transmits connection information of the relay apparatus 10 to a terminal apparatus 12 linked with a user who uses the relay apparatus 10. The user who uses the relay apparatus 10 is registered in the user management information 24. Therefore, the controller 26 transmits the connection information to the terminal apparatus 12 linked with the user who is registered in the user management information 24. Furthermore, the controller 26 includes an apparatus management unit 28 and a function management unit 30.

The apparatus management unit 28 is configured to manage an apparatus 14 connected to the relay apparatus 10. For example, the apparatus management unit 28 receives information indicating a connection request for the apparatus 14 from the terminal apparatus 12, and registers the apparatus 14 into the apparatus management information 20. Accordingly, the apparatus 14 enters a state in which the apparatus 14 is connected to the relay apparatus 10, and communication between the relay apparatus 10 and the apparatus 14 is thus enabled. Furthermore, the apparatus management unit 28 manages release of connection of the apparatus 14 from the relay apparatus 10. For example, the apparatus management unit 28 receives information indicating a connection release request for the apparatus 14 from the terminal apparatus 12, and deletes the apparatus 14 from the apparatus management information 20 or associates, in the apparatus management information 20, information (for example, a flag) indicating that connection has been released with the apparatus 14. Accordingly, connection between the apparatus 14 and the relay apparatus 10 is released, and communication between the apparatus 14 and the relay apparatus 10 is thus disabled.

The apparatus management unit 28 may manage connection and release of connection of the apparatus 14 for each user. That is, the apparatus management unit 28 may manage the apparatus 14 that is connected to the relay apparatus 10 and a user who has issued an instruction for connection of the apparatus 14 in association with each other. For example, in the case where plural users issue instructions for connection of the same apparatus 14, the plural users are managed in association with the same apparatus 14. In this case, the apparatus management unit 28 manages release of connection of the apparatus 14 for each user. For example, in the case where one of the plural users releases connection of the apparatus 14, the apparatus management unit 28 releases connection between the apparatus 14 and the relay apparatus 10, in terms of the user who has issued the release of connection, whereas the apparatus management unit 28 does not release connection between the apparatus 14 and the relay apparatus 10, in terms of other users. Accordingly, the user who has issued an instruction for release of connection is not able to use the released apparatus 14 via the relay apparatus 10, whereas a user who has not issued an instruction for release of connection is able to use the apparatus 14 via the relay apparatus 10.

The apparatus management unit 28 may manage connection and release of the terminal apparatus 12 to and from, the relay apparatus 10 or may manage connection and release of connection of other relay apparatuses 10 to and from the relay apparatus 10.

Furthermore, the apparatus management unit 28 manages the upper limit number of the apparatuses 14 that are able to be connected to the relay apparatus 10 and the number of the apparatuses 14 that are connected to the relay apparatus 10. In a similar manner, the apparatus management unit 28 may manage the upper limit numbers of the terminal apparatuses 12 and other relay apparatuses 10 that are able to be connected to the relay apparatus 10 and the numbers of the terminal apparatuses 12 and other relay apparatuses 10 that are connected to the relay apparatus 10. The upper limit number is, for example, a predetermined number. Information indicating the upper limit number is stored in the memory 18. The upper limit number may be changed by a user, an administrator, or the like. For example, the upper limit number may be determined based on the communication capability of the relay apparatus 10, communication environment of a place where the relay apparatus 10 is installed, or the like. Furthermore, the upper limit number may be determined for each type of the apparatus 14, and the apparatus management unit 28 may manage the number of the apparatuses 14 that are connected to the relay apparatus 10 for each type of the apparatus 14.

The function management unit 30 is configured to set a function (a single function or a cooperative function) for a configuration (the apparatus 14 or software). Furthermore, the function management unit 30 registers configuration identification information for identifying the configuration and functional information regarding the function in association with each other in the function management information 22. For example, in the case where a user uses the terminal apparatus 12 to issue an instruction to set a function for a configuration, information indicating the setting instruction to the relay apparatus 10 from the terminal apparatus 12. The function management unit 30 sets the function for the configuration in accordance with the setting instruction. The function management unit 30 may manage each function set for a configuration for each user.

The relay apparatus 10 may include a user interface unit (UI unit). In this case, the controller 26 performs control of notification (for example, display of information, sound output, or the like) of information using the UI unit and reception of information input to the relay apparatus 10 using the UI unit. The UI unit includes, for example, a display unit as a display, an operation unit such as a touch panel and a keyboard, a sound producing unit such as a speaker, a sound collecting unit such as a microphone, and the like. Information may be input as sound input to the relay apparatus 10 or information may be produced by sound.

Figure 3:
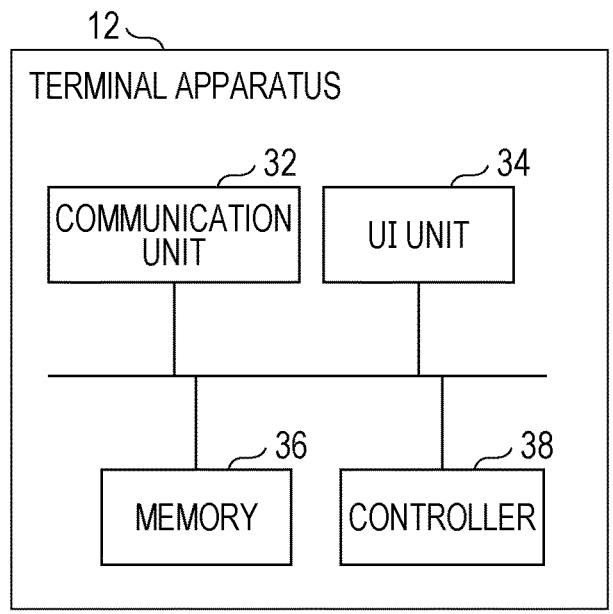
FIG. 3 is a block diagram illustrating a configuration of a terminal apparatus.

A configuration of the terminal apparatus 12 will be explained in detail below with reference to FIG. 3 FIG. 3 illustrates a configuration of the terminal apparatus 12.

A communication unit 32 is a communication interface and includes a function of transmitting data to other apparatuses and a function of receiving data from other apparatuses. The communication unit 32 may be a communication interface that includes a wireless communication function or a communication interface that includes a wired communication function. For example, the communication unit 32 may support one or more types of communication systems and may communicate with a communication partner in accordance with a communication system suitable for the communication partner. A communication system is, for example, infrared communication, visible light communication, Wi-Fi communication, short-range wireless communication, or the like. The communication unit 32 may switch a communication system and a frequency band according to a communication partner and may switch a communication system and a frequency band according to surrounding environment.

A UI unit 34 is a user interface unit and includes a display unit and an operation unit. The display unit is, for example, a display device such as a liquid crystal display. The display unit may be a flexible display. The operation unit is, for example, an input device such as a touch panel and a keyboard. The UI unit 34 may be a user interface (including, for example, a touch display or a device that electronically displays a keyboard or the like on a display, and the like) that serves as both the display unit and the operation unit. Furthermore, the UI unit 34 may include a sound collecting unit such as a microphone and a sound producing unit such as a speaker. In this case, information may be input to the terminal apparatus 12 by sound input or information may be output by sound.

A memory 36 is a memory device such as a hard disk and a memory (for example, an SSD or the like). In the memory 36, for example, various data, various programs (for example, an OS, various application programs (application software), and the like), information (relay apparatus address information) indicating the address of the relay apparatus 10, information (terminal address information) indicating the address of a different terminal apparatus 12, information (apparatus address information) indicating the address of each apparatus 14, and the like are stored. Individual data, individual pieces of information, individual programs, and the like may be stored in different memory devices or in a single memory device.

A controller 38 is configured to control an operation of each unit of the terminal apparatus 12. For example, the controller 38 executes various programs, controls communication by the communication unit 32, controls notification of information (for example, display, sound output, or the like of information) using the UI unit 34, receives information input to the terminal apparatus 12 using the UI unit 34, writes information to the memory 36, reads information from the memory 36, and performs other processing.

Figure 4:
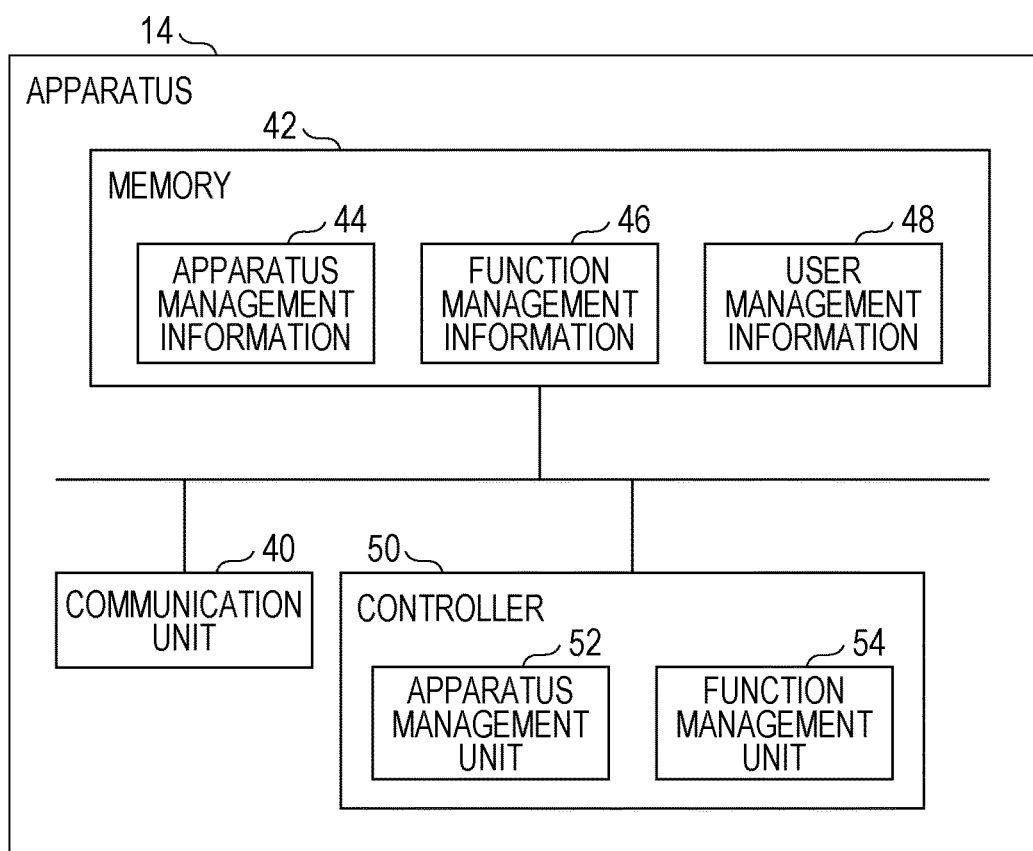
FIG. 4 is a block diagram illustrating a configuration of an apparatus.

A configuration of an apparatus 14 will be explained in detail below with reference to FIG. 4. FIG. 4 illustrates a configuration of an apparatus 14. In FIG. 4, a configuration of the apparatus 14 for managing a different apparatus 14 or a terminal apparatus 12 that is connected to the apparatus 14 is illustrated, and illustration of other configuration features (for example, a configuration feature unique to each apparatus 14) will be omitted.

A communication unit 40 is a communication interface and includes a function of transmitting data to other apparatuses and a function of receiving data from other apparatuses. The communication unit 40 may be a communication interface that includes a wireless communication function or a communication interface that includes a wired communication function. For example, the communication unit 40 may support one or more types of communication systems and may communicate with a communication partner in accordance with a communication system suitable for the communication partner. A communication system is, for example, infrared communication, visible light communication, Wi-Fi communication, short-range wireless communication, or the like. The communication unit 40 may switch a communication system and a frequency band according to a communication partner and may switch a communication system and a frequency band according to surrounding environment.

A memory 42 is a memory device such as a hard disk and a memory (for example, an SSD or the like). In the memory 42, for example, apparatus management information 44, function management information 46, user management information 48, various data, and various programs (for example, an OS, various application programs (application software), and the like) are stored. In addition, information (relay apparatus address information) indicating the address of the relay apparatus 10, address information of a server, and the like may also be stored in the memory 42. Individual data, individual pieces of information, individual programs, and the like may be stored in different memory devices or in a single memory device.

The apparatus management information 44 is information for managing other apparatuses (for example, the terminal apparatuses 12, other apparatuses 14, and the relay apparatuses 10) that are connected to the apparatus 14 that includes the apparatus management information 44. For example, the apparatus management information 44 is information for managing other apparatuses 14 and the terminal apparatuses 12 that are directly, not via the relay apparatus 10, connected to the apparatus 14 that includes the apparatus management information 44. In the apparatus management information 44, for example, information (for example, terminal identification information, apparatus identification information, or relay apparatus identification information) for identifying a different apparatus (for example, a terminal apparatus 12, a different apparatus 14, or the relay apparatus 10) that is directly connected to the apparatus 14 and information (user identification information) for identifying a user who has connected the different apparatus to the apparatus 14 are associated with each other. Other types of information may also be included in the apparatus management information 44. The different apparatus that is connected to the apparatus 14 is an apparatus that may communicate with (transmit and receive information to and from) the apparatus 14 and does not necessarily always communicate with the apparatus 14. For example, the different apparatus may always communicate with the apparatus 14, may intermittently communicate with the apparatus 14, or may communicate with the apparatus 14 when a predetermined trigger occurs and not communicate with the apparatus 14 when the predetermined trigger does not occur.

The relay apparatus identification information includes, for example, the name of the relay apparatus 10, the ID of the relay apparatus 10, information indicating the type of the relay apparatus 10, the model number of the relay apparatus 10, information (for example, asset management information or the like) for managing the relay apparatus 10, information (positional information of the relay apparatus 10) indicating the position where the relay apparatus 10 is installed, an image (relay apparatus image) linked with the relay apparatus 10, information (relay apparatus address information) indicating the address of the relay apparatus 10, and the like. The relay apparatus image is an image similar to the apparatus image described above. The relay apparatus address information is, for example, information indicating the MAC address, IP address, and the like of the relay apparatus 10.

The function management information 46 is information for managing a function set for the apparatus 14 that includes the function management information 46. For example, the function management information 46 is information for managing a function that is directly, not via the relay apparatus 10, set for the apparatus 14 that includes the function management information 46. The function may be a single function that is able to be executed only by the apparatus 14 or a cooperative function that is able to be executed by the apparatus 14 and a different configuration (a different apparatus 14, software, or target).

The user management information 48 is information for managing a user who uses the apparatus 14 and includes, for example, user identification information for identifying the user.

For example, in the case where a user directly, not via the relay apparatus 10, connects a terminal apparatus 12 to an apparatus 14, user identification information linked with the user is registered in the user management information 48, and terminal identification information linked with the terminal apparatus 12 is registered in the apparatus management information 44. Accordingly, the terminal apparatus 12 and the apparatus 14 are able to directly, not via the relay apparatus 10, communicate with each other. Furthermore, in the case where a user directly, not via the relay apparatus 10, issues an instruction to set a function that is able to be executed using the apparatus 14 to the apparatus 14, functional information regarding the function is registered in the function management information 46.

A controller 50 is configured to control an operation of each unit of the apparatus 14. For example, the controller 50 executes various programs, controls communication by the communication unit 40, writes information to the memory 42, reads information from the memory 42, and the like.

Furthermore, the controller 50 may control execution of a function registered in the function management information 46 by controlling the apparatus 14 that includes the controller 50 in accordance with contents registered in the function management information 46.

Furthermore, the controller 50 functions as an example of a notification unit. That is, in the case where a different apparatus (a terminal apparatus 12, a different apparatus 14, or the relay apparatus 10) is connected to the apparatus 14 that includes the controller 50, the controller 50 may transmit connection information of the apparatus 14 to a terminal apparatus 12 linked with a user who uses the apparatus 14. The user who uses the apparatus 14 is registered in the user management information 48, and therefore, the controller 50 transmits the connection information to the terminal apparatus 12 linked with the user that is registered in the user management information 48. Furthermore, the controller 50 includes an apparatus management unit 52 and a function management unit 54.

The apparatus management unit 52 is configured to manage a different apparatus (for example, a terminal apparatus 12, a different apparatus 14, or the relay apparatus 10) that is connected to the apparatus 14 that includes the apparatus management unit 52. For example, the apparatus management unit 52 receives information indicating a connection request for a terminal apparatus 12 directly, not via the relay apparatus 10, from the terminal apparatus 12 and registers the terminal apparatus 12 in the apparatus management information 44. Accordingly, the terminal apparatus 12 enters a state in which the terminal apparatus 12 is directly connected to the apparatus 14 without the relay apparatus 10 interposed therebetween, and direct communication between the terminal apparatus 12 and the apparatus 14 is thus enabled. Furthermore, the apparatus management unit 52 receives information indicating connection release request for the terminal apparatus 12 from the terminal apparatus 12, and deletes the terminal apparatus 12 from the apparatus management information 44 or associates, in the apparatus management information 44, information (for example, a flag) indicating that connection has been released with the terminal apparatus 12. Accordingly, direct connection between the terminal apparatus 12 and the apparatus 14 is released, and direct communication between the terminal apparatus 12 and the apparatus 14 is thus disabled. Similar processing is performed for connection and release of connection between the apparatus 14 and a different apparatus 14 and connection and release of connection between the apparatus 14 and the relay apparatus 10.

As with the apparatus management unit 28 described above, the apparatus management unit 52 may manage connection and release of connection for each user. That is, the apparatus management unit 52 may manage a different apparatus (for example, a different apparatus 14, a terminal apparatus 12, or the relay apparatus 10) that is directly connected to the apparatus 14 that includes the apparatus management unit 52 and a user who has issued an instruction for connection with the different apparatus in association with each other.

Furthermore, the apparatus management unit 52 manages the upper limit number of other apparatuses (for example, other apparatuses 14, the terminal apparatuses 12, and the relay apparatus 10) that are able to be connected to the apparatus 14 that includes the apparatus management unit 52 and the number of other apparatuses that are connected to the apparatus 14. The upper limit number is a predetermined number, and information indicating the upper limit number is stored in the memory 42. The upper limit number may be changed by a user, an administrator, or the like. For example, the upper limit number may be determined based on the communication, capability of the apparatus 14, communication environment of the place where the apparatus 14 is installed, and the like. Furthermore, the upper limit number may be determined for each type of other apparatuses, and the apparatus management unit 52 may manage the number of other apparatuses that are connected to the apparatus 14 for each type of other apparatuses.

The function management unit 54 is configured to set a function (a single function or a cooperative function) for the apparatus 14 that includes the function management unit 54. Furthermore, the function management unit 54 registers functional information regarding the function set for the apparatus 14 that includes the function management unit 54 into the function management information 46. For example, in the case where a user uses a terminal apparatus 12 to directly, not via the relay apparatus 10, issue an instruction to set a function to the apparatus 14, information indicating the setting instruction is transmitted from the terminal apparatus 12 to the apparatus 14. The function management unit 54 sets the function for the apparatus 14 that includes the function management unit 54, in accordance with the setting instruction. The function management unit 54 may manage, for each user, each function set for the apparatus 14 that includes the function management unit 54.

The information processing system according to the first exemplary embodiment will be explained further in detail below.

The apparatus management information 20 will be explained in detail with reference to FIG. 5. FIG. 5 illustrates an example of an apparatus management table as the apparatus management information 20. In the apparatus management table, for example, an apparatus ID as apparatus identification information for identifying an apparatus 14 that is connected to the relay apparatus 10, a user ID as user identification information for identifying a user who has connected the apparatus 14 to the relay apparatus 10, the name of the apparatus 14, apparatus address information (for example, the MAC address, IP address, and the like) as apparatus identification information of the apparatus 14, and information indicating a function that: the apparatus 14 includes are associated with one another. For example, each apparatus 14 connected to the relay apparatus 10 is managed for each user.

For example, in the case where a user uses a terminal apparatus 12 to issue an instruction to connect the apparatus 14 to the relay apparatus 10, the terminal apparatus 12 transmits information indicating the connection request to the relay apparatus 10. The information indicating the connection request includes, for example, apparatus identification information of the apparatus 14 as a connection target, user identification information of a user who has issued the instruction for connection, and terminal identification information of the terminal apparatus 12 that has transmitted the information indicating the connection request to the relay apparatus 10. The apparatus management unit 28 of the relay apparatus 10 receives the information indicating the connection request from the terminal apparatus 12, and registers the apparatus identification information and the user identification information included in the information indicating the connection request into the apparatus management table. Accordingly, the apparatus 14 enters a state in which the apparatus 14 is connected to the relay apparatus 10, and communication between the relay apparatus 10 and the apparatus 14 is thus enabled. The apparatus management unit 28 may register terminal identification information into the apparatus management table.

Furthermore, in the case where the user uses the terminal apparatus 12 to issue an instruction to release connection of the apparatus 14 from the relay apparatus 10, the terminal apparatus 12 transmits information indicating the release request to the relay apparatus 10. The information indicating the release request includes, for example, apparatus identification information of the apparatus 14 as a release target, user identification information of the user who has issued an instruction for the release, and terminal identification information of the terminal apparatus 12 that has transmitted the information indicating the release request to the relay apparatus 10. The apparatus management unit 28 of the relay apparatus 10 receives the information indicating the release request from the terminal apparatus 12, and deletes the apparatus identification information and the user identification information included in the information indicating the release request from the apparatus management table. As another example, the apparatus management unit 28 may associate, in the apparatus management table, information (for example, a flag) indicating that connection has been released with the apparatus 14 as a release target linked with the user who has issued the instruction for release of connection. Accordingly, in terms of the user who has issued the instruction for release of connection, connection between the apparatus 14 and the relay apparatus 10 is released, and communication between the apparatus 14 and the relay apparatus 10 is thus disabled.

The apparatus management unit 28 manages the number of the apparatuses 14 that are connected to the relay apparatus 10 by referring to the apparatus management table. For example, the apparatus management unit 28 manages the number of the apparatuses 14 for each type of the apparatuses 14.

In the example illustrated in FIG. 5, a user A connects a door opening/closing sensor A as an apparatus 14 to the relay apparatus 10. The door opening/closing sensor A is a sensor that detects opening and closing of a door.

Furthermore, a user B connects the door opening/closing sensor A, a lighting apparatus B, and a scanner C apparatuses 14 to the relay apparatus 10. The scanner C is an apparatus that includes a scan function (image reading function). The door opening/closing sensor A is connected to the relay apparatus 10 by the users A and B. In the case where the user A releases connection of the door opening/closing sensor A and the user B does not release connection of the door opening/closing sensor A, the connection between the relay apparatus 10 and the door opening/closing sensor A is released in terms of the user A, but the connection between the relay apparatus 10 and the door opening/closing sensor A is not released in terms of the user B. The same applies to a case where the user B releases the connection but the user A does not release the connection.

Furthermore, a user C connects the scanner C as the apparatus 14 to the relay apparatus 10. The scanner C is connected to the relay apparatus 10 by the users B and C. Therefore, as with the door opening/closing sensor A, connection and release of connection of the scanner C is performed for each user.

In the apparatus management table, terminal apparatuses 12 and other relay apparatuses 10 that are connected to the relay apparatus 10 may be registered.

The apparatus management information 44 stored in the apparatus 14 has a configuration similar to that of the apparatus management table illustrated in FIG. 5. In the apparatus management table stored in the apparatus 14, other apparatuses (for example, terminal apparatuses 12, other apparatuses 14, and the relay apparatus 10) that are connected to the apparatus 14 are registered.

The function management information 22 will be explained in detail below with reference to FIG. 6. FIG. 6 illustrates an example of a function management table as the function management information 22. In the function management table, for example, a function ID as function identification information for identifying a function set for a configuration (an apparatus, software, or a target), a user ID as user identification information for identifying a user who has set the function, configuration identification information for identifying a configuration used for the function, and information indicating contents of the function are associated with one another. A function is a single function or a cooperative function. For example, user account information (for example, user account information for using setting or execution of a function) for using a service provided by the relay apparatus 10 is used as a user ID. The entire or part of the apparatus 14 may be used as a configuration. Furthermore, a specific function of software may be used as a configuration. A configuration is identified by information at a specific concept level (for example, a unique name of the configuration (for example, a specific product name, an item name, a model number, a Web site name, a URL, or the like)). Obviously, a configuration may be identified by information at a general concept level (for example, a normal name, a general name, or the like) of the configuration. Hereinafter, each function will be explained in detail.

For example, the user A issues an instruction to set a function 1, and the function 1 is set for a configuration and registered in the function management table. The function 1 is a cooperative function that is able to be executed by causing the door opening/closing sensor A as an apparatus 14 and the lighting apparatus B as an apparatus 14 to cooperate with each other. The door opening/closing sensor A is a sensor that detects opening and closing of a door. The contents of the function 1 represent a function of "turning on the lighting apparatus B when the door opening/closing sensor A detects opening of the door." More particularly, when the door opening/closing sensor A detects opening of the door, information indicating the detection result is transmitted to the relay apparatus 10 from the door opening/closing sensor A. When the relay apparatus 10 receives the information indicating the detection result, the controller 26 of the relay apparatus 10 turns on the lighting apparatus B by transmitting information indicating a turn-on instruction to the lighting apparatus B.

Apparatus address information of the apparatuses 14 that are connected to the relay apparatus 10 is registered in the apparatus management table, and therefore, the controller 26 of the relay apparatus 10 performs transmission and reception of information to and from the door opening/closing sensor A and the lighting apparatus B, using the apparatus address information registered in the apparatus management table. Obviously, a terminal apparatus 12 that is linked with the user A may perform the above control via the relay apparatus 10 or not via the relay apparatus 10. Furthermore, the door opening/closing sensor A and the lighting apparatus B may perform the above-mentioned operation by directly communicating with each other without the relay apparatus 10 interposed therebetween.

A function 2 is a cooperative function that is able to be executed by causing the scanner C, optical character recognition (OCR) software D, and form preparation software E as apparatuses 14 and a receipt and an accounting file F as targets to which the function 2 is applied to cooperate with each other. The contents of the function 2 represent a function of "adding contents of a receipt generated by scanning to the accounting file F when the receipt is scanned by the scanner C." More particularly, when a receipt is read by the scanner C, an image is generated, a character string is extracted from the image by the OCR software D, and the character string is added to the accounting file F by the form preparation software E. Still more particularly, when the image is generated, data of the image is transmitted to the relay apparatus 10 from the scanner C. The relay apparatus 10 controls processing using the OCR software D and processing using the form preparation software E. Specifically, the relay apparatus 10 transmits data of the image to an apparatus (for example, a server, a terminal apparatus 12, an apparatus 14, or the like) in which the OCR software P and the form preparation software E are installed, and causes the apparatus to perform processing using the OCR software D and the form preparation software E. The apparatus acquires the accounting file F from a stored location (for example, the server, the terminal apparatus 12, or the like), and performs the processing using the OCR software P and the form preparation software E. Obviously, in the case where the OCR software D and the form preparation software E are installed in the relay apparatus 10, the relay apparatus 10 may perform the processing using the OCR software P and the form preparation software E. The processing using the OCR software P and the processing using the form preparation software E may be performed by different apparatuses. As with the function 1, a terminal apparatus 12 linked with the user B or the scanner C may perform the above control.

The functions illustrated in FIG. 6 are merely examples. Other functions (single functions or cooperative functions) may be registered in the function management table. For example, a cooperative function may be a function that is able to be executed using an Internet of Things (IoT) apparatus. Furthermore, a cooperative function may be used by a connected home (a system that allows connection between apparatuses such as household appliances by a network using an IoT technology). In this case, apparatuses may be connected via a specific server or may be directly connected, not via a specific server.

Furthermore, plural configurations may execute a cooperative function by cooperating with each other via IFTTT. That is, the contents of a cooperative function may represent that when an event occurs as a trigger in a configuration, another configuration performs an action (processing). For example, the above-mentioned function 1 is a function of executing an action, that is, turning on the lighting apparatus B, when a trigger occurs, that is, the door opening/closing sensor A detects opening of a door. Furthermore, a function in which when an action in a configuration as a different trigger occurs, a still another configuration performs an action may also be regarded as a cooperative function. Furthermore, a function of causing plural Web services to cooperate with each other and application programming interface (API) cooperation that causes plural systems, services, or the like to cooperate with each other using an API may also be regarded as cooperative functions.

The apparatus 14 that executes the set function may be controlled by the relay apparatus 10 or may be controlled by a terminal apparatus 12 (for example, a terminal apparatus 12 that is linked with a user who has set the function). In the case where the apparatus 14 is controlled by the relay apparatus 10, the relay apparatus 10 controls the apparatus 14 by transmitting a control signal for controlling an operation of the apparatus to the apparatus 14. In the case where the apparatus 14 is controlled by the terminal apparatus 12, the terminal apparatus 12 controls the apparatus 14 by directly transmitting the control signal to the apparatus 14 or transmitting the control signal to the apparatus 14 via the relay apparatus 10. The relay apparatus 10 may transmit a control signal to a different relay apparatus 10 so that the different relay apparatus 10 may control the apparatus 14. The relay apparatus 10 may transmit a control signal to a server so that the server may control the apparatus 14.

Furthermore, software that executes the set function may be installed in the relay apparatus 10, may be installed in a terminal apparatus 12 (for example, a terminal apparatus 12 that is linked with a user who has set the function), or may be installed in a different apparatus such as a server.

Furthermore, a file as a target of the set function may be stored in the relay apparatus 10, may be stored in a terminal apparatus 12 (for example, a terminal apparatus 12 that is linked with a user who has set the function), or may be stored in a different apparatus such as a server.

Parts of an apparatus 14 may be used. For example, in the case where the apparatus 14 includes plural functions and the functions are allocated to individual parts of the apparatus 14, a cooperative function that is able to be executed by using parts of the apparatus 14 may be defined. Specifically, for example, a print function is allocated to a body part of a multifunction apparatus, a scan function is allocated to a reading part (for example, a part that corresponds to a document cover, a document glass, and an auto document feeding device) of the multifunction apparatus, and a postprocessing function (for example, a stapling function and the like) is allocated to a postprocessing device of the multifunction apparatus. In the case where the scan function is used by the function 2, the reading part of the multifunction apparatus may be set as a configuration to be used for the function 2. Furthermore, a group function including individual blocks such as robotics process automation (RPA) may be used as software.

For example, setting software for connecting an apparatus 14 to the relay apparatus 10 and setting a function for a configuration (the apparatus 14, software, or a target) is installed in a terminal apparatus 12 and stored in the memory 36 of the terminal apparatus 12. When a user uses the UI unit 34 of the terminal apparatus 12 to issue an instruction to execute the setting software, the controller 38 of the terminal apparatus 12 executes the setting software. Accordingly, a setting screen (for example, a screen for connecting the apparatus 14 to the relay apparatus 10 to set a function) is displayed on the UI unit 34. On the setting screen, a user performs connection of the apparatus 14 to the relay apparatus 10 and releases connection of the apparatus 14 from the relay apparatus 10. Information indicating a connection request for the apparatus 14 is transmitted from the terminal apparatus 12 to the relay apparatus 10. The apparatus management unit 28 of the relay apparatus 10 registers the apparatus 14 into the apparatus management table. Furthermore, on the setting screen, a configuration (the apparatus 14, software, or a target) and a function that is to be executed by the configuration are specified by a user. Information indicating the configuration and function specified by the user is transmitted from the terminal apparatus 12 to the relay apparatus 10. The function management unit 30 of the relay apparatus 10 sets the function specified by the user for the configuration specified by the user, and registers the configuration and the function in association with each other in the function management table.

For example, information indicating a single function that is able to be executed using a configuration and information indicating a cooperative function that is able to be executed using one or more configurations are created in advance and are stored in the relay apparatus 10, a terminal apparatus 12, a server, or the like. For example, information indicating a function of an apparatus 14 (that is, a single function that is able to be executed using the apparatus 14) and information indicating a function of software (that is, a single function that is able to be executed using the software) are created in advance and stored in the relay apparatus 10, a terminal apparatus 12, a server, or the like. Furthermore, information indicating a cooperative function that is able to be executed using one or more apparatuses 14, information indicating a cooperative function that is able to be executed using one or more pieces of software, and information indicating a cooperative function that is able to be executed using one or more apparatuses 14 and one or more pieces of software are created in advance and stored in the relay apparatus 10, a terminal apparatus 12, a server, or the like. Furthermore, information indicating a cooperative function that is able to be executed using one or more targets and a different configuration (one or more apparatuses 14 or one or more pieces of software) is created in advance and stored in the relay apparatus 10, a terminal apparatus 12, a server, or the like. The function management unit 30 of the relay apparatus 10 refers to the above information to determine whether or not the function (a single function or a cooperative function) specified by the user is able to be executed using the one or more configurations specified by the user. In the case where the function is able to be executed, the function management unit 30 sets the function (the single function or the cooperative function) specified by the user for the one or more configurations specified by the user, and registers the one or more configurations and the function in association with each other into the function management table. In the case where the function is not able to be executed, the function management unit 30 does not register the function specified by the user into the function management table. In this case, information indicating the setting is not able to be performed is displayed on the UI unit 34 of the terminal apparatus 12.

The controller 26 of the relay apparatus 10 refers to the function management table to control execution of the function registered in the function management table. The control is performed as described above. As described above, the control may be performed by the terminal apparatus 12, the apparatus 14, a server, or the like.

The function management information 46 stored in an apparatus 14 has a configuration similar to that of the function management table illustrated in FIG. 6. In the function management table stored in the apparatus 14, a function (a single function or a cooperative function) that is directly set for the apparatus 14 is registered. The controller 50 of the apparatus 14 controls execution of the function registered in the function management table.

Figures 7, 8:
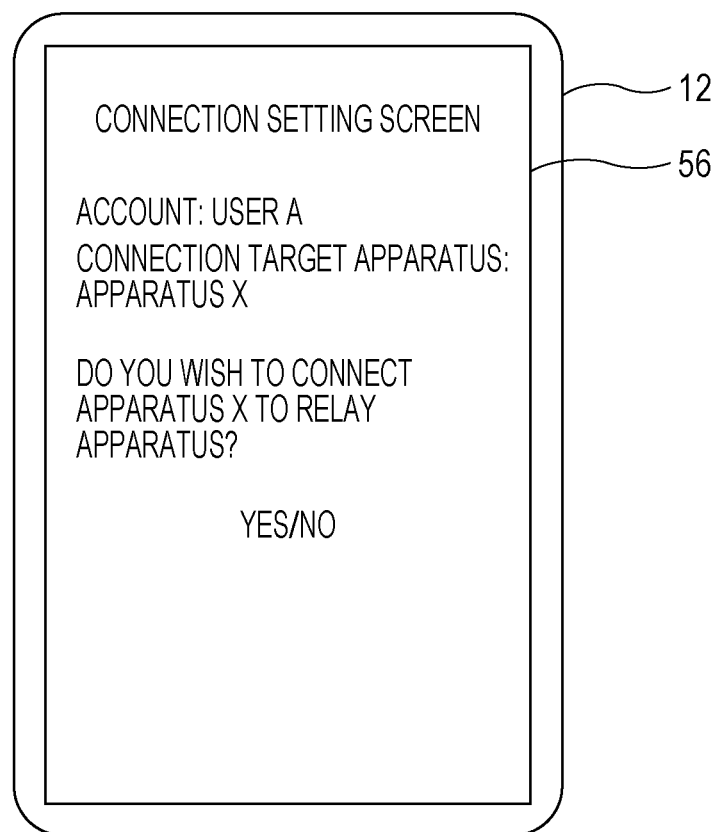
FIG. 7 is a diagram illustrating a user management table.
FIG. 8 is a diagram illustrating a connection setting screen.

The user management information 24 will be explained in detail below with reference to FIG. 7. FIG. 7 illustrates an example of a user management table as the user management information 24. In the user management table, for example, a user ID as user identification information for identifying a user who has connected an apparatus 14 to the relay apparatus 10 and terminal address information as terminal identification information of a terminal apparatus 12 that is linked with the user are associated with each other. The user who has connected the apparatus 14 to the relay apparatus 10 may be a user who is currently connecting the apparatus 14 to the relay apparatus 10 at the present time or a user who has released connection and is not currently connecting the apparatus 14 to the relay apparatus 10 at the present time but connected the apparatus 14 to the relay apparatus 10 at a past time. That is, a user who is currently connecting the apparatus 14 to the relay apparatus 10 at the present time may correspond to a user who uses the relay apparatus 10 or a different user who has released connection but connected the apparatus 14 to the relay apparatus 10 at a past time may correspond to a user who uses the relay apparatus 10. With reference to the user management table, a user who uses the relay apparatus 10 is identified, and a transmission destination of connection information of the relay apparatus 10 is thus identified. The user management table may be included in the apparatus management table. In a similar manner, the function management table may be included in the apparatus management table.

The user management information 48 stored in an apparatus 14 also includes a configuration similar to that of the user management table illustrated in FIG. 7. In the user management table stored in the apparatus 14, a user ID of a user who has connected a terminal apparatus 12 to the apparatus 14 and terminal address information of the terminal apparatus 12 that is linked with the user are associated with each other. With reference to the user management table, a transmission destination of connection information of the apparatus 14 is identified.

Processing performed by the information processing system according to the first exemplary embodiment will be explained by way of specific examples.

FIG. 8 illustrates an example of a connection setting screen. A connection setting screen 56 is a screen on which an operation for connecting an apparatus 14 to the relay apparatus 10 is performed. For example, in the case where the user A operates the UI unit 34 of a terminal apparatus 12 to issue an instruction to execute apparatus connection setting software, the controller 38 of the terminal apparatus 12 executes the apparatus connection setting software. Accordingly, the connection setting screen 56 is displayed on the UI unit 34. The apparatus connection setting software is installed in the terminal apparatus 12. On the connection setting screen 56, the user A specifies one or more apparatuses 14 to be connected to the relay apparatus 10. In the example illustrated in FIG. 8, an apparatus X (for example, a sensor) is specified as an apparatus 14 as a connection target. When the user A issues a connection instruction on the connection setting screen 56 (for example, the user A presses a "Yes" button), the terminal apparatus 12 transmits information indicating a connection request for the apparatus X to the relay apparatus 10. The information indicating the connection request includes, as described above, apparatus identification information of the apparatus X, user identification information of the user A, and terminal identification information of the terminal apparatus 12 that has transmitted the connection request. When the relay apparatus 10 receives the information indicating the connection request for the apparatus X, the apparatus management unit 28 of the relay apparatus 10 registers the apparatus X and the user A in the apparatus management table, and registers the user A in the user management table. Accordingly, the name and apparatus address information of the apparatus X and the contents of a function are registered in the apparatus management table, and the ID and address information of the user A are registered in the user management table.

Figure 9:
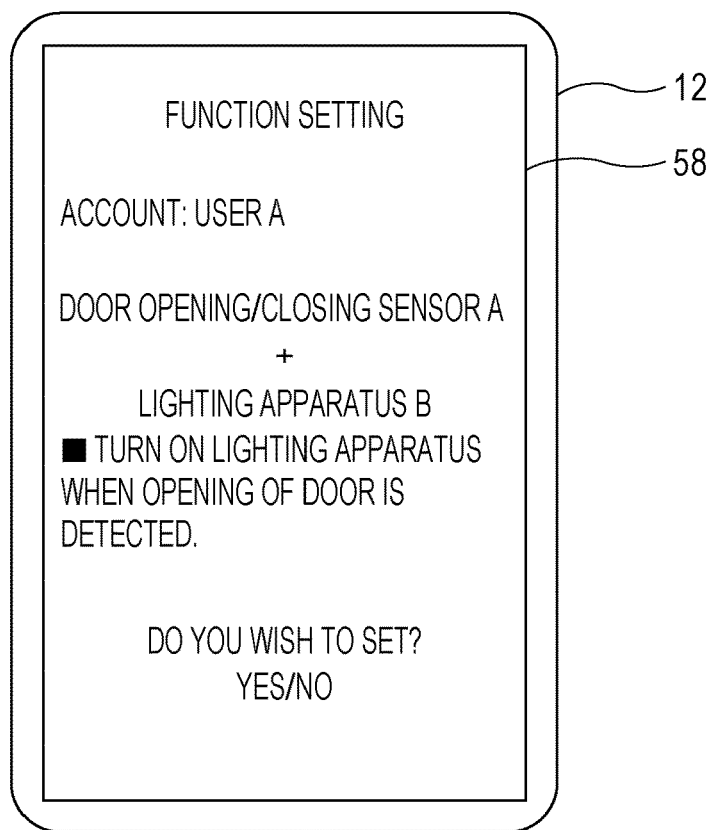
FIG. 9 is a diagram illustrating a function setting screen.

FIG. 9 illustrates an example of a function setting screen. A function setting screen 58 is a screen for setting a function (a single function or a cooperative function) and corresponds to a reception screen for receiving the function. For example, when the user A operates the UI unit 34 of a terminal apparatus 12 to issue an instruction to execute function setting software, the controller 38 of the terminal apparatus 12 executes the function setting software. Accordingly, the function setting screen 58 is displayed on the UI unit 34. The function setting software is installed in the terminal apparatus 12. On the function setting screen 58, the user A specifies one or more configurations and a function to be executed by the one or more configurations. In the example illustrated in FIG. 9, the door opening/closing sensor A and the lighting apparatus B are specified as the apparatuses 14 as configurations, and a function of "turning on the lighting apparatus when opening of the door is detected" is specified as a cooperative function to be executed using the door opening/closing sensor A and the lighting apparatus B. In this example, a cooperative function is specified. However, a single function may be specified.

The controller 38 of the terminal apparatus 12 causes a list of apparatuses 14 that are connected to the relay apparatus 10 by the user A to be displayed on the function setting screen 58 as a pull-down list or the like, so that the user A may select apparatuses 14 to be used for a cooperative function from the list. That is, in the apparatus management table, apparatuses 14 that are connected to the relay apparatus 10 are registered for each user. Therefore, the controller 38 acquires from the relay apparatus 10 information indicating a group of apparatuses that are connected by the user A and displays the information on the function setting screen 58. Obviously, an apparatus 14 that is not connected to the relay apparatus 10 by the user A but is connected to the relay apparatus 10 by a different user may be selected as an apparatus 14 to be used for a cooperative function by the user A. The apparatus 14 selected as described above is also registered in the apparatus management table as an apparatus 14 that is connected to the relay apparatus 10, in terms of the user A. The user A may directly input information indicating an apparatus 14 to be used for a cooperative function on the function setting screen 58. In the case where an apparatus 14 that is directly specified by the user A is not connected to the relay apparatus 10, the connection processing for the apparatus 14 may be performed.

As a configuration to be used for a cooperative function, software or a target may be selected. For example, the controller 38 may cause a list of software to be displayed on the function setting screen 58 as a pull-down list or the like, so that the user A may select software to be used for a cooperative function from the list. The user A may directly input information indicating software to be used for a cooperative function on the function setting screen 58. In a similar manner, the controller 38 may cause a list of targets (for example, a file, an item, or the like) to be displayed on the function setting screen 58 as a pull-down list or the like, so that the user may select a target to be used for a cooperative function from the list. The user A may directly input information indicating a target to which a cooperative function is to be applied on the function setting screen 58.

In the case where plural apparatuses 14 to be used for a cooperative function are specified by the user A, the controller 38 may cause a list of cooperative functions that are able to be executed using the plural apparatuses 14 to be displayed on the function setting screen 58 as a pull-down list or the like. In this case, the user A may select a cooperative function from the list. In the example illustrated in FIG. 9, when the user A specifies the door opening/closing sensor A and the lighting apparatus B, a list, of cooperative functions that are able to be executed using the door opening/closing sensor A and the lighting apparatus B is displayed on the function setting screen 58. As described above, information indicating a cooperative function that is able to be executed using one or more configurations is created in advance and stored in the relay apparatus 10, the terminal apparatuses 12, the apparatuses 14, and the like. By referring to the information, the controller 38 searches for a list of cooperative functions that are able to be executed using the door opening/closing sensor A and the lighting apparatus B, and causes the list to be displayed on the function setting screen 58. Obviously, the user A may directly input information indicating a cooperative function to the function setting screen 58.

When the user A issues an instruction to set a function on the function setting screen 58 (for example, the user A presses a "Yes" button), the terminal apparatus 12 transmits information indicating the function setting instruction to the relay apparatus 10. The setting instruction information includes information indicating a cooperative function (a function of "turning on the lighting apparatus when opening of the door is detected"), configuration identification information (apparatus identification information) of configurations (the door opening/closing sensor A and the lighting apparatus B) to be used for the cooperative function, and user identification information of the user A.

When the relay apparatus 10 receives the setting instruction information, the function management unit 30 of the relay apparatus 10 registers each piece of information included in the setting instruction information into the function management table. Accordingly, the cooperative function is registered in the function management table, and the user A is able to execute the above-mentioned cooperative function.

As explained with reference to FIG. 8, when the user A connects a new apparatus X to the relay apparatus 10, the controller 26 of the relay apparatus 10 transmits connection information of the relay apparatus 10 to a terminal apparatus 12 that is linked with a user who uses the relay apparatus 10. The user who uses the relay apparatus 10 is, for example, a user who is registered in the user management table. By referring to the user management table, the controller 26 identifies the user who uses the relay apparatus 10 and transmits the connection information.

The connection information includes, for example, the total number of apparatuses 14 that are connected to the relay apparatus 10, the number of remaining apparatuses 14 that are able to be connected to the relay apparatus 10, the number of apparatuses 14 that are connected to the relay apparatus 10 for each type of the apparatuses 14, the number of remaining apparatuses 14 that are able to be connected to the relay apparatus 10 for each type of the apparatuses 14, and the like. The controller 38 of the terminal apparatus 12 receives the connection information, and causes the connection information to be displayed on the UI unit 34.

Figure 10:
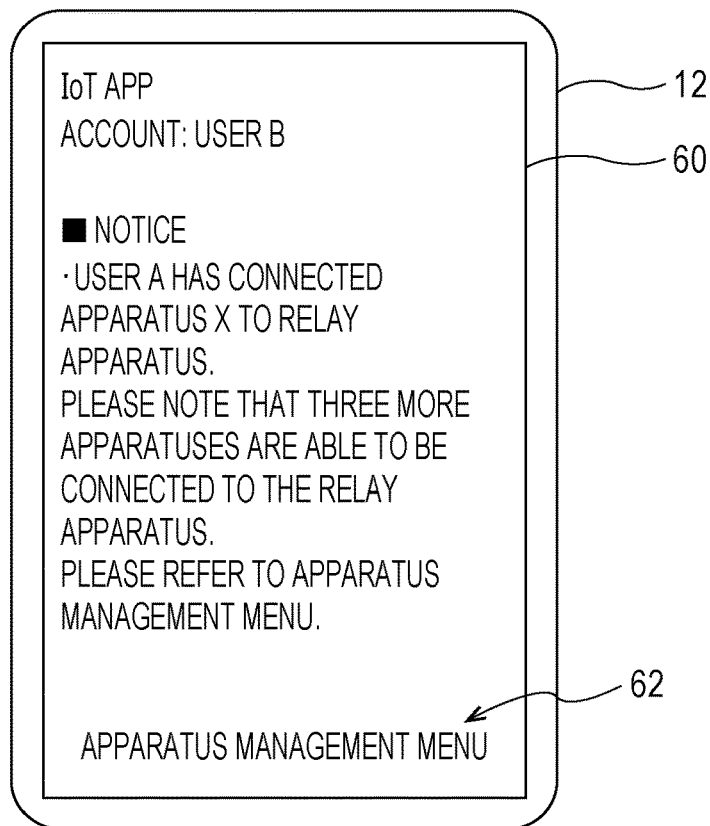
FIG. 10 is a diagram illustrating a screen.

FIG. 10 illustrates an example of display of connection information. For example, in the case where the user B uses the relay apparatus 10, the relay apparatus 10 transmits connection information to a terminal apparatus 12 that is linked with the user B. The controller 38 of the terminal apparatus 12 that is linked with the user B receives the connection information, and causes a screen 60 based on the connection information to be displayed on the UI unit 34, as illustrated in FIG. 10. On the screen 60, as connection information, for example, user identification information (for example, a user ID or a name) of a user who has connected a new apparatus 14 to the relay apparatus 10, apparatus identification information (for example, a name) of the new apparatus 14, and the number of remaining apparatuses 14 that are able to be connected to the relay apparatus 10 are displayed. In the example illustrated in FIG. 10, a message indicating that the user A has connected the apparatus X to the relay apparatus 10 and a message indicating that the number of remaining apparatuses that are able to be connected to the relay apparatus 10 is three are displayed as connection information on the screen 60.

As described above, when a new apparatus 14 is connected to the relay apparatus 10, connection information is transmitted to a terminal apparatus 12 that is linked with a user who uses the relay apparatus 10. Accordingly, the user who uses the relay apparatus 10 is able to recognize that the new apparatus 14 has been connected to the relay apparatus 10.

When a user who has a predetermined authority (for example, connection authority, management authority, or the like) makes a request for connection of an apparatus 14 to the relay apparatus 10, the apparatus management unit 28 may connect the apparatus 14 to the relay apparatus 10. When a user who does not have the authority makes a request for connection of the apparatus 14, the apparatus management unit 28 does not connect the apparatus 14 to the relay apparatus 10. For example, user identification information of a user who has the above authority is registered in the relay apparatus 10, and when the relay apparatus 10 receives a request for connection from the user who has the above-mentioned authority, the apparatus management unit 28 connects the apparatus 14 to the relay apparatus 10.

Furthermore, the controller 26 of the relay apparatus 10 may transmit connection information to a terminal apparatus 12 that is linked with a user who has the above-mentioned authority and may not transmit connection information to a terminal apparatus 12 that is linked with a user who uses the relay apparatus 10 but does not have the above-mentioned authority. Accordingly, a situation in which unnecessary information is notified to a user who does not have the above-mentioned authority may be avoided.

Furthermore, the connection information may include user identification information (for example, a name, a user ID, user account information, or the like) of a user who has connected the new apparatus 14 to the relay apparatus 10. Accordingly, a different user who uses the relay apparatus 10 is able to recognize the user who has connected the new apparatus 14 to the relay apparatus 10. For example, the different user is able to query the user about connection or release of connection.

Furthermore, a button 62 for displaying an apparatus management menu 1s displayed on the screen 60. When a user presses the button 62 on the screen 60, the controller 38 of the terminal apparatus 12 causes the apparatus management screen to be displayed on the UI unit 34.

Figure 11:
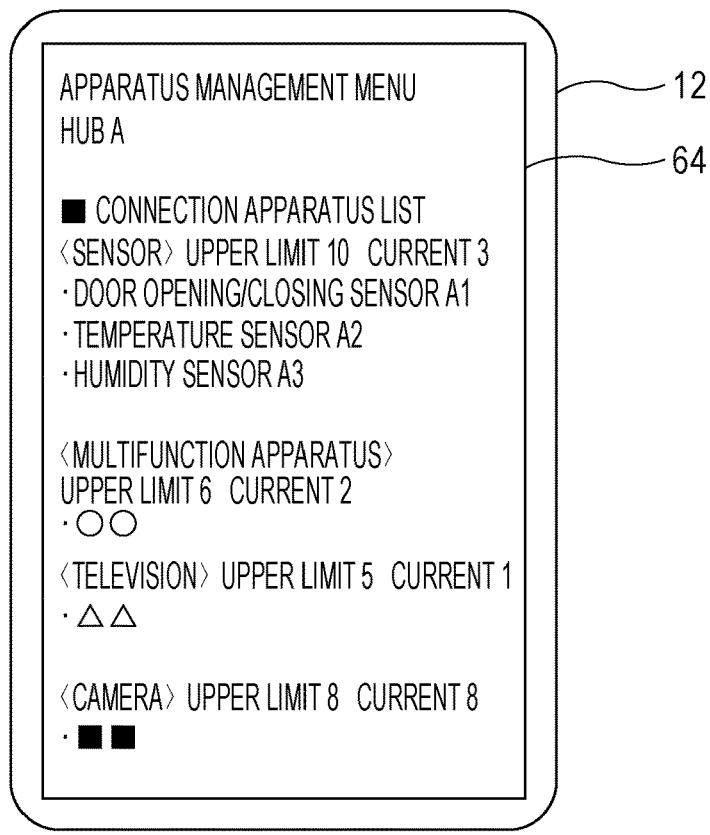
FIG. 11 is a diagram illustrating an apparatus management screen.

FIG. 11 illustrates an apparatus management screen 64. Relay apparatus identification information (for example, a name) of the relay apparatus 10 and a list of apparatuses that are connected to the relay apparatus 10 are displayed on the apparatus management screen 64. For example, a character string "Hub A" is displayed as the name of the relay apparatus 10 on the apparatus management screen 64. When the user 13 presses the button 62 on the screen 60, a terminal apparatus 12 that is linked with the user B transmits a request for information indicating a list of apparatuses that are connected to the relay apparatus 10 to the relay apparatus 10. In response to the request, the relay apparatus 10 transmits the information indicating the list of the apparatuses to the terminal apparatus 12. Accordingly, the list of the apparatuses is displayed on the apparatus management screen 64. The above-mentioned connection information may include the information indicating the list of the apparatuses.

In the example illustrated in FIG. 11, an upper limit number and a connection number of apparatuses 14 are displayed for each type of the apparatuses 14. The upper limit number represents the upper limit number of apparatuses that are able to be connected to the relay apparatus 10. The connection number represents the number of apparatuses that are currently connected to the relay apparatus 10. As types of apparatuses 14, a sensor, a multifunction apparatus, television, and a camera are displayed on the apparatus management screen 64. Furthermore, apparatus identification information (for example, a name) of an apparatus that is currently connected to the relay apparatus 10 is displayed.

For example, the upper limit number of sensors that are able to be connected to the relay apparatus 10 is "10", and the number of sensors that are currently connected to the relay apparatus 10 is "3". Furthermore, the sensors that are currently connected to the relay apparatus 10 are a door opening/closing sensor A1, a temperature sensor A2, and a humidity sensor A3, and the names of these sensors are displayed. In a similar manner, the upper limit number, the connection number, and the names of apparatuses are displayed for a multifunction apparatus, television, and a camera.

As described above, the upper limit number and connection number of the apparatuses 14 for each type are displayed. Therefore, the user B is able to confirm the upper limit number, the number of remaining apparatuses that are able to be connected, and the like, for each type of the apparatuses 14.

Furthermore, the number of different apparatuses that are connected to an apparatus X that is newly connected to the relay apparatus 10 and the upper limit number of different apparatuses that are able to be connected to the apparatus X may be displayed on the apparatus management screen 64 or a different screen. For example, in the case where two apparatuses 14 are already connected to an apparatus X, the number of the apparatuses 14 that are already connected to the apparatus X may be displayed or apparatus identification information (for example, names or the like) of the two apparatuses 14 may be displayed. Furthermore, in the case where the upper limit number of different apparatuses that are able to be connected to the apparatus X is "5", the number "5" is displayed. As described above, an apparatus 14 such as the apparatus X manages the number of different apparatuses that are connected to the apparatus 14. The controller 26 of the relay apparatus 10 acquires connection information of the apparatus X (information indicating the number of different apparatuses that are connected to the apparatus X and the upper limit number of different apparatuses that are able to be connected to the apparatus X) from the apparatus X, and transmits the connection information to a terminal apparatus 12 that is linked with the user B. Accordingly, the connection information is displayed on the UI unit 34 of the terminal apparatus 12 linked with the user B.

In a similar manner, the number of different apparatuses that are connected to the apparatus 14 that is connected to the relay apparatus 10 and the upper limit number of different apparatuses that are able to be connected to the apparatus 14 that is connected to the relay apparatus 10 may be displayed. In the example illustrated in FIG. 11, the number of different apparatuses that are connected to each sensor and the upper limit number of different apparatuses that are able to be connected to each sensor are displayed. The same applies to each multifunction apparatus, television, and camera. In a similar manner, these connection numbers and upper limit numbers are also managed in each of the apparatuses 14. The controller 26 of the relay apparatus 10 acquires the connection information from each apparatus 14, and transmits the connection information to the terminal apparatus 12 linked with the user B. Accordingly, the connection information is displayed on the UI unit 34 of the terminal apparatus 12 linked with the user B.

Furthermore, when a user specifies an apparatus on the apparatus management screen 64, the controller 38 of the terminal apparatus 12 causes information regarding the specified apparatus to be displayed on the UI unit 34.

Figure 12:
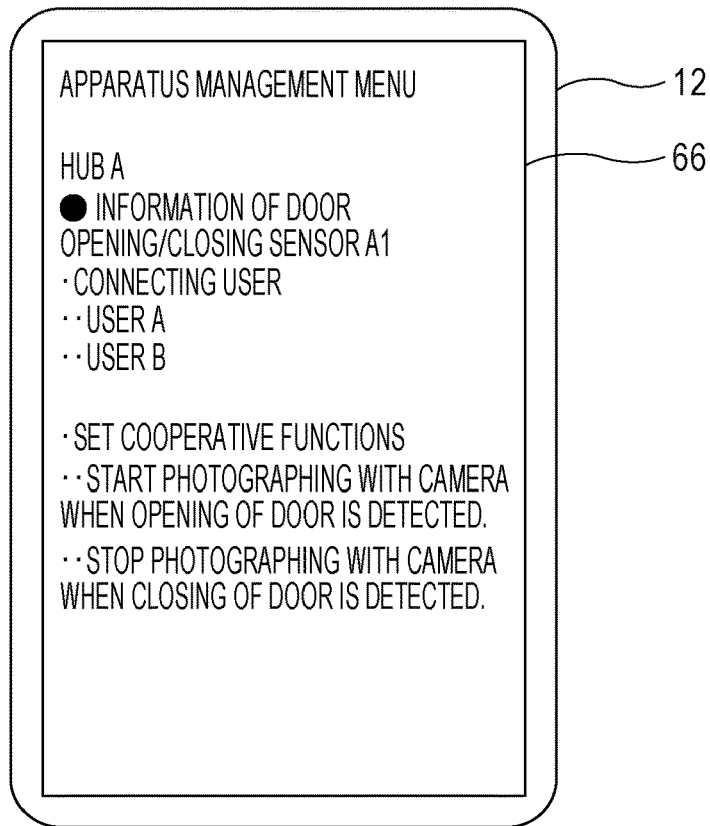
FIG. 12 is a diagram illustrating a screen.

FIG. 12 illustrates information regarding an apparatus. For example, when the door opening/closing sensor A1 is specified on the apparatus management screen 64, the controller 38 causes a screen 66 to be displayed on the UI unit 34, and causes information regarding the door opening/closing sensor A1 to be displayed on the screen 66. For example, user identification information (for example, a user ID or a name) of a user who connects the door opening/closing sensor A1 to the relay apparatus 10 and information indicating a function (a cooperative function or a single function) that is set for the door opening/closing sensor A1 are displayed as information regarding the door opening/closing sensor A1 on the screen 66. The users (for example, the users A and B) who connect the door opening/closing sensor A1 to the relay apparatus 10 are registered in the apparatus management table. Therefore, the controller 38 acquires information (for example, information indicating the users A and B) registered in the apparatus management table from the relay apparatus 10 and causes the acquired information to be displayed on the screen 66. The number of users may be displayed. Furthermore, a function set for the door opening/closing sensor A1, that is, a function that is able to be executed using the door opening/closing sensor A1, is registered in the function management table. Therefore, the controller 38 acquires the information registered in the function management information from the relay apparatus 10 and causes the acquired information to be displayed on the screen 66. For example, a cooperative function of "starting photographing with a camera when opening of the door is detected" and a cooperative function of "stopping photographing with a camera when closing of the door is detected" are set for the door opening/closing sensor A1. That is, these cooperative functions are registered as cooperative functions that are able to be executed using the door opening/closing sensor A1 in the function management table. Information indicating these cooperative functions is displayed on the screen 66.

Furthermore, user identification information of a user who uses the door opening/closing sensor A1 without the relay apparatus 10 interposed therebetween may be displayed on the screen 66. The door opening/closing sensor A1 as an apparatus 14 manages different apparatuses that are connected to the apparatus 14 and users who connect the different apparatuses to the apparatus 14, as described above. For example, in the case where a terminal apparatus 12 of a user is connected to the door opening/closing sensor A1 without the relay apparatus 10 interposed therebetween, the door opening/closing sensor A1 as the apparatus 14 manages the terminal apparatus 12 that is connected to the apparatus 14 and the user who is linked with the terminal apparatus 12. The controller 38 of the terminal apparatus 12 that is linked with the user B may acquire user identification information of the user from the door opening/closing sensor A1 and cause the user identification information to be displayed on the screen 66.

As described above, information regarding the apparatus 14 is displayed. Therefore, the user is able to confirm the information regarding the apparatus 14.

In the example illustrated in FIG. 12, cooperative functions ae set for the door opening/closing sensor A1 as an apparatus 14. However, a single function may be set for the door opening/closing sensor A1.

Furthermore, when a user specifies a function set for the apparatus 14 on the screen 66, the controller 38 of the terminal apparatus 12 causes detailed information of the specified function to be displayed on the UI unit 34.

Figure 13:
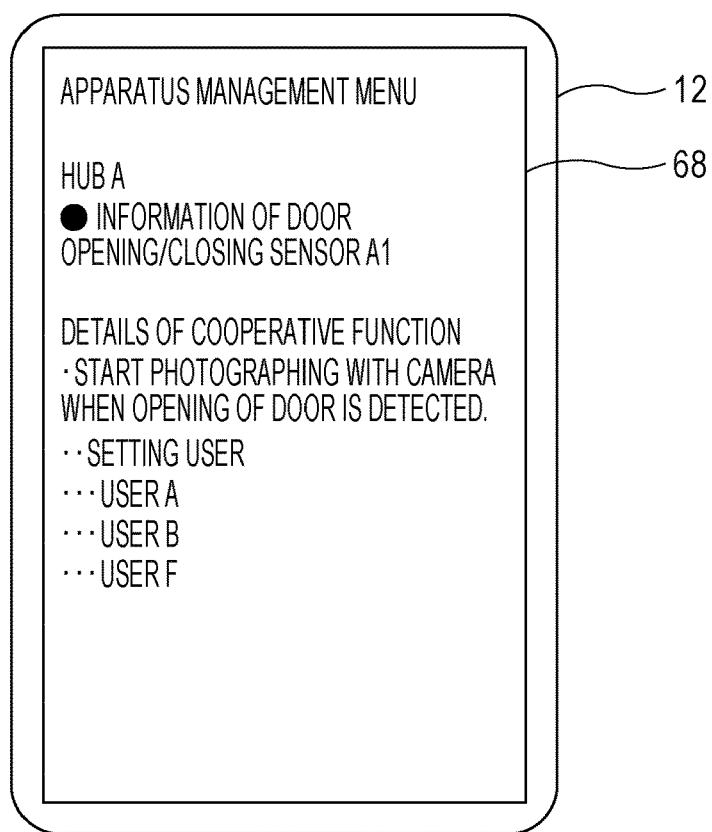
FIG. 13 is a diagram illustrating a screen.

FIG. 13 illustrates detailed information of a function. For example, when a cooperative function of "starting photographing with a camera when opening of the door is detected" is specified on the screen 66, the controller 38 causes a screen 68 to be displayed on the UI unit 34, and causes detailed information of the cooperative function to be displayed on the screen 68. For example, user identification information (for example, a user ID, a name, or the like) of a user who has set the cooperative function is displayed on the screen 68. The user who has set the cooperative function is registered in the function management table. Therefore, the controller 38 acquires the user identification information registered in the function management table from the relay apparatus 10 and causes the acquired information to be displayed on the screen 68. For example, the above-mentioned cooperative function is set by the users A, B, and F, and information indicating the users A, B, and F is displayed on the screen 68.

As described above, the detailed contents of the function set in the apparatus 14 are displayed. Therefore, the user is able to confirm the contents.

Furthermore, the user may release connection of the apparatus 14 from the relay apparatus 10. For example, when the user specifies the apparatus 14 to issue an instruction to release connection of the apparatus 14 on the apparatus management screen 64 illustrated in FIG. 11, the controller 38 of the terminal apparatus 12 causes a confirmation screen for release of connection to be displayed on the UI unit 34.

Figure 14:
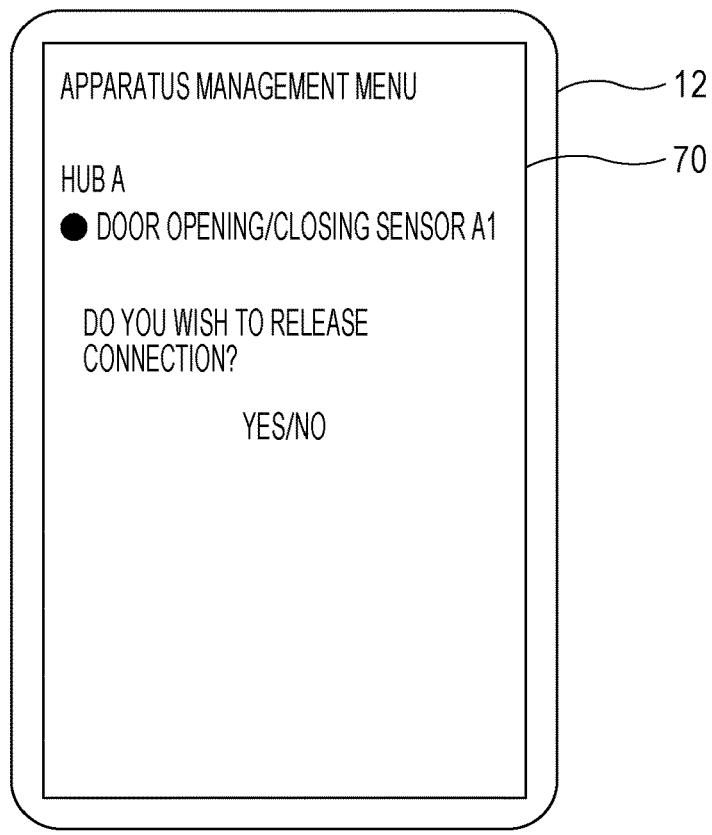
FIG. 14 is a diagram illustrating a confirmation screen.

FIG. 14 illustrates a confirmation screen 70 for release of connection. For example, when the user B who has received a notification of connection information specifies the door opening/closing sensor A1 to issue an instruction for release of connection of the door opening/closing sensor A1 on the apparatus management screen 64, the controller 38 causes the confirmation screen 70 to be displayed on the UI unit 34. On the confirmation screen 70, information for querying the user about release of connection of the door opening/closing sensor A1 is displayed. When the user issues an instruction to release connection on the confirmation screen 70 (for example, the user presses a "Yes" button), the controller 38 causes information indicating influence caused by release of the connection of the door opening/closing sensor A1 to be displayed on the UI unit 34. When the user issues an instruction to cancel the release on the confirmation screen 70 (for example, the user presses a "No" button), for example, the apparatus management screen 64 is displayed in place of the confirmation screen 70. The controller 38 of the terminal apparatus 12 functions as an example of a reception unit that receives release of connection of the apparatus 14. The controller 26 of the relay apparatus 10 may function as a reception unit that receives release of connection.

Figure 15:
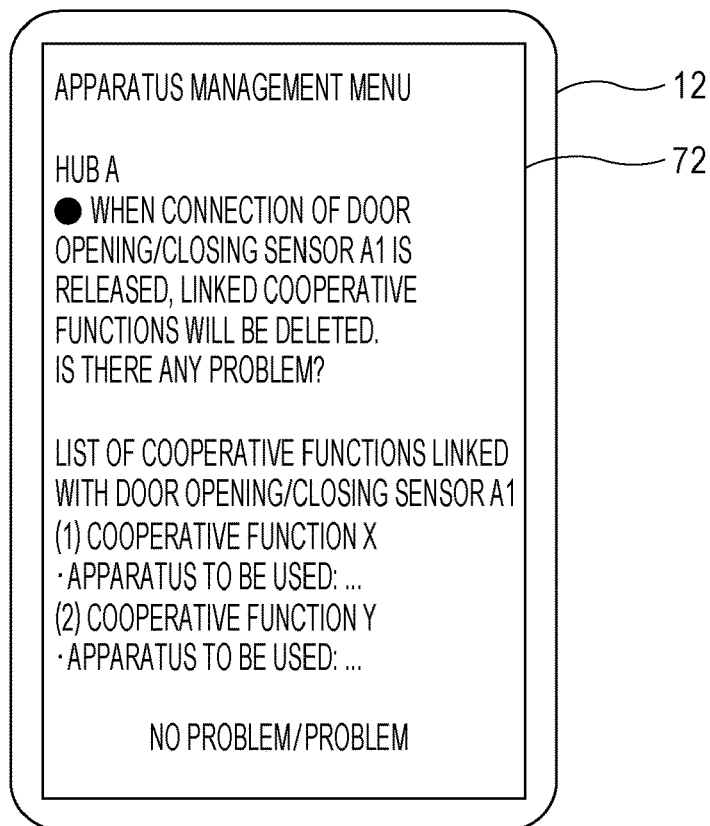
FIG. 15 is a diagram illustrating a final confirmation screen.

FIG. 15 illustrates a final confirmation screen 72 on which influence caused by release of connection is displayed. The controller 38 causes the final confirmation screen 72 to be displayed on the UI unit 34, and causes information indicating a function that is able to be executed using the door opening/closing sensor A1 as a release target and that is linked with the user B who has issued the instruction for the release to be displayed on the final confirmation screen 72. In the function management table, the function that is able to be executed using the door opening/closing sensor A1 as a release target and that is linked with the user B is registered. Therefore, the controller 38 acquires the registered information from the relay apparatus 10 and causes the acquired information to be displayed on the final confirmation screen 72. That is, when the user issues an instruction for release of connection on the confirmation screen 70, the terminal apparatus 12 transmits information indicating a connection release request for the door opening/closing sensor A1 to the relay apparatus 10. The information indicating the connection release request includes apparatus identification information of the door opening/closing sensor A1 as a release target, user identification information of the user B who has issued the instruction for release of connection, and terminal identification information of the terminal apparatus 12 that has transmitted the information indicating the connection release request to the relay apparatus 10. When the relay apparatus 10 receives the information indicating the connection release request from the terminal apparatus 12, the apparatus management unit 28 of the relay apparatus 10 identifies a function that is linked with the door opening/closing sensor A1 as a release target and that is linked with the user B in the function management table. The relay apparatus 10 transmits the information indicating the function to the terminal apparatus 12. Accordingly, the information that is able to be executed using the door opening/closing sensor A1 and that is linked with the user B is displayed on the final confirmation screen 72. For example, cooperative functions X and Y are registered in association with the door opening/closing sensor A1 and the user B, and these pieces of information are displayed on the final confirmation screen 72.

In the case where connection of the door opening/closing sensor A1 is released in terms of the user B, the user B is not able to use the cooperative functions X and Y, and information indicating that the user B is not able to use the cooperative functions X and Y is displayed on the final confirmation screen 72.

When the user issues a final instruction of release of connection on the final confirmation screen 72 (for example, the user presses "No problem" button), the terminal apparatus 12 transmits information indicating the final instruction to the relay apparatus 10. When the user issues an instruction to cancel the release on the final confirmation screen 72 (for example, the user presses "Problem" button), for example, the apparatus management screen 64 is displayed in place of the final confirmation screen 72.

When the relay apparatus 10 receives the information indicating a final instruction for release of connection from the terminal apparatus 12, the apparatus management unit 28 of the relay apparatus 10 deletes the doer opening/closing sensor A1 that is linked with the user B from the apparatus management table or associates the door opening/closing sensor A1 that is linked with the user B with information (for example, a flag) indicating that connection of the door opening/closing sensor A1 has been released. Accordingly, connection between the door opening/closing sensor A1 and the relay apparatus 10 is released in terms of the user B who has issued the instruction for release of connection, and communication between the door opening/closing sensor A1 and the relay apparatus 10 is disabled to the user B. Furthermore, the function management unit 30 deletes the cooperative functions X and Y that are linked with the user B and that are able to be executed using the door opening/closing sensor A1 from the function management table or associates the cooperative functions with information (for example, a flag) indicating that the cooperative functions are not able to be executed. Accordingly, in terms of the user B who has issued the instruction for release of connection, execution of the cooperative functions X and Y is disabled.

In the case Where a user (for example, the user A) different from the user B connects the door opening/closing sensor A1 to the relay apparatus 10, connection between the relay apparatus 10 and the door opening/closing sensor A1 is not released and a function that is able to be executed using the door opening/closing sensor A1 is able to be executed, in terms of the user A. That is, the user A is able to use the cooperative functions X and Y that are able to be executed using the door opening/closing sensor A1.

Figure 16:
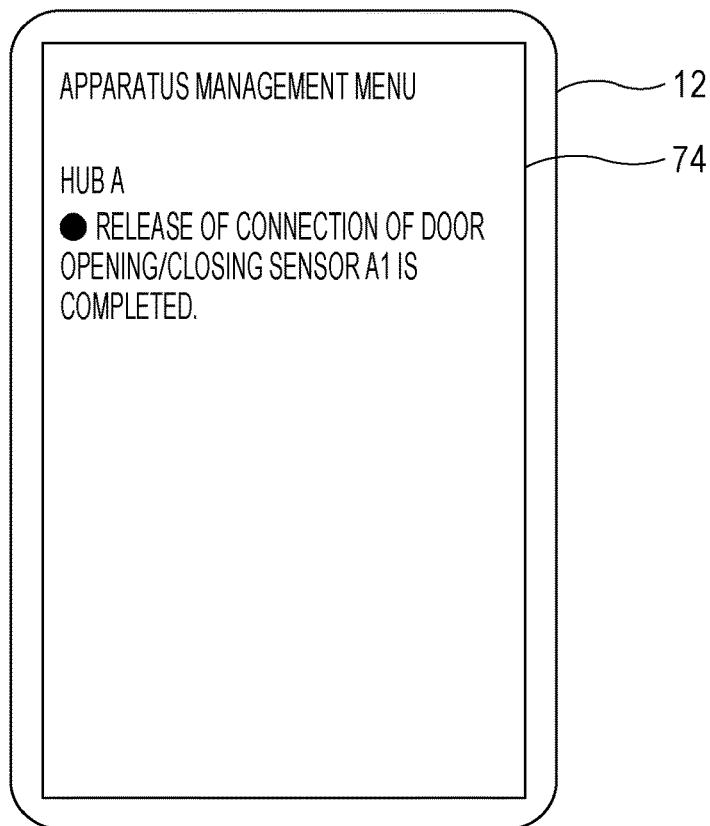
FIG. 16 is a diagram illustrating a screen.

When release of connection of the door opening/closing sensor A1 is completed, information indicating the completion is transmitted from the relay apparatus 10 to a terminal apparatus 12 that is linked with the user B and displayed on the UI unit 34 of the terminal apparatus 12. For example, as illustrated in FIG. 16, a screen 74 is displayed on the UI unit 34, and information indicating that release of connection of the door opening/closing sensor A1 is completed is displayed on the screen 74.

As described above, the user is able to release connection of the apparatus 14 that the user has connected to the relay apparatus 10. Furthermore, the user is able to recognize influence caused by the release (for example, a function that will become disabled), prior to the release.

When a user who has a predetermined authority (for example, connection release authority, management authority, or the like) makes a request for release of connection of an apparatus 14, the apparatus management unit 28 may release connection of the apparatus 14 from the relay apparatus 10. When a user who does not have the authority makes a request for release of connection, the apparatus management unit 28 does not release connection. For example, user identification information of a user who has the authority is registered in the relay apparatus 10, and when the relay apparatus 10 receives an instruction for release of connection from the user who has the authority, the apparatus management unit 28 releases connection of the apparatus 14 as a release target.

When a user who has a predetermined authority (for example, connection release authority, management authority, or the like) issues an instruction for release of connection of an apparatus, the function management unit 30 may release setting of all the functions set for the apparatus. For example, in the case where the users A and B set one or more cooperative functions for the door opening/closing sensor A1, when a user who has the authority releases connection of the door opening/closing sensor A1, the apparatus management unit 28 releases connection between the relay apparatus 10 and the apparatus 14 in terms of the users A and B, and the function management unit 30 releases setting of all the cooperative functions set for the door opening/closing sensor A1 in terms of the users A and B. Accordingly, even in the case where the users A and B do not release connection of the door opening/closing sensor A1 by themselves, the cooperative function set for the door opening/closing sensor A1 may not be used. In this case, the controller 26 of the relay apparatus 10 may transmit information indicating that the setting has been released to a terminal apparatus 12 that is linked with a user who has set the function for which setting has been released. In the above example, information indicating that the function has been released is transmitted to the terminal apparatuses 12 of the users A and B, and the information displayed on the UI unit 34. The controller 26 of the relay apparatus 10 may transmit information indicating that setting has been released to a terminal apparatus 12 that is linked with a user who has the authority and may not transmit the information to a terminal apparatus 12 that is linked with a user who does not have the authority.

In the case where a different apparatus is connected to an apparatus 14, the controller 50 of the apparatus 14 functions as a notification unit to transmit connection information of the apparatus 14 to a terminal apparatus 12 that is linked with a user who uses the apparatus 14. The connection information may be transmitted to the terminal apparatus 12 via the relay apparatus 10 or may be directly, not via the relay apparatus 10, transmitted to the terminal apparatus 12. A function as the notification unit is the same as a function of the controller 26 of the relay apparatus 10 as a notification unit. Furthermore, release of connection of a different apparatus connected to the apparatus 14, setting of a function to the apparatus 14, notification of influence caused by release of connection, and the like are executed in a same manner as the case where the relay apparatus 10 is used as described above.

An apparatus that does not include a configuration illustrated in FIG. 4, that is, an apparatus that does not include a function of managing the number of different apparatuses that are connected to the apparatus and the upper limit number of apparatuses that are able to be connected, may be connected to the relay apparatus 10. Obviously, all the apparatuses included in the information processing system according to the first exemplary embodiment may not include the configuration illustrated in FIG. 4.

(First Modification)

A first modification will be explained below. The first modification is a modification according to the first exemplary embodiment. In the first modification, connection information may include information regarding influence caused when a new apparatus 14 is connected to the relay apparatus 10. The information regarding the influence is, for example, information regarding a function (a single function or a cooperative function) that is able to be executed using the new apparatus 14.

For example, information (executable function management information) indicating a function (a single function or a cooperative function) that is able to be executed using one or more configurations is created in advance, and the information is stored in advance in the memory 18 of the relay apparatus 10. When a new apparatus 14 is connected to the relay apparatus 10, the function management unit 30 of the relay apparatus 10 identifies, in the executable function management information, a function that is able to be executed using the new apparatus 14. Information regarding the function identified as described above is included in the connection information and is transmitted to a terminal apparatus 12 that is linked with a user who uses the relay apparatus 10. Information regarding a function that is able to be executed using the new apparatus 14 is displayed on the UI unit 34 of the terminal apparatus 12. Accordingly, a user who has referred to the information is able to recognize a function that is able to be executed using the new apparatus 14.

The details of the first modification will be described below.

FIG. 17 illustrates an example of an executable function management table as executable function management information. In the executable function management table, for example, information indicating one or more configurations (apparatuses, software, or targets) and information indicating contents of a function (a single function or a cooperative function) that is able to be executed, using the one or more configurations are associated with each other.

Specifically, for example, information indicating a combination of a door opening/closing sensor and a lighting apparatus and information indicating a cooperative function that is able to be executed using the door opening/closing sensor and the light apparatus are associated with each other. The cooperative function is a function of "turning on the lighting apparatus when the door opening/closing sensor detects opening of the door."

Furthermore, information indicating a combination of a PC and a multifunction apparatus and information indicating a cooperative function that is able to be executed using the PC and the multifunction apparatus are associated with each other. The cooperative function is a "scan transfer function" and a "print function". The scan transfer function is a function of "causing the multifunction apparatus including the scan function to perform scanning (image reading) and causing the multifunction apparatus to transmit image data generated by the scanning to the PC." Furthermore, the print function is a function of "transmitting data stored in the PC to the multifunction apparatus and causing the multifunction apparatus to print the data."

Furthermore, information indicating a combination of a multifunction apparatus and a projector and information indicating a cooperative function that is able to be executed using the multifunction apparatus and the projector are associated with each other. The cooperative function is a "projection function" and a "print function". The "projection function" is a function of "causing the multifunction apparatus that includes a scan function to perform scanning (image reading) and causing the projector to project an image generated by the scanning." Furthermore, the "print function" is a function of "transmitting image data projected by the projector to the multifunction apparatus and causing the multifunction apparatus to print the image data."

Furthermore, information indicating a combination of OCR software, form preparation software, a receipt, and an accounting file and information indicating a cooperative function that is able to be executed using the OCR software, the form preparation software, the receipt, and the accounting file are associated with each other. The cooperative function is a function of "adding contents of a receipt to an accounting file when the receipt is scanned by the scanner".

For example, in a state in which a lighting apparatus is already connected to the relay apparatus 10, a door opening/closing sensor is connected as a new apparatus 14 to the relay apparatus 10. In this case, the function management unit 30 of the relay apparatus 10 identifies, in the executable function management table, a cooperative function that is associated with a combination of the newly connected door opening/closing sensor and the lighting apparatus. Information indicating the cooperative function is included in connection information and is transmitted from the relay apparatus 10 to a terminal apparatus 12 that is linked with a user who uses the relay apparatus 10. The information indicating the cooperative function is displayed on the UI unit 34 of the terminal apparatus 12.

According to the first modification, the user who uses the relay apparatus 10 is able to recognize a function that becomes usable by connecting the new apparatus 14 to the relay apparatus 10.

The above-described first modification may also be applied to the case where a different apparatus is connected to the apparatus 14. For example, information indicating a function that is able to be executed using the apparatus 14 and the different apparatus may be transmitted to the terminal apparatus 12 that is inked with the user.

Second Exemplary Embodiment

An information processing system according to a second exemplary embodiment of the present invention will be explained below. The information processing system according to the second exemplary embodiment has the same configuration as that of the information processing system illustrated in FIG. 1. Furthermore, a relay apparatus 10 according to the second exemplary embodiment has the same configuration as that of the relay apparatus 10 illustrated in FIG. 2, a terminal apparatus 12 according to the second exemplary embodiment has the same configuration as that of the terminal apparatus 12 illustrated in FIG. 3, and an apparatus 14 according to the second exemplary embodiment has the same configuration as that of the apparatus 14 illustrated in FIG. 4. Obviously, a configuration feature that is not necessary to execute processing according to the second exemplary embodiment may be removed from the relay apparatus 10, the terminal apparatus 12, and the apparatus 14 according to the first exemplary embodiment.

In the second exemplary embodiment, an apparatus 14 to be used for a function (a single function or a cooperative function) is received, and a different apparatus 14 to execute the function in the case where the apparatus 14 is not able to operate normally is also received. In the case where the apparatus 14 is not able to operate normally for execution of the function, the different apparatus 14 executes the cooperative function in place of the apparatus 14. Hereinafter, a different apparatus may be referred to as a "spare apparatus". Processing for receiving the apparatus 14 and the spare apparatus may be performed by the controller 26 of the relay apparatus 10 or may be performed by the controller 38 of the terminal apparatus 12. Obviously, processing for receiving the apparatus 14 and the spare apparatus may be performed by the controller 50.

In the second exemplary embodiment, the controller 26 of the relay apparatus 10 monitors an operation state of each apparatus 14 connected to the relay apparatus 10. For example, the controller 26 monitors, as an operation state of each apparatus 14, a state of the apparatus 14 as to whether or not the apparatus 14 is operating, the degree of a load of the apparatus 14, a communication state of the apparatus 14, the remaining amount of a battery loaded in the apparatus 14, a state of the apparatus 14 as to whether or not there is a failure in the apparatus 14, a state of the apparatus 14 as to whether or not there is an error in the apparatus 14, and the like. The controller 26 determines, based on the operation state of the apparatus 14 to be used for a cooperative function to be executed, whether or not the apparatus 14 is able to operate normally. In the case where the apparatus 14 is able to operate normally, the controller 26 causes the apparatus 14 to execute the function set for the apparatus 14. In the case where the apparatus 14 is not able to operate normally, the controller 26 causes the spare apparatus to execute the function in place of the apparatus 14.

A state in which the apparatus 14 is not able to operate normally represents, for example, a state in which the apparatus 14 is net able to execute a function set for the apparatus 14. Specifically, for example, a state in which the apparatus 14 is not able to execute a function to be executed because the apparatus 14 is executing a different function, a state in which the load of the apparatus 14 exceeds a threshold, a state in which a communication failure has occurred in the apparatus 14, a state in which the remaining amount of a battery loaded in the apparatus 14 has reached a value below a threshold, a state in which a failure or an error has occurred in the apparatus 14, or the like corresponds to the state in which the apparatus 14 is not able to operate normally. Furthermore, in the case where a response to information (for example, a signal for confirmation of communication, information indicating an instruction to execute a function, and the like) that has been transmitted to the apparatus 14 from the controller 26 of the relay apparatus 10 is not transmitted from the apparatus 14 to the relay apparatus 10 within a predetermined time, the controller 26 may determine that the apparatus 14 is not able to operate normally.

The spare apparatus that executes the function in place of the apparatus 14 is an apparatus that includes a function that is the same as or similar to that of the apparatus 14. The spare apparatus that includes the same function as that of the apparatus 14 is an apparatus that has the same performance as that of the apparatus 14. For example, in the case where the apparatus 14 is a camera that includes a function of photographing moving images, a different camera that includes the same performance (for example, a resolution, a viewing angle, a photographing possible time, a photographing possible range, the amount of a battery, and the like) as that of the camera corresponds to the apparatus that includes the same function as that of the apparatus 14. Furthermore, in the case where the apparatus 14 is a printer, a different printer that has the same performance (for example, supporting or non-supporting of color printing, a resolution, a printing speed, a paper size that may be used, and the like) as that of the printer corresponds to the apparatus that includes the same function as that of the apparatus 14. An apparatus that includes the same function as that of the apparatus 14 and includes another different function may also correspond to an apparatus that includes the same function as that of the apparatus 14. For example, in the case where the apparatus 14 is a printer, a multifunction apparatus (for example, an apparatus that includes an image forming function including a scan function, a copy function, and the like, as well as a print function) that includes the same performance as that of the printer may be treated as an apparatus that includes the same function as that of the apparatus 14.

A spare apparatus that includes a similar function to that of the apparatus 14 is an apparatus that has a similar performance to that of the apparatus 14 and is, for example, an apparatus that is able to obtain a result that is the same as or similar to that of the apparatus 14. For example, in the case where the apparatus 14 is a camera that includes a function of photographing moving images, a camera that has a different performance from that of the camera but includes the function of photographing moving images corresponds to an apparatus that includes a similar function to that of the apparatus 14. Furthermore, in the case where the apparatus 14 is a camera that includes a function of photographing moving images and is used to detect a person, a sensor that does not include the function of photographing moving images but is used to detect a person corresponds to an apparatus that includes a similar function to that of the apparatus 14, in terms of including the function of detecting a person. For example, an infrared sensor to detect an object (including a person), a door opening/closing sensor to be used to detect, based on opening and closing of a door, presence or absence of a person, or the like corresponds to an apparatus that includes a similar function to that of a camera, in terms of including the function of detecting a person.

For example, a spare apparatus may be specified by a user who sets a cooperative function or a single function or may be selected without specification by a user. For example, an apparatus that includes a function that is the same as or similar to that of the apparatus 14 to be used for a cooperative function or a single function is specified as a spare apparatus by a user.

The second exemplary embodiment will be explained in detail below by way of specific examples.

FIG. 18 illustrates an example of an apparatus management table. The apparatus management table corresponds to an example of the apparatus management information 20 stored in the relay apparatus 10. In the apparatus management table, apparatuses 14 that are connected to the relay apparatus 10 are registered. A configuration of the apparatus management table is the same as the configuration of the apparatus management table illustrated in FIG. 5. For example, cameras G and H and a robot J are connected to the relay apparatus 10 by the user A.

Also in the second exemplary embodiment, a different apparatus may be connected to the apparatus 14. In this case, as in the first exemplary embodiment, an apparatus management table for managing the different apparatus that is connected to the apparatus 14 is created and stored in the apparatus 14.

FIG. 19 illustrates an example of the function management table. The function management table corresponds to an example of the function management information 22 stored in the relay apparatus 10. In the function management table, a function (a single function or a cooperative function) that is set for the apparatus 14 that is connected to the relay apparatus 10 is registered. A configuration of the function management table is basically the same as the configuration of the function management table illustrated in FIG. 6. However, in the case where a spare apparatus is set, information regarding the spare apparatus is registered in the function management table.

In the function management table according to the second exemplary embodiment, for example, a function ID for identifying a function, a user ID for identifying a user who has set the function, apparatus identification information for identifying an apparatus to be used for the function, and information indicating contents of the function are associated with one another. Furthermore, in the case where a spare apparatus is set for the function, apparatus identification information for identifying the spare apparatus and information indicating a function to be executed using the spare apparatus in place of the apparatus (hereinafter, referred to as a "spare function") are registered in the function management table.

Specifically, for example, a cooperative function that is able to be executed using the camera G and the robot J as apparatuses 14 is set by the user A. The cooperative function is a function of "causing the robot J to travel to a place (where a suspicious person is detected) when the camera C detects the suspicious person". Furthermore, the camera H is specified as a spare apparatus that substitutes for the camera G, and the camera H is registered as a spare apparatus in the function management table. Furthermore, contents of a spare function that is executed using the camera H are registered in the function management table. The spare function is a function of "causing the robot J to travel to the place where the suspicious person is detected, based on a detection result by the camera H, when the camera G does not operate normally."

Figure 20:
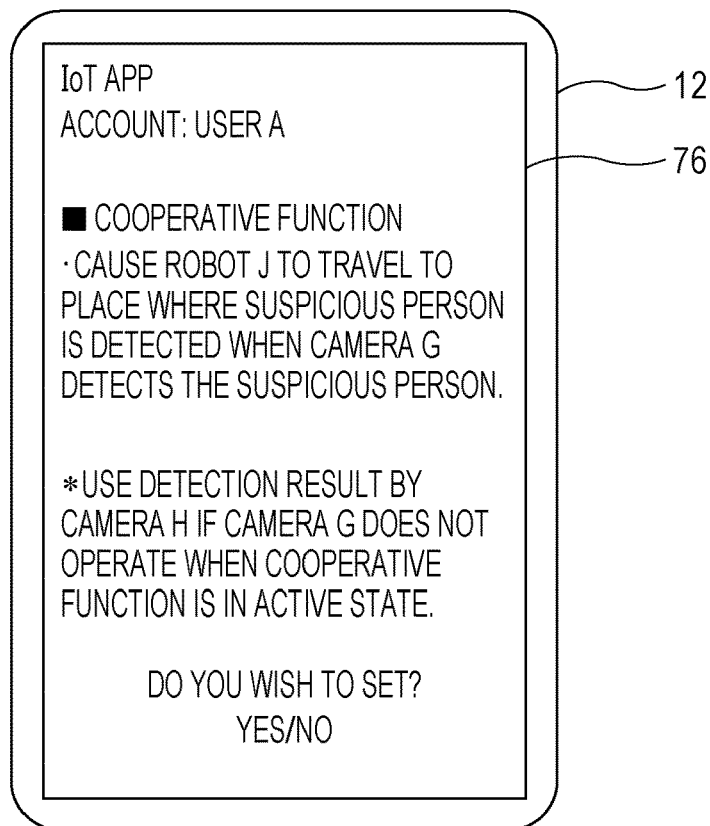
FIG. 20 is a diagram illustrating a function setting screen.

An operation for setting a function will be explained below with reference to FIG. 20. FIG. 20 illustrates a function setting screen 76. The function setting screen 76 is a screen (a reception screen for receiving a function) for setting a function (a single function or a cooperative function). On the function setting screen 76, a function, an apparatus 14 to be used for the function, and a spare apparatus are set. Regarding settings other than setting for a spare apparatus, a setting method for an apparatus 14 and a function on the function setting screen 76 is the same as the setting method on the function setting screen 58 illustrated in FIG. 9.

For example, when the user A operates the UI unit 34 of a terminal apparatus 12 to issue an instruction to execute function setting software, the controller 38 of the terminal apparatus 12 executes a function setting program. Accordingly, the function setting screen 76 is displayed on the UI unit 34. On the function setting screen 76, the user A specifies one or more apparatuses 14, a function to be executed by the one or more apparatuses 14, and one or more spare apparatuses to execute the function in place of the one or more apparatuses 14. In the example illustrated in FIG. 20, the camera G and the robot J are specified as apparatuses 14, and a function of "causing the robot J to travel to a place (where a suspicious person is detected) when the camera G detects the suspicious person" is specified as a cooperative function to be executed using the camera G and the robot J. In this example, the cooperative function is specified. However, a single function may be specified.

Furthermore, the camera H is specified as a spare apparatus by the user A. As a function to be executed using the spare apparatus, a function of "causing the robot J to travel to the place where the suspicious person is detected, based on a detection result by the camera H, in the case where the camera G does not operate when the cooperative function is in an active state" is specified. A state in which a cooperative function is in an active state represents a state in which the cooperative function is ON. That is, even in the case where a cooperative function is set and registered in the function management table, when the cooperative function is set to OFF, the cooperative function is not executed. When the cooperative function is set to ON (active), the cooperative function is executable.

When the user A specifies setting of a function on the function setting screen 76 (for example, the user A presses a "Yes" button), the terminal apparatus 12 transmits function setting specification information to the relay apparatus 10. The setting specification information includes information indicating a cooperative function (a function of "causing the robot J to travel to a place where a suspicious person is detected when the camera G detects the suspicious person"), apparatus identification information of the apparatuses 14 (the camera G and the robot J) to be used for the cooperative function, information indicating a spare function (a function of "causing the robot J to travel to the place where the suspicious person is detected, based on a detection result by the camera H"), apparatus identification information of the spare apparatus (the camera H), and user identification information of the user A.

When the relay apparatus 10 receives the setting specification information described above, the function management unit 30 of the relay apparatus 10 registers each piece of information included in the setting specification information into the function management table. Accordingly, the cooperative function and the spare function are registered in the function management table, so that the user A is able to execute the cooperative function and the spare function. In the function management table illustrated in FIG. 19, contents included in the setting specification information are registered.

The apparatus 14 and the spare apparatus used for a cooperative function or a single function are selected from an apparatus group connected to the relay apparatus 10. The apparatuses 14 connected to the relay apparatus 10 are registered in the apparatus management table illustrated in FIG. 18. The apparatus 14 and the spare apparatus to be used for a cooperative function or a single function are selected from the apparatus group registered in the apparatus management table.

When a cooperative function is set as described above, image data (moving image data or a static image data) captured by the camera G is transmitted from the camera G to the relay apparatus 10. The controller 26 of the relay apparatus 10 executes, for example, software to detect a suspicious person, based on the image data. Accordingly, a function of detecting a suspicious person based on image data is executed. When a suspicious person is detected, the controller 26 controls the robot u to travel to a place where the suspicious person is detected.

Meanwhile, the controller 26 of the relay apparatus 10 monitors an operation state of the camera G, and determines whether or not the camera G is able to operate normally. In the case where the camera G is able to operate normally, the controller 26 uses a detection result by the camera G for detection of a suspicious person. In the case where the camera G is not able to operate normally, the controller 26 uses a detection result by the camera H, in place of a detection result by the camera G, for detection of a suspicious person. For example, in the case where image data is not transmitted from the camera G to the relay apparatus 10 or in the case where the communication condition between the camera G and the relay apparatus 10 is unstable, the controller 26 uses a detection result by the camera H, in place of a detection result by the camera G. In this case, the controller 26 detects a suspicious person, based on image data transmitted from the camera H to the relay apparatus 10. In the case where a suspicious person is detected, the controller 26 controls the robot J to travel to the place where the suspicious person is detected.

As described above, according to the second exemplary embodiment, even in the case where an apparatus 14 to be used for a cooperative function is not able to operate normally, the cooperative function is able to be executed using a spare apparatus. Accordingly, a result that is the same as or equivalent to that obtained when the apparatus 14 is used may be attained.

Figure 21:
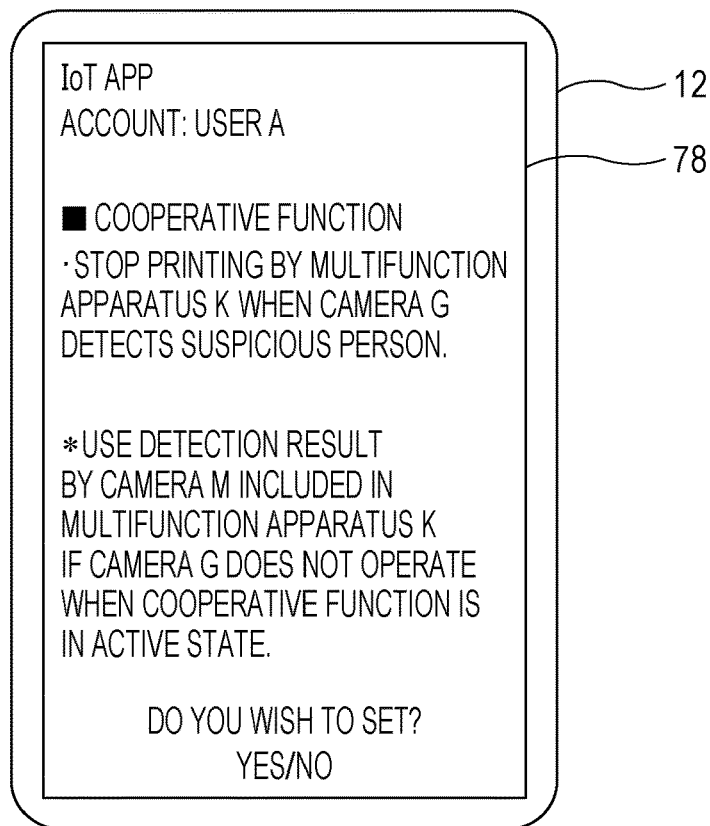
FIG. 21 is a diagram illustrating a function setting screen.

An apparatus to be used for a cooperative function may be received as a spare apparatus, so that a spare function may be executed using the apparatus. This processing will be explained in detail with reference to FIG. 21. FIG. 21 illustrates a function setting screen 78. The function setting screen 78 corresponds to a reception screen for receiving a function. On the function setting screen 78, a function, an apparatus to be used for the function, and a spare apparatus are set. In the example illustrated in FIG. 21, the camera G and a multifunction apparatus K (an image forming apparatus including at least a print function) are specified as apparatuses 14, and a function of "stopping printing by the multifunction apparatus K when the camera G detects a suspicious person" is specified as a cooperative function to be executed using the camera G and the multifunction apparatus K. In this example, the cooperative function is specified. However, a single function may be specified.

Furthermore, a camera H loaded in the multifunction apparatus K is specified as a spare apparatus by the user A. That is, the multifunction apparatus K includes the camera H serving in place of the camera G, and the camera H is specified as a spare apparatus. As a function to be executed using the spare apparatus, a function of "using a detection result by the camera H loaded in the multifunction apparatus K and stopping printing by the multifunction apparatus K, in the case where the camera G does not operate when a cooperative function is in an active state" is specified.

As a spare apparatus, a different camera or a sensor included in the camera G may be specified by the user A. For example, in the case where the camera G includes plural cameras, at least one of the plural cameras may be specified as an apparatus to be used for a cooperative function and a different camera may be specified as a spare apparatus. As another example, in the case where the camera G includes a camera that includes a function of photographing images such as moving images and static images and a sensor such as a human sensor or the like, the camera may be specified as an apparatus to be used for a cooperative function and the sensor may be used as a spare apparatus. That is, a different apparatus included in an apparatus to be used for a cooperative function may be used as a spare apparatus. In other words, a different apparatus included in a partially defective apparatus may be set as a spare apparatus.

When the user A specifies setting of a function on the function setting screen 78, the cooperative function and a spare function are registered in the function management table, and the user A is able to execute the cooperative function and the spare function.

After the cooperative function is set as described above, when a suspicious person is detected based on image data captured by the camera G, the controller 26 of the relay apparatus 10 stops printing by the multifunction apparatus K. Furthermore, when the camera G is not able to operate normally, the controller 26 uses a detection result by the camera M that is loaded in the multifunction apparatus K for detection of a suspicious person, in place of a detection result by the camera G. When a suspicious person is detected based on the image data captured by the camera N, the controller 26 stops printing by the multifunction apparatus K.

As described above, as a spare apparatus for executing a cooperative function in the case where a certain apparatus (in the above example, the camera G) out of plural apparatuses 14 to be used for the cooperative function is not able to operate normally, an apparatus 14 (in the above example, the camera N) out of the plural apparatuses 14 is received. Accordingly, in the case where the certain apparatus 14 is not able to operate normally, the apparatus 14 out of the apparatuses 14 executes the cooperative function as the spare apparatus, and a result that is the same as or equivalent to that obtained in the case where the certain apparatus 14 is used may be attained.

Even when a defect occurs in an apparatus 14 to be used for a function and the apparatus 14 is not able to operate normally, the apparatus 14 may be recovered later and thus become able to operate normally. Processing performed in this case will be explained below.

For example, a defect occurs in an apparatus 14 specified as an apparatus to be used for a cooperative function, and the apparatus 14 thus becomes unable to operate normally. Therefore, a spare apparatus executes the cooperative function. In the case where the apparatus 14 is recovered and thus becomes able to operate normally during execution of the cooperative function, the controller 26 of the relay apparatus 10 stops execution of the cooperative function by the spare apparatus, and causes the apparatus 14 to execute the cooperative function. A defect may be, for example, disconnection of communication, an insufficient remaining amount of a battery, a failure of a component, an error state (for example, occurrence of a jam in a multifunction apparatus or the like), or the like. Recovery may be, for example, recovery of communication (communication may be performed), resolution of an insufficient remaining amount of a battery, replacement of a defective component, resolution of an error state, or the like.

In the case where the relay apparatus 10 receives a signal indicating recovery or a signal indicating a reconnection request from the apparatus 14 in which the defect has occurred, the controller 26 of the relay apparatus 10 cancels execution of the cooperative function by the spare apparatus, and causes the recovered apparatus 14 to execute the cooperative function. The spare apparatus is recovered to the original state (a state before interruption of execution of a spare function occurs).

The controller 26 may cause the recovered apparatus 14 to execute part of the processing contents of the cooperative function that has not been executed by the spare apparatus or may cause the recovered apparatus 14 to execute the whole processing contents.

(Second Modification)

A second modification will be explained below. The second modification is a modification according to the second exemplary embodiment. In the second modification, a spare apparatus is recommended to a user. The second modification will be explained in detail below.

Figure 22:
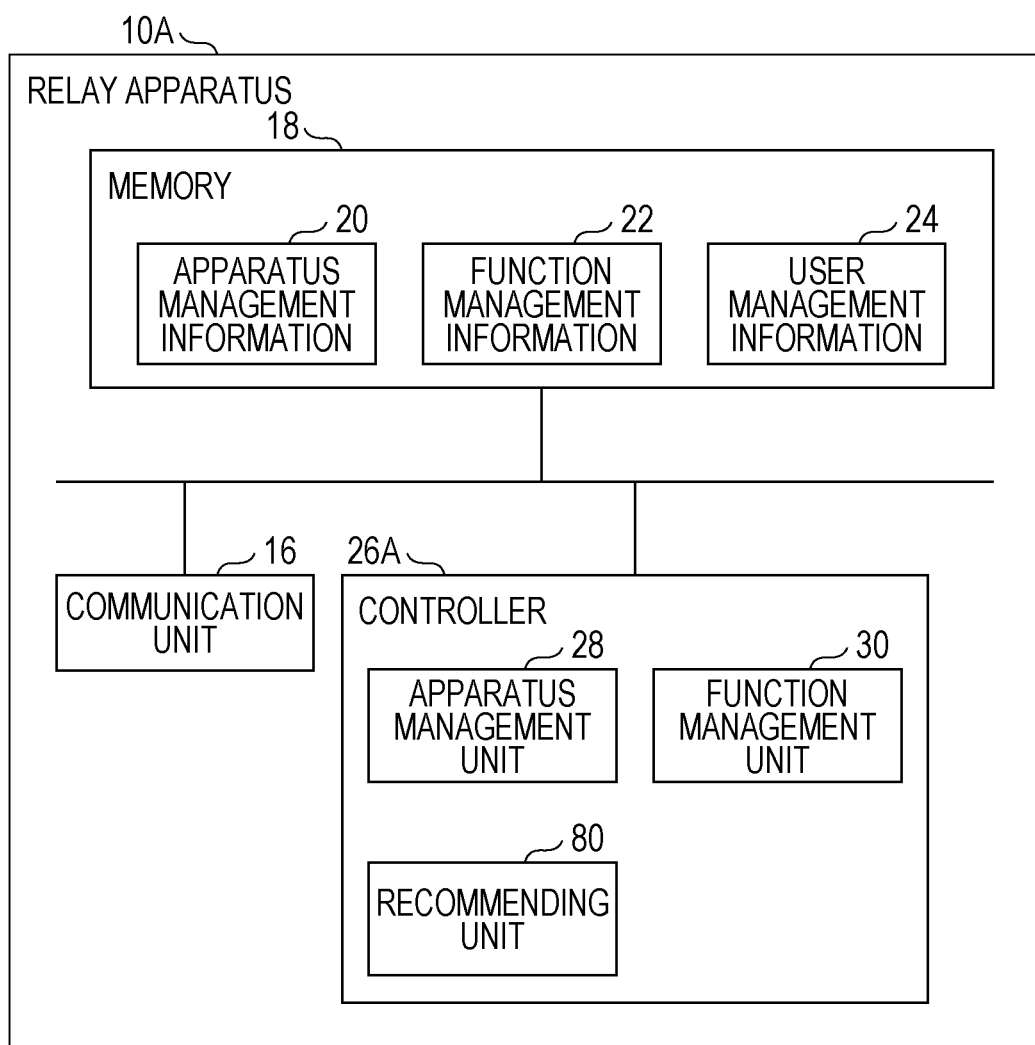
FIG. 22 is a block diagram illustrating a configuration of a relay apparatus according to a second modification.

FIG. 22 illustrates a configuration of a relay apparatus 10A according to the second modification. The relay apparatus 10A includes a controller 26A in place of the controller 26 included in the relay apparatus 10. Configuration features of components other than the controller 26A are the same as those of the relay apparatus 10.

The controller 26A includes the apparatus management unit 28, the function management unit 30, and a recommending unit 80. The apparatus management unit 28 and the function management unit 30 included in the controller 26A are the same as the apparatus management unit 28 and the function management unit 30 included in the controller 26, and therefore, explanation for the apparatus management unit 28 and the function management unit 30 included in the controller 26A will be omitted. The recommending unit 80 will be explained in detail below.

The recommending unit 80 is configured to recommend a spare apparatus to a user. For example, the recommending unit 80 may display a list of spare apparatuses on the function setting screen or may output sound representing information regarding spare apparatus. A user who is recommended an apparatus may specify the recommended apparatus as a spare apparatus or may specify a non-recommended apparatus as a spare apparatus.

For example, the recommending unit 80 recommends an apparatus 14 that includes a function that is the same as or similar to that of an apparatus 14 specified by a user to be used for a function (single function or a cooperative function) specified by the user, from among an apparatus group included in the information processing system, as a spare apparatus. For example, in the case where a camera that is able to photograph moving images is specified as an apparatus 14 to be used for a cooperative function, the recommending unit 80 recommends a different camera that is able to photograph moving images as a spare apparatus. Information (for example, an image, a name, or the like) indicating the spare apparatus may be displayed on the function setting screen or may be output as sound.

As described above, by recommending, as a spare apparatus, an apparatus 14 that includes a function that is the same as or similar to that of an apparatus 14 specified to be used for a function, a result by the function or an equivalent result is easily obtained, compared to a case where the spare apparatus is not recommended.

Furthermore, the recommending unit 80 may recommend a spare apparatus according to priority. A spare apparatus recommended according to priority is an apparatus 14 that includes a function that is the same as or similar to that of an apparatus 14 to be used for the function, as in the description provided above. Priority is determined, for example, based on attributes of an apparatus 14. The attributes of an apparatus 14 are, for example, a place where the apparatus 14 is installed, an operation range of the apparatus 14, the performance of the apparatus 14, an operation state of the apparatus 14, the usage charge of the apparatus 14, permission or prohibition of the use of the apparatus 14, and the like. For example, the attributes (installed place and the like) of an apparatus 14 are managed by the apparatus management table. By referring to the apparatus management table, the recommending unit 80 recommends a spare apparatus according to the priority based on the attributes of the apparatus 14. For example, the recommending unit 80 recommends a higher-priority spare apparatus more preferentially. Specifically, the recommending unit 80 may display, in the list of spare apparatuses, a higher-priority spare apparatus in an upper position in the list or may display a spare apparatus with a priority level equal to or more than a threshold and may not display a spare apparatus with a priority level less than the threshold.

The apparatus management table according to the second modification will be explained below with reference to FIG. 23. FIG. 23 illustrates an example of the apparatus management table according to the second modification. The apparatus management table is stored as the apparatus management information 20 in the memory 18 of the relay apparatus 10A. In the apparatus management table, for example, an apparatus ID, a user ID, the name of the apparatus 14, apparatus address information, information indicating a function included in the apparatus 14, information indicating a place where the apparatus 14 is installed, information indicating an operation range of the apparatus 14, information indicating the performance of the apparatus 14, information indicating an operation state of the apparatus 14, information indicating the usage charge of the apparatus 14 are associated with one another. The above information is registered in the apparatus management table by the apparatus management unit 28, for example, when the apparatus 14 is connected to the relay apparatus 10A. For example, the above information may be transmitted to the relay apparatus 10A from the apparatus 14 connected to the relay apparatus 10A or may be transmitted to the relay apparatus 10A from a terminal apparatus 12 linked with the user who has issued an instruction for the connection. Furthermore, the apparatus management unit 28 of the relay apparatus 10A may periodically acquire the above information from the apparatus 14 and update the contents of the apparatus management table at a predetermined, timing or a timing specified by the user, an administrator, or the like, by monitoring the apparatus 14 connected to the relay apparatus 10A. Furthermore, the apparatus management unit 28 may use the Internet or the like to acquire the above information. The contents of the apparatus management table will be explained in detail below.

Information indicating the place where the apparatus 14 is installed is positional information of the apparatus 14 and may be, for example, information indicating the position of the apparatus 14 identified by a global positioning system (GPS), information indicating a place (a room, a floor number, or the like) in a building where the apparatus 14 is installed, or information indicating the address in which the apparatus 14 is installed or may include information indicating the height from the ground.

The operation range of the apparatus 14 is, for example, the photographing range of a camera, the travelling range of a robot, or the like. Information indicating the operation range may be information indicating the range of a position specified by a GPS, information indicating the range of a position in a building, or information indicating an address, or may include information indicating the height from the ground.

The performance of the apparatus 14 represents, for example, the processing speed (for example, the calculation speed) in an information processing apparatus such as a PC, the printing speed by a printer, the travelling speed of a movable apparatus 14 (for example, the travelling speed of a robot), the photographing capability of a camera (for example, capability of photographing moving images, capability of color photographing, or the like), the display size and resolution of a display device, the capacity of a memory device (total capacity, remaining capacity, and the like), and the like.

Information indicating the operation state of the apparatus 14 is information indicating the current operation state of the apparatus 14 and indicates, for example, a running state (in-process), a stopped state, an out-of-order state, a maintenance state, a sleep-mode state, an activation-in-process state, a shutdown state, or the like. Furthermore, information indicating the operation state may include information indicating the operation load of the apparatus 14. The operation load may be calculated, for example, based on the contents of processing being executed.

The usage charge of the apparatus 14 is a charge to use the apparatus 14. Obviously, the apparatus 14 may be used for free. The usage charge may be per usage hour or may be fixed charge.

Recommendation according to the priority based on the attributes of an apparatus 14 will be explained in detail below.

(Recommendation According to Priority Based on Installed Place)

Recommendation according to the priority based on a place where an apparatus 14 is installed will be explained below. For example, by comparing installed places of apparatuses 14 included in the apparatus management table, the recommending unit 80 calculates the positional relationship (a distance, a direction, and the like) between an apparatus 14 specified by a user to be used for a function (a single function or a cooperative function) and a different apparatus 14. Then, the recommending unit 80 more preferentially recommends a different apparatus 14 that is installed at a position closer to the apparatus 14 to be used for the function as a spare apparatus. That is, the recommending unit 80 sets a higher priority level to a different apparatus 14 that is installed at a position closer to the apparatus 14 to be used for the function, and recommends a spare apparatus according to the priority of each apparatus 14.

Installed places of some apparatuses 14 may affect execution and usage of a function. For example, in the case where a multifunction apparatus is specified as an apparatus 14 to be used for a function, the place where the multifunction apparatus is installed may affect the usage of the function. That is, depending on the room and the floor where the multifunction apparatus is installed, usage of the function may be substantially unavailable or the function may not be user-friendly. Furthermore, in the case where a monitoring camera is specified as an apparatus 14 to be used for a function, an originally assumed place is not photographed depending on the place where the monitoring camera as a spare apparatus is installed, and therefore, an originally assumed result may not be obtained. In order to cope with this situation, as described above, by more preferentially recommending, as a spare apparatus, a different apparatus 14 that is installed at a position closer to an apparatus 14 specified by a user to be used for a function, influence of the installed place of the apparatus 14 may be reduced, and a result obtained by the specified function or an equivalent result may be easily obtained, compared to a case where a spare apparatus is recommended without according to the priority based on the installed place of the apparatus 14.

(Recommendation According to Priority Based on Operation Range)

Recommendation according to the priority based on the operation range of an apparatus 14 will be explained below. The recommending unit 80 performs comparison between operation ranges of apparatuses 14 included in the apparatus management table to calculate the relationship of operation ranges (for example, overlapping parts of operation ranges of an apparatus 14 specified by a user to be used for a function (a single function or a cooperative function) and a different apparatus 14. Then, the recommending unit 80 more preferentially recommends, as a spare apparatus, a different apparatus 14 that has a larger overlapping part of the operation range with respect to the apparatus 14 specified by the user to be used for the function. That is, the recommending unit 80 sets a higher priority level to a different apparatus 14 that has a larger overlapping part of the operation range with respect to the apparatus 14 to be used for the function, and recommends a spare apparatus according to the priority of each apparatus 14.

The operation range of some apparatuses 14 may affect execution and usage of a function. For example, in the case where a monitoring camera is specified as an apparatus 14 to be used for a function, depending on the photographing range of the monitoring camera as a spare apparatus, an originally assumed place is not photographed, and therefore, an originally assumed result may not be obtained. Furthermore, in the case where a movable robot is specified as an apparatus 14 to be used for a function, depending on the travelling range of the robot as a spare apparatus, an operation at an originally assumed place is not performed, and therefore, an originally assumed result may not be obtained. In order to cope with this situation, as described above, by more preferentially recommending, as a spare apparatus, a different apparatus 14 that has a larger overlapping part of the operation range (for example, a photographing range or a travelling range) with respect to the apparatus 14 specified by the user to be used for the function, influence of the operation range of the apparatus 14 may be reduced, and a result obtained by the specified function or an equivalent result may be easily obtained, compared to a case where a spare apparatus is recommended without according to the priority based on the operation range of the apparatus 14.

Figure 24:
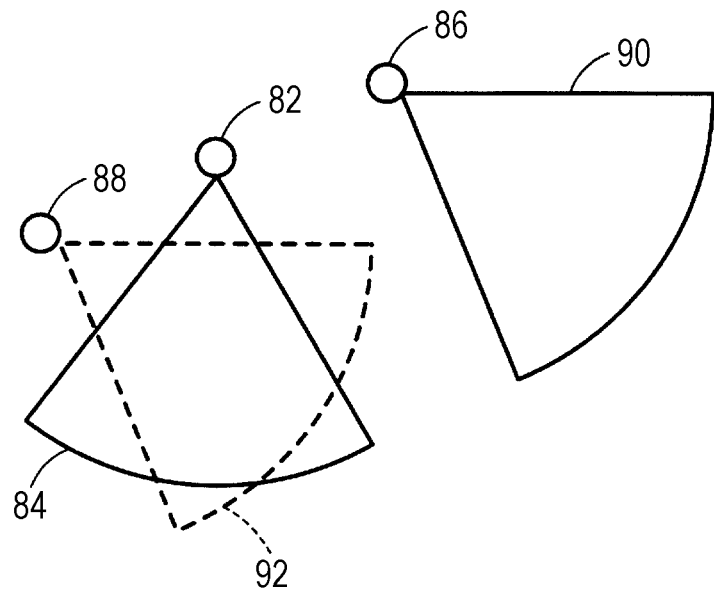
FIG. 24 is a diagram illustrating a photographing range of a monitoring camera.

Priority based on an operation range will be explained further in detail below with reference to FIG. 24. FIG. 24 illustrates a photographing range of a monitoring camera as an apparatus 14.

For example, a monitoring camera 82 is specified by a user as an apparatus 14 to be used for a function specified by the user. The monitoring camera 82 includes a function of photographing a photographing range 84 as an operation range. Monitoring cameras 86 and 88 are connected as monitoring cameras other than the monitoring camera 82 to the relay apparatus 10A. The monitoring camera 86 includes a function of photographing a photographing range 90 as an operation range. The monitoring camera 88 includes a function of photographing a photographing range 92 as an operation range. The photographing range 92 of the monitoring camera 88 and the photographing range 84 of the monitoring camera 82 partially overlap. However, the photographing range 90 of the monitoring camera 86 and the photographing range 84 of the monitoring camera 82 do not overlap. In this case, the recommending unit 80 recommends the monitoring camera 88 as a spare apparatus. Accordingly, even in the case where the monitoring camera 82 becomes unable to operate normally, a result that is the same as or a similar to that obtained in the case where the monitoring camera 82 is used may be obtained using the monitoring camera 88 as a spare apparatus.

Figure 25:
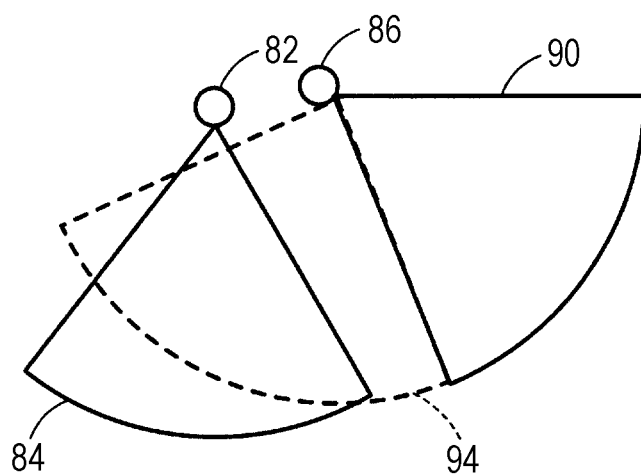
FIG. 25 is a diagram illustrating a photographing range of a monitoring camera.

Furthermore, in the case where an apparatus 14 includes a function of changing the operation range, the operation range of the apparatus 14 specified as a spare apparatus may be changed, and then, the specified function may be executed. This processing will be explained in detail with reference to FIG. 25. FIG. 25 illustrates a photographing range of a monitoring camera as an apparatus 14. For example, the monitoring camera 86 includes a function of photographing a photographing range including the photographing range 90 and the photographing range 94. The photographing range 94 and the photographing range 84 overlap, and therefore, the recommending unit 80 recommends the monitoring camera 86 as a spare apparatus. In this case, while the monitoring camera 86 does not operate as a spare apparatus, the monitoring camera 86 photographs the photographing range 90, whereas while the monitoring camera 86 operates as a spare apparatus, the monitoring camera 86 photographs the photographing range 90 and the photographing range 94. That is, the monitoring camera 86 performs photographing while enlarging its own photographing range. Accordingly, even in the case where the monitoring camera 82 is unable to operate normally, a result that is the same as or similar to that obtained in a case where the monitoring camera 82 is used may be obtained by using the monitoring camera 86 as a spare apparatus.

In the case where photographing ranges of plural monitoring cameras overlap with the photographing range of the monitoring camera 82, the recommending unit 80 more preferentially recommends a monitoring camera that has a larger overlapping part of the photographing range.

(Recommendation According to Priority Based on Performance)

Recommendation according to the priority based on the performance of an apparatus 14 will be explained below. For example, the recommending unit 80 performs comparison between performances of apparatuses 14 included in the function management table to more preferentially recommend, as a spare apparatus, a different apparatus 14 that has a performance closer to that of an apparatus 14 specified by a user to be used for a function. That is, the recommending unit 80 sets a higher priority level to a different apparatus 14 that has a performance closer to the apparatus 14 specified by the user to be used for the function, and recommends a spare apparatus according to the priority of each apparatus 14.

For example, in the case where an apparatus 14 to be used for a function is a camera (for example, a camera that is able to photograph moving images) to be used to detect a person, the recommending unit 80 recommends, as spare apparatuses, apparatuses 14 according to, for example, the priority order of a different camera having the same performance as the camera, a different camera that is able to perform photographing of only static images, and an infrared sensor that is not able to perform photographing of images but is able to be used to detect a person. That is, a different camera that is able to perform photographing of moving images is recommended as a spare apparatus with the highest priority level, a different camera that is able to perform photographing of only static images is recommended as a spare apparatus with the second highest priority level, and an infrared sensor is recommended as a spare apparatus with the lowest priority level.

As described above, by recommending a spare apparatus according to the priority based on performance, a result obtained by a specified function or an equivalent result may be easily obtained.

Furthermore, the recommending unit 80 may more preferentially recommend, as a spare apparatus, an apparatus 14 with a higher performance. For example, the recommending unit 80 may set a higher priority level to an apparatus 14 that performs calculation processing more quickly, may set a higher priority level to an apparatus 14 with a faster printing speed, may set a higher priority level to an apparatus 14 with a higher communication speed, or may set a higher priority level to an apparatus 14 with a larger memory capacity. Accordingly, the function is able to be executed using a spare apparatus with a higher performance.

To an apparatus 14 that executes a function not affected by an installed place, the recommending unit 80 may recommend a spare apparatus according to the priority based on performance.

(Recommendation according to Priority Based on Operation State)

Recommendation according to the priority based on the operation state of an apparatus 14 will be explained below. The recommending unit 80 may refer to the apparatus management table to set g higher priority level to a different apparatus 14 that is not performing processing, set a higher priority level to a different apparatus 14 with a lower operation load, set a lower priority level to a different apparatus 14 in an out-of-order state or maintenance state, or set a lower priority level to a different apparatus 14 in a power-off state. By setting the priority based on the operation state as described above, a different apparatus 14 that is not performing processing or a different apparatus 14 with a lower operation load may be easily specified as a spare apparatus.

(Recommendation According to Priority Based on Usage Charge)

Recommendation according to the priority based on the usage charge of an apparatus 14 will be explained below. The recommending unit 80 refers to the apparatus management table to set a higher priority level to an apparatus 14 with a lower usage charge. Accordingly, a different apparatus 14 with a lower usage charge may be easily specified as a spare apparatus.

For example, the recommending unit 80 may recommend a spare apparatus according to the priority based on an attribute specified by a user or the priority based on a predetermined attribute.

As recommendation methods different from those described above, the recommending unit 80 may recommend a different apparatus 14 that a user is allowed to use as a spare apparatus. For example, the apparatus management unit 28 manages a user who is able to use each apparatus 14, and the recommending unit 80 recommends a different apparatus 14 that a user is allowed to use as a spare apparatus, based on management contents. Specifically, the apparatus management unit 28 manages, for each apparatus 14, apparatus management information of the apparatus 14 and user identification information of a user who is allowed to use the apparatus 14, in association with each other. Information indicating the association is stored in the memory 18. The recommending unit 80 refers to the information indicating the association to recommend a different apparatus 14 that a user is allowed to use as a spare apparatus. Accordingly, a spare apparatus that a user is actually allowed to use is recommended.

Third Exemplary Embodiment

An information processing system according to a third exemplary embodiment of the present invention will be explained below. In the third exemplary embodiment, a period (hereinafter, referred to as an "execution period") during which a function (a single function or a cooperative function) is executed is defined, and the function is executed during the execution period. In the case where a trigger to activate the function is defined, when the trigger occurs during the execution period, the function is executed. In the case where the set execution period is not appropriate, recommendation for change of the execution period is notified.

Furthermore, a place where a function is executed (hereinafter, referred to as an "execution place") is defined, and the function is executed at the execution place. In the case where a trigger to activate the function is defined, when the trigger occurs at the execution place, the function is executed. In the case where the set execution place is not appropriate, recommendation for change of the execution place is notified.

Both the execution period and the execution place may be set or only one of the execution period and the execution place may be set.

Figure 26:
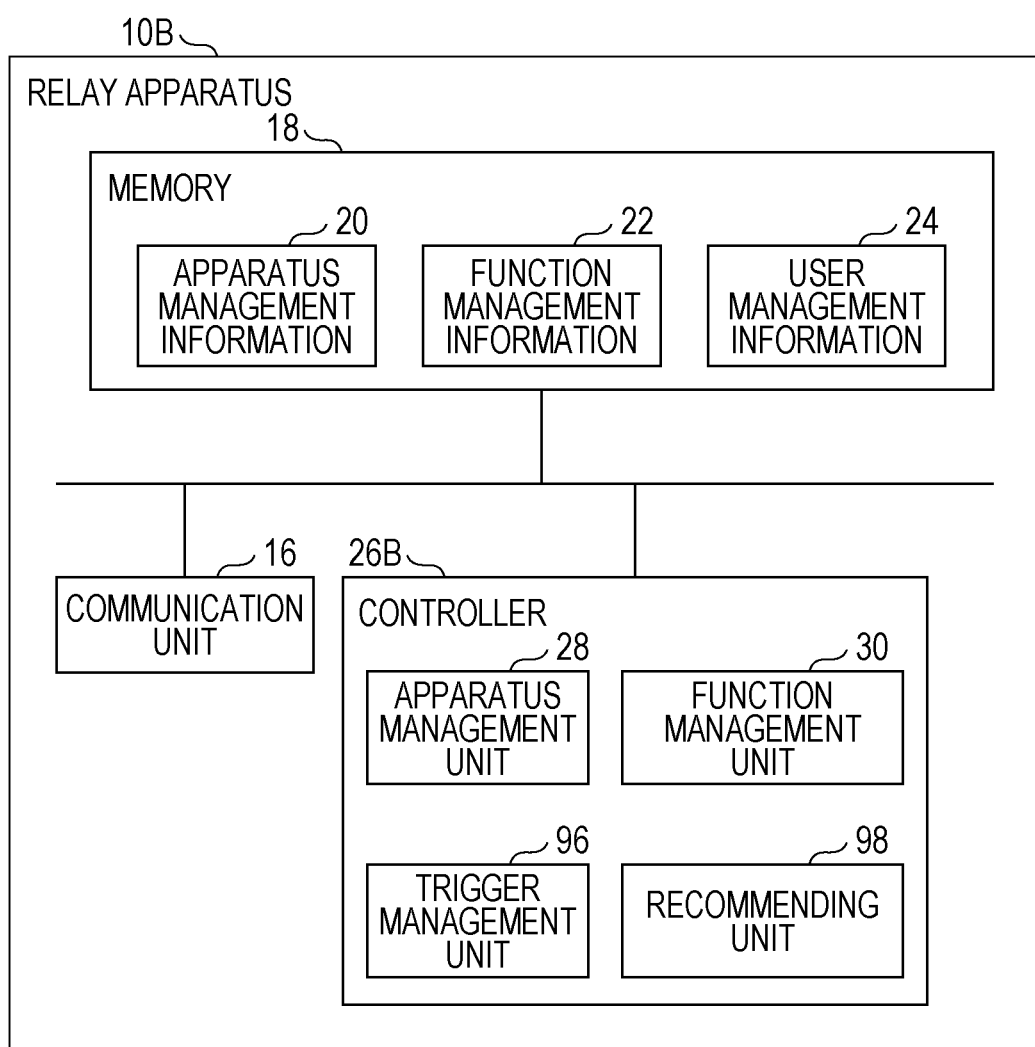
FIG. 26 is a block diagram illustrating a configuration of a relay apparatus according to a third exemplary embodiment.

FIG. 26 illustrates a configuration of a relay apparatus 103 according to the third exemplary embodiment. The information processing system according to the third exemplary embodiment includes the relay apparatus 103 in place of the relay apparatus 10 according to the first exemplary embodiment. Configuration features of components other than the relay apparatus 103 are the same as those of the information processing system according to the first exemplary embodiment.

The relay apparatus 103 includes a controller 26B in place of the controller 26 included in the relay apparatus 10. Configuration features of components other than the controller 26B are the same as those of the relay apparatus 10.

The controller 26B includes the apparatus management unit 28, the function management unit 30, a trigger management unit 96, and a recommending unit 98. The apparatus management unit 28 included in the controller 26B is the same as the apparatus management unit 28 included in the apparatus management unit 28. Therefore, explanation for the apparatus management unit 28 included in the controller 26B will be omitted.

In the third exemplary embodiment, the function management unit 30 is further configured to manage the execution period of a function (a single function or a cooperative function). For example, a user specifies the execution period, and a function for which the execution period is set is received. The reception processing may be performed by the controller 26B of the relay apparatus 10B or may be performed by the controller 38 of the terminal apparatus 12. The function management unit 30 registers information indicating the execution period into the function management information 22. In the case where an execution period is set for a function to be executed, the function is executed during the execution period. An execution period may be specified, for example, as a time zone, a day of a week, or a date.

The function management unit 30 may further be configured to manage the execution place of a function (a single function or a cooperative function). For example, a user specifies an execution place, and a function for which the execution place is set is received. The reception processing may be performed by the controller 26B of the relay apparatus 10B or may be performed by the controller 38 of a terminal apparatus 12. The function management unit 30 registers information indicating the execution place into the function management information 22. In the case where an execution place is set for a function to be executed, the controller 26B executes the function at the execution place. Information indicating an execution place may be, for example, information indicating a position identified by a GPS, information indicating a place (a room, a floor number, or the like) in the building, or information indicating an address or may include information indicating the height from the ground.

The trigger management unit 96 is configured to manage occurrence of a trigger to activate a function. For example, the trigger management unit 96 calculates the occurrence frequency of a trigger and manages the occurrence frequency. A trigger is, for example, detection of a specific event by an apparatus 14 to be used for a function, and more specifically, detection of a specific object (for example, a person, a substance, or the like) by a sensor (for example, a camera, an infrared sensor, or the like) as an apparatus 14, detection of temperature equal to or more than a threshold or temperature less than the threshold by a temperature sensor as an apparatus 14, detection of humidity equal to or more than a threshold or humidity less than the threshold by a humidity sensor as an apparatus 14, detection of specific time by an apparatus 14, or the like. The occurrence frequency of a trigger represents, for example, information based on detection results by an apparatus 14 to be used for a function.

The trigger management unit 96 may calculate, as the occurrence frequency of a trigger, for example, the number of times that a trigger has occurred per unit period or a statistic (for example, an average, an expectation, or the like) of the numbers of times that a trigger has occurred per unit period during a predetermined period. A unit period is defined by, for example, in units of seconds, in units of minutes, in units of hours, in units of days, in units of weeks, in units or months, in units of years, in units of days of a week, or the like. A unit may be determined in advance or may be changed by a user, an administrator, or the like. Furthermore, the trigger management unit 96 may apply weighting processing corresponding to contents of a trigger to the number of times that the trigger has occurred and define a value as an applied result as the occurrence frequency of the trigger. For example, a weighting coefficient is defined in advance for each trigger, and the trigger management unit 96 multiplies the number of times that the trigger has occurred by the weighting coefficient, and defines a value obtained as a result of the multiplication as the occurrence frequency of the trigger. For example, a weighting coefficient of a trigger with a higher emergency may be set to a value higher than a weighting coefficient of a trigger with a lower emergency. Accordingly, even if the numbers of times that various triggers occur are the same, the occurrence frequency of a trigger with a higher emergency is likely to be higher than the occurrence frequency of a trigger with a lower emergency. For example, a trigger based on a detection result by a monitoring camera, a trigger based on a detection result by a fire alarm, or the like may be defined as a trigger with high emergency. In addition, a weighting coefficient for a trigger with high importance may be set to a value higher than a weighting coefficient for a trigger with low importance. The degree of importance may be set by, for example, a user, an administrator, or the like. The trigger management unit 96 detects occurrence frequency for each trigger and causes information indicating the occurrence frequency of each trigger to be stored in the memory 18. For example, the trigger management unit 96 detects the occurrence frequency of a trigger for each sensor that detects a trigger and causes information indicating the occurrence frequency of the trigger for each sensor to be stored in the memory 18.

For example, the apparatus 14 temporarily or permanently stores data obtained by the apparatus 14, and, every time that the apparatus 14 receives data, transmits the data to the relay apparatus in at a predetermined timing, in accordance with an acquisition request from the relay apparatus in, or periodically. Obviously, the apparatus 14 may transmit the data to the relay apparatus 10B without storing the data. For example, a camera that photographs moving images transmits data of a moving image to the relay apparatus 10B. Furthermore, various sensors (for example, a temperatures sensor, a humidity sensor, a door opening/closing sensor, an infrared sensor, and the like) transmit information indicating measurement results and detection results to the relay apparatus 10B. The trigger management unit 96 acquires data from each apparatus 14, and calculates the occurrence frequency of a trigger, based on the data. Furthermore, data transmitted from each apparatus 14 to the relay apparatus 10B is temporarily or permanently stored in the memory 18 of the relay apparatus 10B. The power of each apparatus 14 that is connected to the relay apparatus 10B is normally on, and each apparatus 14 is configured to transmit data obtained by the apparatus 14 to the relay apparatus 10B. For example, an IoT apparatus may be shared among plural users. Therefore, normally, the power of the IoT apparatus is not turned off. The trigger management unit 96 calculates the occurrence frequency of a trigger for each apparatus 14, based on data transmitted as described above. Accordingly, for example, the occurrence frequency of a trigger in the past is calculated. Obviously, data is not transmitted to the relay apparatus 10B from an apparatus 14 whose power is turned off.

The recommending unit 98 is configured such that, in the case where an execution period is set for a function and the execution period is not appropriate, the recommending unit 98 notifies a user of recommendation for change of the execution period. Information indicating the recommendation is transmitted from the relay apparatus 10B to a terminal apparatus 12 that is linked with a user who has set the function and is displayed on the terminal apparatus 12. For example, the recommending unit 98 transmits a notification indicating recommendation for change of an execution period, in accordance with the occurrence frequency of a trigger during the execution period. The occurrence frequency of a trigger during the execution period is, for example, the number of times that the trigger has occurred during the execution period. The recommending unit 98 functions as a determination unit that determines, based on the occurrence frequency of a trigger during an execution period set for a function, whether or not the execution period is appropriate. In the case where the execution period is not appropriate, the recommending unit 98 transmits a notification indicating recommendation for change of the execution period. For example, in the case where the occurrence frequency of a trigger during an execution period set for a function is equal to or less than a threshold (for example, in the case where the number of times that a trigger has occurred is equal to or less than a threshold), the recommending unit 98 transmits a notification indicating the recommendation. In the case where the occurrence frequency exceeds the threshold (for example, in the case where the number of times that the trigger has occurred exceeds the threshold), the recommending unit 98 does not transmit a notification indicating the recommendation. In the case where the average per unit time of the occurrence frequencies of the trigger during the execution period set for the function is less than or equal to the threshold, the recommending unit 98 may transmit a notification indicating the recommendation. In the case where the average exceeds the threshold, the recommending unit 98 may not transmit a notification indicating the recommendation.

Furthermore, the recommending unit 98 is configured to recommend, as an execution period, a period during which the occurrence frequency of a trigger to activate a function is higher to a user. For example, the recommending unit 98 recommends, as an execution period, a period during which the occurrence frequency of a trigger exceeds a threshold or a period during which the average per unit time of the occurrence frequencies of the trigger exceeds the threshold. The recommending unit 98 may recommend, as an execution period, a period during which the occurrence frequency of the trigger is higher than that in the execution period set for the function.

Furthermore, the trigger management unit 96 may identify one or more unit periods during which the trigger is more likely to occur, and the recommending unit 98 may recommend the one or more unit periods as an execution period to a user. For example, in the case where detection of a suspicious person by a camera corresponds to a trigger, the trigger management unit 96 may identify, based on moving image data captured by the camera, one or more unit periods during which more people are photographed by the camera, and the recommending unit 98 may recommend the one or more unit periods as an execution period to a user. That is, it is presumed that there is a high possibility that a suspicious person is detected and a trigger occurs during a period in which more people are photographed, compared to a period during which less people are photographed. Hence, the recommending unit 98 may recommend such a period as an execution period.

As another example, the trigger management unit 96 may identify one or more unit periods during which the number of people photographed by a camera exceeds a threshold, and the recommending unit 98 may recommend the one or more unit periods as an execution period. It is presumed that there is a high possibility that a suspicious person is detected and a trigger occurs during a period during which the number of people photographed exceeds the threshold, compared to a period during which the number of people photographed is less than or equal to the threshold. Hence, the recommending unit 98 may recommend such a period as an execution period.

Furthermore, the recommending unit 98 is configured such that, in the case where an execution place is set for a function and the execution place is not appropriate, the recommending unit 98 notifies a user of recommendation for change of the execution place. For example, the recommending unit 98 transmits a notification indicating recommendation for change of an execution place in accordance with the occurrence frequency of a trigger at the execution place. The occurrence frequency of the trigger at the execution place represents, for example, the number of times that the trigger has occurred at the execution place, the number of times that the trigger has occurred at the execution place during a predetermined period, the average per unit time of the numbers of times that the trigger has occurred at the execution place, or the like. The recommending unit 98 functions as a determination unit that determines, based on the occurrence frequency of a trigger at an execution place set for a function, whether or not the execution place is appropriate. In the case where the execution place is not appropriate, the recommending unit 98 transmits a notification indicating recommendation for change of the execution place. For example, in the case where the occurrence frequency of a trigger at an execution place set for a function is less than or equal to a threshold (for example, the number of times that the trigger has occurred is less than or equal to the threshold), the recommending unit 98 transmits a notification indicating the recommendation. In the case where the occurrence frequency exceeds the threshold (for example, the number of times that the trigger has occurred exceeds the threshold), the recommending unit 98 does not transmits the notification indicating the recommendation. In the case where the average per unit time of the numbers of times that the trigger has occurred at the execution place set for the function is less than or equal to the threshold, the recommending unit 98 may transmit a notification indicating the recommendation. In the case where the average exceeds the threshold, the recommending unit 98 may not transmit the notification indicating the recommendation.

Furthermore, the recommending unit 98 is configured to recommend, as an execution place, a place where the occurrence frequency of a trigger to activate a function is higher to a user. For example, the recommending unit 98 recommends, as an execution place, a place where the occurrence frequency of the trigger exceeds a threshold or a place where the average per unit time of the occurrence frequencies of the trigger exceeds the threshold. The recommending unit 98 may recommend, as an execution place, a place where the occurrence frequency of the trigger is higher than that at the execution place set for the function.

Furthermore, the trigger management unit 96 may identify a place where the possibility that a trigger will occur is higher, and the recommending unit 98 may recommend the identified place as an execution place to a user. For example, in the case where detection of a suspicious person by a camera corresponds to a trigger, the trigger management unit 96 identifies, based on each moving image data captured by each camera, a camera that has photographed more people, and the recommending unit 98 may recommend a place where the identified camera is installed as an execution place. That is, it is presumed that there is a high possibility that a suspicious person is detected and a trigger occurs at the place where more people are photographed, compared to a place where less people are photographed. Hence, the recommending unit 98 may recommend such a place as an execution place.

As another example, the trigger management unit 96 may identify one or more cameras with which the number of people photographed exceeds a threshold, and the recommending unit 98 may recommend the place where the one or more cameras are installed as an execution place. It is presumed that there is a high possibility that a suspicious person is detected and a trigger occurs at the place where the number of people photographed exceeds the threshold, compared to a place where the number of people photographed is less than or equal to the threshold. Hence, the recommending unit 98 may recommend such a place as an execution place.

The recommending unit 98 may recommend one or more unit periods during which the occurrence frequency of a trigger is higher as an execution period and recommend one or more places where the occurrence frequency of the trigger is higher as an execution place. Furthermore, the recommending unit 98 may recommend one or more unit periods during which a trigger is more likely to occur as an execution period and recommend one or more places where the trigger is more likely to occur as an execution place.

In the case where no execution place is set, the recommending unit 98 may not transmit a notification indicating recommendation regarding an execution place. In a similar manner, in the case where no execution period is set, the recommending unit 98 may not transmit a notification indicating recommendation regarding an execution period.

Figure 27:
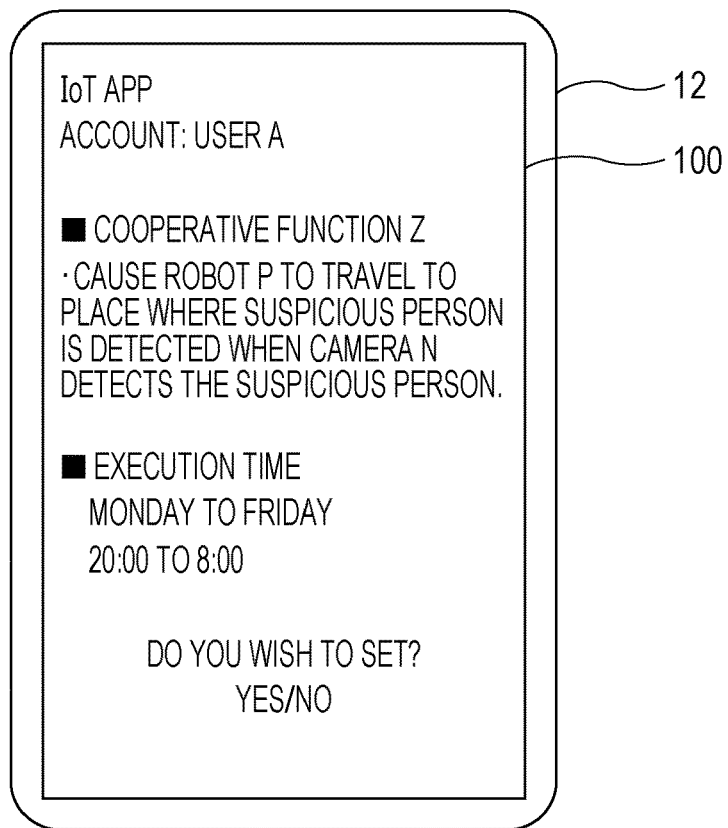
FIG. 27 is a diagram illustrating a function setting screen.

The information processing system according to the third exemplary embodiment will be explained in detail by way of specific examples. An operation for setting a function will be explained with reference to FIG. 27. FIG. 27 illustrates a function setting screen 100. The function setting screen 100 is a screen (a reception screen for receiving a function) for setting a function (a single function or a cooperative function). On the function setting screen 100, a function, an apparatus 14 to be used for the function, and an execution period of the function are set. Regarding settings other than setting for an execution period, methods for setting an apparatus 14 and a function on the function setting screen 100 are the same as those on the function setting screens 58 and 76 illustrated in FIGS. 9 and 20, respectively.

For example, when the user A operates the UI unit 34 of a terminal apparatus 12 to issue an instruction to execute function setting software, the controller 38 of the terminal apparatus 12 executes a function setting program. Accordingly, the function setting screen 100 is displayed on the UI unit 34. On the function setting screen 100, the user A specifies one or more apparatuses 14, a function to be executed by the one or more apparatuses 14, and an execution period of the function. In the example illustrated in FIG. 27, the camera N and the robot P are specified as apparatuses 14, and a function of "causing the robot P to travel to a place (a place where a suspicious person is detected) when the camera N detects the suspicious person" is specified as a cooperative function Z to be executed using the camera N and the robot P. Furthermore, as the execution period of the cooperative function Z, "Monday to Friday, 20:00 to 8:00" is set. That is, the cooperative function Z is set as a function to be executable during a period from 20:00 to 8:00 on Monday to Friday. In the case where the camera N detects a suspicious person during the execution period, the robot P travels to the place where the suspicious person is detected. During periods other than the execution period, even if the camera N detects a suspicious person, the robot P does not travel to the place where the suspicious person is detected. In this example, a cooperative function is specified. However, a single function may be specified.

When the user A specifies setting of a function on the function setting screen 100 (for example, when the user A presses a "Yes" button), the terminal apparatus 12 transmits function setting specifying information to the relay apparatus 10B. The setting specifying information includes information indicating a cooperative function, apparatus identification information of apparatuses 14 (the camera N and the robot P) to be used for the cooperative function, information indicating the execution period (from 20:00 to 8:00 on Monday to Friday), and user identification information of the user A.

When the relay apparatus 10B receives the setting specifying information, the function management unit 30 of the relay apparatus 10B registers each piece of the information included in the setting specifying information into the function management table. Accordingly, the cooperative function and the execution period are registered in the function management table, so that the user A is able to execute the cooperative function.

Furthermore, the trigger management unit 96 of the relay apparatus 10B calculates the occurrence frequency of a trigger, based on data (for example, moving image data) transmitted from the camera. N to the relay apparatus 10B, A trigger for the cooperative function Z is detection of a suspicious person by the camera N. Therefore, the trigger management unit 96 calculates, as occurrence frequency of the trigger, the occurrence frequency of detection, based on the data transmitted from the camera N. For example, the trigger management unit 96 calculates, as occurrence frequency, the number of times that the trigger has occurred per unit period during the specified execution period or the average of the numbers of times that the trigger has occurred.

For example, the trigger management unit 96 calculates, based on the data previously transmitted from the camera N, the number of times that the trigger occurred during the past execution period (from 20:00 to 8:00 on Monday to Friday), and calculates the average of the numbers of times that the trigger occurred for several weeks (for example, a predetermined number of weeks). In the case where the average is less than or equal to a threshold, the recommending unit 98 notifies the user of recommendation for change of the execution period (from 20:00 to 8:00 on Monday to Friday). Information indicating the recommendation is transmitted from the relay apparatus 10B to the terminal apparatus 12 that linked with the user A and displayed on the terminal apparatus 12.

The trigger management unit 96 also calculates the number of times that the trigger has occurred during periods other than the specified execution period. Specifically, the trigger management unit 96 calculates the number of times that the trigger has occurred during time zones other than the period from 20:00 to 8:00 on Monday to Friday and all the time zones on Saturday and Sunday, and calculates the average of the numbers of times that the trigger has occurred for several weeks. For example, the trigger management unit 96 calculates the number of times that the trigger has occurred for each unit time (for example, for each hour) on each day of a week, and calculates the average of the numbers of times that the trigger has occurred for several weeks. The recommending unit 98 recommends a period during which the average of the numbers of times that the trigger has occurred exceeds a threshold as an execution period.

For example, in the case where the average of the numbers of times that the trigger has occurred during a night period. (for example, from 18:00 to 3:00) on Saturday and Sunday exceeds the threshold, the recommending unit 98 recommends the period as an execution period. Information indicating the recommendation is transmitted from the relay apparatus 10B to the terminal apparatus 12 and displayed on the terminal apparatus 12. When the terminal apparatus 12 receives the information indicating the recommendation, the controller 38 of the terminal apparatus 12 causes a recommendation notification screen based on the information to be displayed on the UI unit 34. On the recommendation notification screen, information indicating that the night period on Saturday and Sunday is recommended as an execution period is displayed. Furthermore, on the recommendation notification screen, information indicating that a period from 20:00 to 8:00 on Monday to Friday is not suitable for execution of the cooperative function may be displayed, and information for prompting a user to change the execution period may be displayed.

Figure 28:
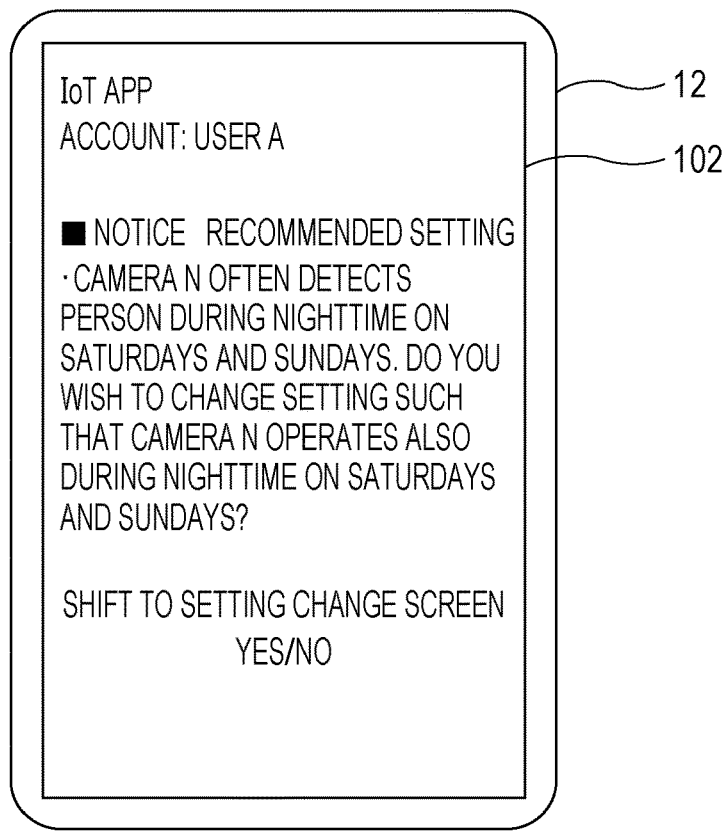
FIG. 28 is a diagram illustrating a recommendation notification screen.

Furthermore, the trigger management unit 96 may identify a day of a week and a time zone in which the number of people photographed by the camera N or the average of the numbers of people photographed by the camera N exceeds a threshold, and the recommending unit 98 may recommend the day of the week and the time zone as an execution period. Also in this case, information indicating the recommendation is displayed on the terminal apparatus 12. FIG. 28 illustrates a display example of the information indicating the recommendation. When the terminal apparatus 12 receives the information indicating the recommendation, the controller 38 of the terminal apparatus 12 causes a recommendation notification screen 102, which is based on the information indicating the recommendation, to be displayed on the UI unit 3A. For example, in the case where the number of people photographed during the night period on Saturday and Sunday or the average of the numbers of people photographed during the night periods on Saturdays and Sundays exceeds the threshold, information indicating that, because many people are detected during the night period on Saturday and Sunday, it is recommended to set the period as an execution period, is displayed on the recommendation notification screen 102. When the user A issues an instruction for shift to a setting change screen on the recommendation notification screen 102 (for example, when the user A presses a "Yes" button), a screen for changing the execution period is displayed on the UI unit 34, so that the user A is able to change the execution period on the screen. Information indicating the changed execution period is transmitted from the terminal apparatus 12 to the relay apparatus 10B, and the function management unit 30 registers the information indicating the changed execution period into the function management information 22. The controller 26B executes a set function during the changed execution period.

Furthermore, in the case where the occurrence frequency of the trigger during the night period (for example, from 18:00 to 3:00) on Saturday and Sunday is higher than that during the time zone from 20:00 to 8:00 on Monday to Friday, the recommending unit 98 may recommend the night period on Saturday and Sunday as an execution period to the user.

Recommendation for change of an execution period may be notified to the user in accordance with conditions other than those described above. For example, in the case where a user specifies, as an execution period, a period not including a period during which the number of people photographed by the sensor N or the average of the numbers of people photographed by the sensor N exceeds a threshold, the recommending unit 98 may transmit a notification indicating recommendation for change of the execution period. Furthermore, the recommending unit 98 may recommend, as an execution period, a period during which the number of people photographed by the sensor N or the average of the numbers of people photographed by the sensor N exceeds a threshold to the user.

As another example, in the case where a user specifies, as execution periods, both a period during which the number of people photographed by the sensor N or the average of the numbers of people photographed by the sensor N is less than or equal, to a threshold and a period during which the number of people photographed by the sensor N or the average of the numbers of people photographed by the sensor N exceeds the threshold, the recommending unit 98 may recommend change for the period during which the number of people photographed by the sensor N or the average of the numbers of people photographed by the sensor N is less than or equal to the threshold to the user.

As another example, in the case where a user specifies, as an execution period, part of a period during which the number of people photographed by the sensor N or the average of the numbers of people photographed by the sensor N exceeds the threshold, the recommending unit 98 may recommend a period other than the part and during which the number of people photographed by the sensor N or the average of the numbers of people photographed by the sensor N exceeds the threshold to the user.

As described above, according to the third exemplary embodiment, in the case where an execution period specified by a user is not appropriate, recommendation for change of the execution period is notified to the user. Accordingly, the user may be prompted for change of the execution period. Furthermore, by recommending a period during which the occurrence frequency of a trigger is higher or a period during which the occurrence frequency exceeds a threshold as an execution period to the user, the user may be prompted for change to an execution period during which the frequency of execution of a function is higher.

Furthermore, recommendation for an execution period may be performed in units of days, in units of days of weeks, in units of hours, or the like. For example, a cooperative function of causing an air-conditioner as an apparatus 14 to perform a heating operation in the case where temperature of 10 degrees Celsius or below is detected by a temperature sensor as an apparatus 14 during an execution period from 7:00 to 19:00 on Monday to Friday, is set. In this case, if temperature of 10 degrees Celsius or below is detected by the temperature sensor during a period from 5:00 to 7:00 on Monday or temperature of 10 degrees Celsius or below is detected during a period from 5:00 to 7:00 on Mondays over a predetermined number of weeks or more, the recommending unit 98 recommends the period from 5:00 to 7:00 on Monday as an execution period. Accordingly, an execution period may be recommended in units of days of weeks or in units of hours.

In addition to the above, for example, in the case where a cooperative function of turning on a lighting apparatus when a sensor detects a person is set and an execution period for the cooperative function is set, a period during which the occurrence frequency of a trigger (detection of a person by the sensor) exceeds a threshold, a period during which more people are detected, or the like may be recommended as an execution period.

The recommending unit 98 may transmit a notification indicating recommendation corresponding to the attributes of a user. For example, attribute information (background information) such as schedule information of a user is managed by an external apparatus such as a server or the relay apparatus 10B, and the recommending unit 98 acquires the attribute information and transmits a notification indicating recommendation corresponding to the attributes of the user. For example, a user is an office worker, and normally, people stays in an office during a period from 8:00 to 20:00 on Monday to Friday. Furthermore, the set cooperative function Z is a function that is executed to Prevent crimes in time zones and days of a week in which it is assumed that people normally do not stay in the office. In this case, the recommending unit 98 recommends, as an execution period of the cooperative function Z, the time zones and days of a week (for example, from 20:00 to 8:00 on Monday to Friday, all time zones on Saturday and Sunday, and the like). Accordingly, an execution period suitable for the attributes of a user is recommended to the user.

Furthermore, the recommending unit 98 may notify recommendation for change of an execution place. For example, in the case where the occurrence frequency of a trigger based on photographing results by the camera R specified by the user A is less than or equal to a threshold or in the case where the number of people photographed by the camera N during a unit period is less than or canal to a threshold, the recommending unit 98 may notify a user of recommendation for change of a photographing place. Furthermore, the recommending unit 98 may recommend, as an execution place, a photographing place of a camera with which the occurrence frequency of the trigger exceeds the threshold or a photographing place of a camera with which the number of people photographed during a unit period exceeds the threshold to the user. That is, the recommending unit 98 may recommend such a camera to the user. Accordingly, an execution place where the execution frequency of the cooperative function Z is higher may be recommended to a user, and the user may be prompted for change of the execution place.

Furthermore, in the case where a cooperative function of turning on an air-conditioner when a person is detected is set, a place where the occurrence frequency of a trigger (detection of a person) exceeds a threshold or a place where more people are detected may be recommended as an execution place.

(Third Modification)

A third modification will be explained below. The third modification is a modification according to the third exemplary embodiment. In the third modification, in the case where setting contents of a function are further received and the setting contents are not appropriate, recommendation for change of the setting contents is notified to a user.

For example, in the case where the resolution of a camera as an apparatus 14 to be used for a function is set by a user and the resolution is not suitable for the function, the recommending unit 98 may notify the user of recommendation for change of the resolution or may recommend a resolution suitable for the function to the user. For example, in the case where the range of resolution suitable for the function is set in advance and the resolution specified by the user does not fall within the range, the recommending unit 98 performs recommendation as described above. The same applies to focusing or the like of a camera.

Furthermore, in the case where the setting contents of an air-conditioner as an apparatus 14 are set by a user and the setting contents are not appropriate, the recommending unit 98 may notify the user of recommendation for change of the setting contents or may recommend appropriate setting contents to the user. For example, based on the relationship of temperature detected by a temperature sensor that detects temperature around the air-conditioner and setting contents, it is determined whether or not the setting contents are appropriate. For example, in the case where execution of a cooling operation is set as setting contents even though temperature that is actually detected by the temperature sensor falls within a temperature range in which a heating operation is assumed to be performed, the recommending unit 98 notifies the user of recommendation for change of the setting contents.

According to the third modification, the user may be prompted for setting of setting contents appropriate for a function.

Fourth Exemplary Embodiment

An information processing system according to a fourth exemplary embodiment of the present invention will be explained below. In the fourth exemplary embodiment, in the case where electric power required for execution of a function, that is, electric power to be consumed for execution of a function (hereinafter, referred to as "consumed electric power"), exceeds a threshold and it is presumed that the function may not be executed normally, a warning is transmitted. Consumed electric power may be electric power (a measured value) that is actually consumed and measured when a function is executed, electric power (a theoretical value) that is presumed to be consumed when a function is executed, or a statistic (for example, an average, an expectation, or the like) obtained from measured values. The fourth exemplary embodiment will be explained in detail below.

Figure 29:
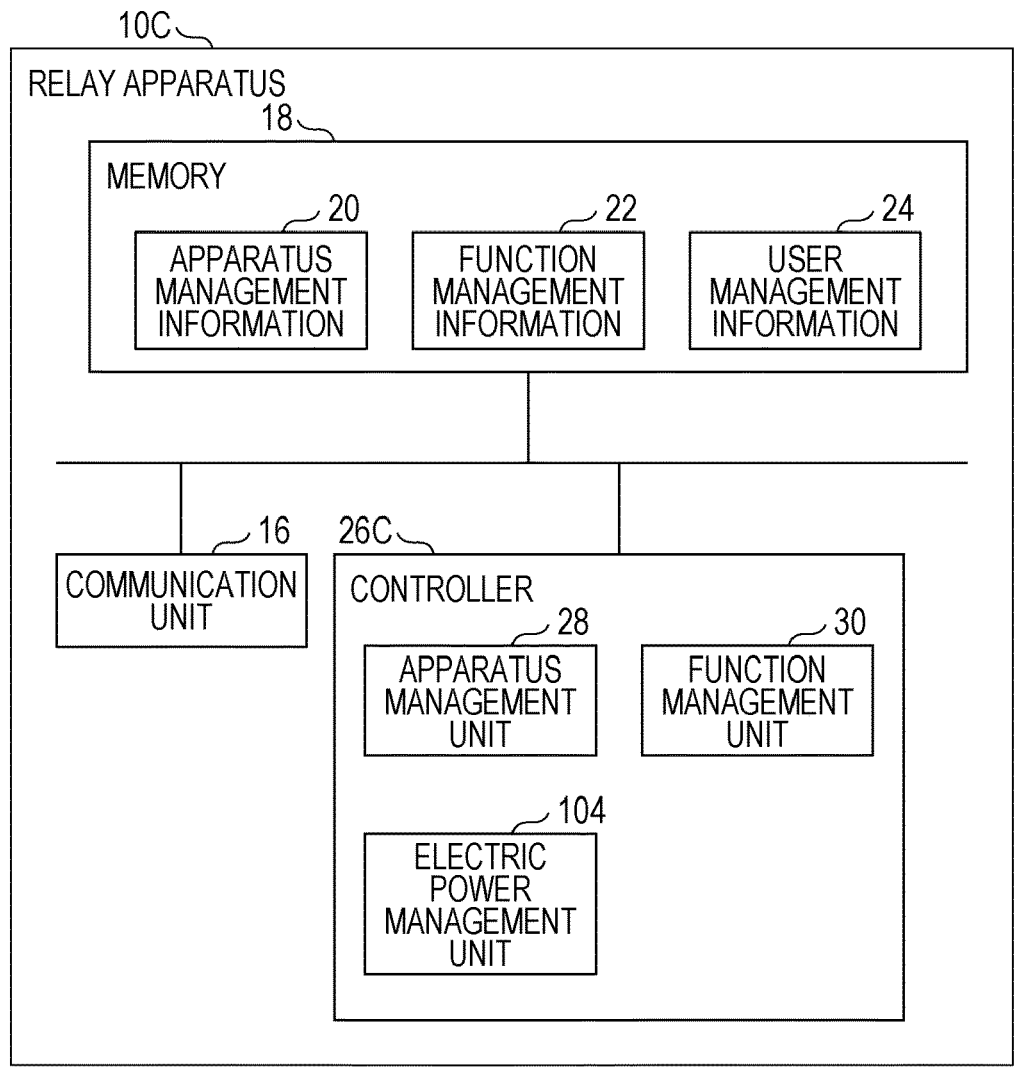
FIG. 29 is a block diagram illustrating a configuration of a relay apparatus according to a fourth exemplary embodiment.

FIG. 29 illustrates a configuration of a relay apparatus 10C according to the fourth exemplary embodiment. The information processing system according to the fourth exemplary embodiment includes the relay apparatus 10C in place of the relay apparatus 10 according to the first exemplary embodiment. Configuration features of components other than the relay apparatus 10C are the same as those of the information processing system according to the first exemplary embodiment.

The relay apparatus 10C includes a controller 26C in place of the controller 26 included in the relay apparatus 10. Configuration features of components other than the controller 26C are the same as those of the relay apparatus 10.

The controller 260 includes the apparatus management unit 28, the function management unit 30, and an electric power management unit 104. The apparatus management unit 28 included in the controller 260 is the same as the apparatus management unit 28 included in the controller 26, and therefore, explanation for the apparatus management unit 28 included in the controller 260 will be omitted. Furthermore, as in the third exemplary embodiment, the function management unit 30 may manage an execution period of a function (a single function or a cooperative function).

The electric power management unit 104 is configured to manage electric power. The electric power management unit 104 may manage electric power consumed by the relay apparatus 100 and each apparatus 14 connected to the relay apparatus 100 or may manage electric power consumed in a management area (for example, a room, a conference room, a building, or the like) including the relay apparatus 100 and each apparatus 14 connected to the relay apparatus 100. The management area may include an apparatus or the like that is not connected to the relay apparatus 100.

Furthermore, the electric power management unit 104 is configured to manage electric power required for execution of a function. That is, the electric power management unit 104 manages electric power consumed by an apparatus 14 to execute a function. In the case where the relay apparatus 10C is used for execution of a function, the electric power management unit 104 manages electric power consumed by an apparatus 14 and the relay apparatus 10C to execute the function. Specifically, when a user specifies a new function to be set for an apparatus 14, the electric power management unit 104 determines (presumes) whether or not, in the case where the new function is executed by the apparatus 14, electric power exceeds a threshold and at least one of a function group including a set function and the new function operates normally. A state in which a function does not operate normally represents a state in which the function is not executed in accordance with contents set for the function. For example, a case where the function is not able to be executed in accordance with contents set for the function, due to insufficiency, instability, drop, or the like of electric power supplied to the apparatus 14 that is to execute the function, corresponds to the case where the function does not operate normally.

For example, the electric power management unit 104 calculates the total sum of electric power required for a set function and a new function. In the case where the total sum exceeds a threshold, the electric power management unit 104 determines that at least one function does not operate normally. The total sum may be a theoretical value, a measured value, or a static (an average, an expectation, or the like) obtained from the measured value of consumed electric power. For example, consumed electric power (a theoretical value) may be set for each apparatus 14, and the electric power management unit 104 may calculate the total sum of electric power using the theoretical value. Information indicating consumed electric power (a theoretical value, a past measured value, a statistic, and the like) for each apparatus 14 is stored in the memory 18. Furthermore, the electric power management unit 104 may acquire information indicating consumed electric power from each apparatus 14 or from an external apparatus such as a server. The electric power management unit 104 may calculate the total sum of electric power based on rated consumed electric power of the apparatus 14 that is to execute the function. Even in the case where the same function is to be executed, electric power to be consumed by execution of the function may differ depending on the apparatus 14 to be used for the function. For example, in the case where electric power required for an operation of a first apparatus 14 is 10 W and electric power required for an operation of a second apparatus 14 is 20 W, when a certain function is set for the first apparatus 14, it is presumed that electric power required for execution of the function is 10 W, and when the function is set for the second apparatus 14, it is presumed that electric power required for execution of the function is 20 W.

The above-mentioned threshold is determined such that, for example, the relay apparatus 100 and one or more apparatuses 14 connected to the relay apparatus 100 may operate normally. For example, in the case where a circuit breaker (a circuit breaker such as a wiring circuit breaker or an earth leakage circuit breaker) for interrupting supply of electric power to the relay apparatus 100 and the apparatus 14 connected to the relay apparatus 100 is used, a threshold represents electric power that does not cause the circuit breaker to perform an interrupting operation. Furthermore, the threshold may be determined based on electric power that may be supplied to the management area mentioned above. In the case where a circuit breaker to interrupt supply of electric power to the management is used, the threshold may be determined based on electric power that does not cause the circuit breaker to perform the interrupting operation.

In the case where consumed electric power exceeds the threshold and it is thus determined that at least one function does not operate normally, the controller 260 functions as an example of a notification unit to transmit a notification indicating a waring. For example, information indicating the warning is transmitted from the relay apparatus 10C to a terminal apparatus 12 that is linked with a user who tries to set a new function, and the information is displayed on the terminal apparatus 12. Accordingly, the user may be notified that there is a possibility that at least one function may not operate normally.

Processing performed by the electric power management unit 104 will be explained in detail below by way of specific examples.

Specific Example 1

Figure 30:
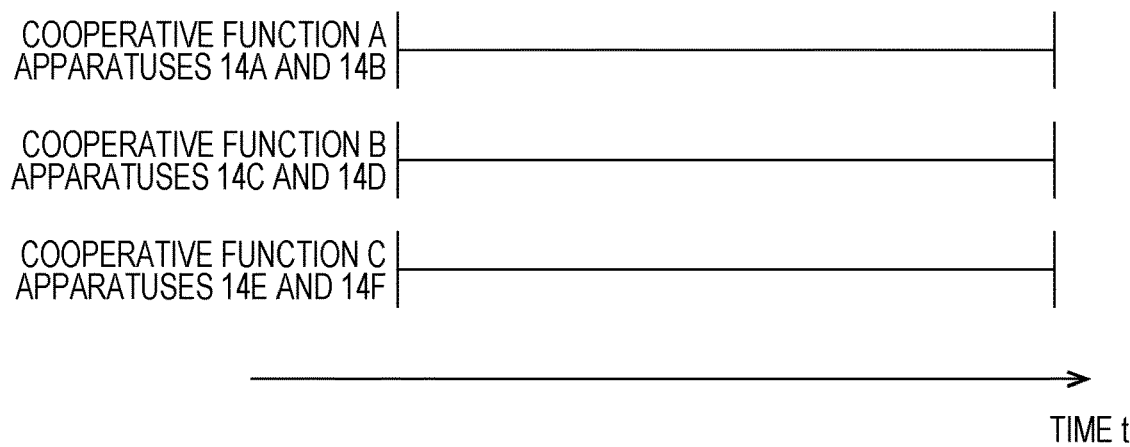
FIG. 30 is a diagram illustrating cooperative functions.

Specific example 1 will be explained with reference to FIG. 30. FIG. 30 illustrates cooperative functions according to the specific example 1. For example, a cooperative function A is already set for apparatuses 14A and 14B, and a cooperative function B is already set for apparatuses 14C and 14D. Furthermore, a cooperative function C is about to be set as a new cooperative function for apparatuses 14E and 14F by a user. An execution period of each of the cooperative functions is not set, and each cooperative function is able to be executed regardless of the time. At a time when the cooperative function C is about to be set, other cooperative functions or single functions are not set for apparatuses 14. The apparatuses 14A to 14F are connected to the relay apparatus 10C.

For example, electric power required to execute the cooperative function A at the apparatuses 14A and 14E is 10 W, and electric power required to execute the cooperative function. B at the apparatuses 14C and 14D is 10 W. Electric power required for the cooperative function A may be a theoretical value of consumed electric power of the apparatuses 14A and 14B, measured values of consumed electric power consumed when the cooperative function A was previously executed at the apparatuses 14A and 14B, or a statistic (for example, an average, an expectation, or the like) calculated from past measured values. The same applies to electric power required for the cooperative function B.

Furthermore, for example, electric power required to execute the cooperative function C at the apparatuses 14E and 14F is 11 W. Electric power required for the cooperative function C may be a theoretical value of consumed electric power for the apparatuses 14E and 14F, a measured value of consumed electric power consumed when the cooperative function C was previously executed at the apparatuses 14E and 14F, or a statistic calculated from past measured values.

In the case where setting for the cooperative function C is received, the electric power management unit 104 calculates the total sum of electric power required for the set (received) cooperative functions A and B and electric power required for the cooperative function C to be newly set (received). The reception processing may be performed by the controller 26C of the relay apparatus 10C or by the controller 38 of a terminal apparatus 12.

In the above example, the total sum of electric power is 31 W(=10 W+10 W+11 W). For example, in the case where a threshold is set to 30 W, the total sum of electric power exceeds the threshold. In this case, the electric power management unit 104 presumes that at least one of the cooperative functions A, B, and C may not operate normally if the cooperative function C is set. In accordance with the presumption, the controller 26C transmits, as warning processing, information indicating that electric power exceeds the threshold to a terminal apparatus 12 that is linked with a user who is trying to set the cooperative function C. Accordingly, the information is displayed on the UI unit 34 of the terminal apparatus 12.

Even in the case where a cooperative function is set for an apparatus 14, the cooperative function is not necessarily always executed. That is, in the case where a cooperative function to be executed when a trigger occurs is set for an apparatus 14, the cooperative function is executed by the apparatus 14 when the trigger occurs, whereas the cooperative function Is not executed when the trigger does not occur. In general, the amount of consumed electric power (for example, stand-by power) of an apparatus 14 while a cooperative function is not being executed by the apparatus 14 is smaller than the amount of consumed electric power of the apparatus 14 while the cooperative function is being executed by the apparatus 14. Electric power required for a cooperative function is equal to electric power (a theoretical value, a measured value, a statistic, or the like) to be consumed if the cooperative function is executed even in the case where the cooperative function is not actually executed due to non-occurrence of a trigger or the like. By using such electric power, the total sum of electric power is calculated. For example, electric power required for the cooperative function A is 10 W, and this value represents electric power (a theoretical value, a measured value, a statistic, or the like) to be consumed when the cooperative function A is executed. The same applies to the cooperative functions B and C. Accordingly, even in the case where a cooperative function to be executed under conditions such as occurrence of a trigger is set, the total sum of electric power may be calculated using electric power to be consumed when the cooperative function is executed. For example, in the case where the cooperative functions A, B, and C are executed during overlapping periods, it is presumed that electric power of 31 W will be consumed, and warning processing corresponding to a result of comparison between the electric power and the threshold may be performed.

The total sum of electric power may include electric power consumed by the relay apparatus 10C, and comparison may be performed between the total sum and the threshold. Furthermore, on assumption that the relay apparatus 10C is an apparatus that is always used (an apparatus whose power is always turned on), a small threshold may be set taking into consideration the amount of electric power consumed by the relay apparatus 10C.

Furthermore, electric power consumed by an apparatus 14 for which neither single function nor cooperative function is set but whose power is turned on may be included in the total sum, and comparison may be performed between the total sum and the threshold. For example, stand-by power or the like of an apparatus 14 may be included in the total sum.

As another example, the electric power management unit 104 may calculate the total sum of electric power that is assumed to be consumed in a management area in the case where the cooperative function C is set and determine whether or not the total sum exceeds a threshold and whether or not at least one of the cooperative functions A, B, and C operates normally.

Specific Example 2

Figure 31:
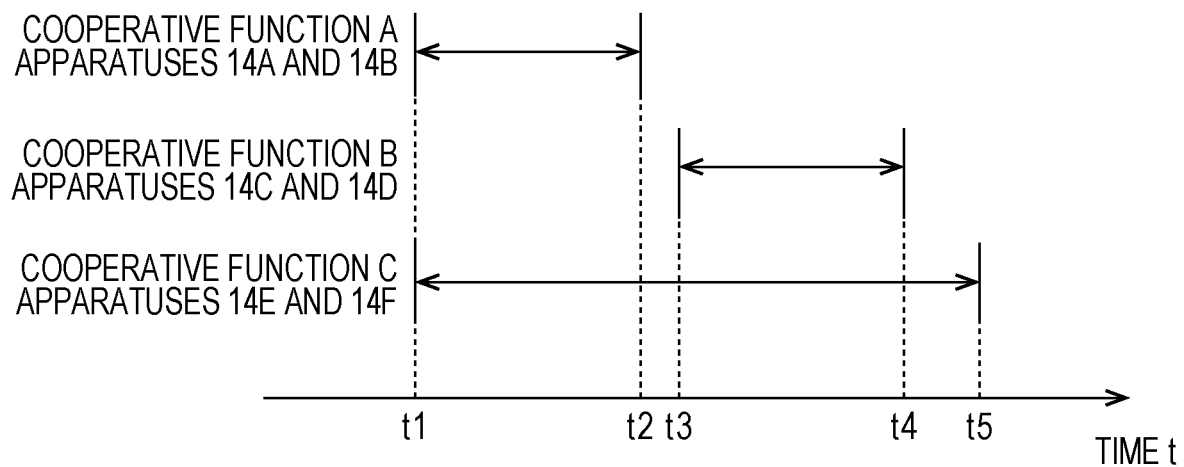
FIG. 31 is a diagram illustrating execution periods of cooperative functions.

Specific Example 2 will be explained with reference to FIG. 31. FIG. 31 illustrates cooperative functions according to the specific example 2. The horizontal axis represents time. As in the specific example 1, the cooperative function A is already set for the apparatuses 14A and 14B, the cooperative function B is already set for the apparatuses 14C and 14D, and the cooperative function C is about to set as a new cooperative function for the apparatuses 14E and 14F.

Furthermore, an execution period for each cooperative function is set. The execution period of the cooperative function. A is from time t1 to time t2. The execution period of the cooperative function B is from time t3 to time t4. The execution period of the cooperative function C is from time t1 to time t5.

As described above, in the case where an execution period is set for a function, the electric power management unit 104 calculates the total sum of electric power consumed in overlapping parts of the execution period of the set function and the execution period of the new function. In the case where the total sum exceeds the threshold, it is determined that at least one function does not operate normally.

In the specific example 2, the execution period of the cooperative function A and the execution period of the cooperative function B do not overlap. However, the execution period of the cooperative function A and the execution period of the cooperative function C partially overlap, and the execution period of the cooperative function B and the execution period of the cooperative function C partially overlap. That is, during the period from time t1 to time t2, the execution periods of the cooperative functions A and C overlap, and during the period from time t3 to t4, the execution periods of the cooperative functions B and C overlap. In this case, the electric power management unit 104 calculates the total sum of electric power required for the cooperative functions A and C as consumed electric power between time t1 and time t2, and calculates the total sum of electric power required for the cooperative functions B and C as consumed electric power between time t3 and time t4. During the period from time t2 to time t3 and the period from the time t4 to time t5, only the cooperative function C is executed. Therefore, the total sum of electric power at that time is equal to electric power required for the cooperative function C.

The total sum of electric power between time t1 and time t2 is 21 W(=10 W+11 W), the total sum of electric power between time t3 and time t4 is 21 W(=10 W+11 W), and the total sum of electric power during a period from time t2 to time t3 and a period from time t4 to time t5 is 11 W. In the case where a threshold is set to 30 W, the total sum of electric power does not exceed the threshold during each of the execution periods. In this case, the controller 26C does not perform warning processing. The function management unit 30 newly registers the cooperative function C in the function management table. Accordingly, the cooperative functions A, B, and C are able to be executed during execution periods set to the cooperative functions A, B, and C.

Specific Example 3

Figure 32:
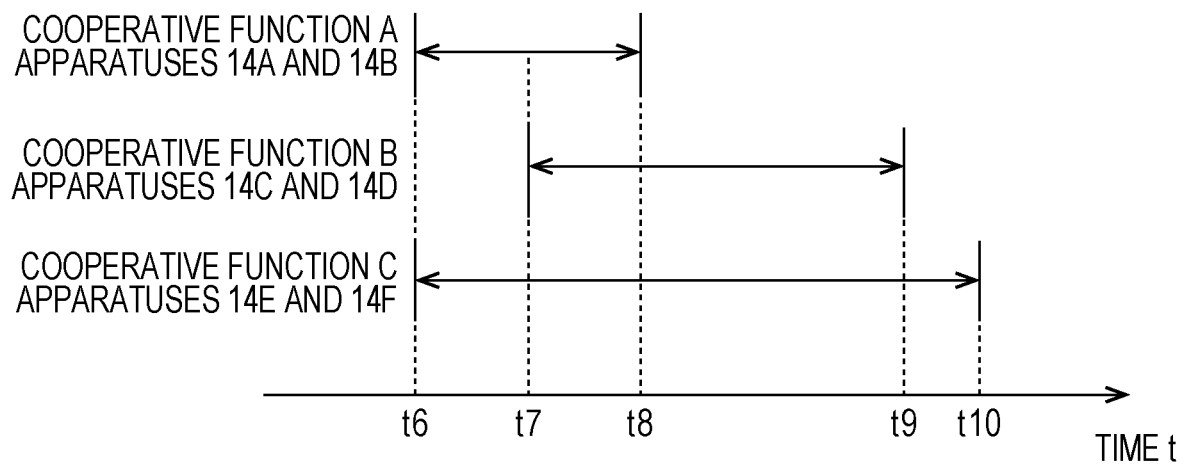
FIG. 32 is a diagram illustrating execution periods of cooperative functions.

Specific example 3 will be explained with reference to FIG. 32. FIG. 32 illustrates cooperative functions according to the specific example 3. The horizontal axis represents time. As in the specific example 1, the cooperative function A is already set for the apparatuses 14A and 14B, the cooperative function B is already set for the apparatuses 14C and 14D, and the cooperative function C is about to newly set for the apparatuses 14E and 14F.

Furthermore, an execution period is set for each cooperative function. The execution period of the cooperative function A is a period from time t6 to time t8. The execution period of the cooperative function B is a period from time t7 to time t9. The execution period of the cooperative function C is a period from time t6 to time t10.

As in the specific example 2, the electric power management unit 104 calculates electric power to be consumed in an overlapping part of execution periods of cooperative functions.

Overlapping parts of execution periods and the total sum of electric power at that time will be listed below:

Time t6 to time t8: execution periods of the cooperative functions A and C overlap, and the total sum is 21 W.

Time t7 to time t8: execution periods of the cooperative functions A, B, and C overlap, and the total sum is 31 W.

Time t8 to time t9 execution periods of the cooperative functions B and C overlap, and total sum is 21 W.

Time t9 to time t10: only the cooperative function C is set, and the total sum is 11 W.

During a period from time t7 to time t8, the total sum of electric power is 31 W and exceeds the threshold. In this case, the electric power management unit 104 presumes that at least one of the cooperative functions A, B, and C does not operate normally if the cooperative function C is executed. In accordance with the presumption, the controller 26 transmits, as warning processing, information indicating that electric power exceeds the threshold to a terminal apparatus 12 that is linked with a user who is trying to set the cooperative function C. Accordingly, the information is displayed on the UI unit 34 of the terminal apparatus 12.

As described above, in the case where electric power exceeds the threshold and it is presumed that at least one function does not operate normally, the function management unit 30 may change an execution period of at least one function among a function group including a received function and a new function. The function management unit 30 may change an execution period of the function that is presumed not to operate normally or change an execution period of a different function. For example, the function management unit 30 changes an execution period such that the total sum of consumed electric power in an overlapping part of execution periods of plural functions is less than or equal to the threshold. Furthermore, in the case where recommendation for the change is notified to a user and the user issues an instruction for the change, the controller 26C may change the execution period.

In the specific example described above, for example, the function management unit 30 changes the execution period of the cooperative function C to an execution period not including the period from time t7 to time t8. Accordingly, occurrence of a defect in the apparatus 14 that may occur during the period from time t7 to time t8 mat be prevented, and the already set cooperative functions A and B are able to be executed normally. Furthermore, recommendation for the change may be notified to the user. Obviously, the function management unit 30 may change the execution periods of the cooperative function A and the cooperative function B such that the total sum of electric power is less than or equal to the threshold. Furthermore, the function management unit 30 may change the execution periods of the cooperative functions A, B, and C such that the execution periods do not overlap.

Furthermore, the function management unit 30 may determine, in accordance with priority of functions, a function whose execution period is to be changed and may change the execution period of the function. For example, the function management unit 30 changes execution periods in order from a function with a lowest priority level such that the total sum of electric power is less than or equal to the threshold. For example, in the case where the cooperative function A has the highest priority level, the cooperative function B has the second highest priority level, and the cooperative function C has the third highest priority level, the function management unit 30 changes the execution period of the cooperative function C.

The priority of a function may be determined in advance or may be determined according to the user who has set the function. For example, information indicating priority of each function is stored in advance in the memory 18 of the relay apparatus 10C.

Furthermore, a higher priority level may be set to a function for which change of the execution period is not permitted. A function for which change of the execution period is not permitted is, for example, a high real-time function, a high immediacy function, a high simultaneity function, or the like. Specifically, a function for which change of the execution period is not permitted is, for example, a cooperative function using a crime-prevention camera (for example, a cooperative function having contents of processing for reporting or causing a robot to travel to a place where a suspicious person is detected when a camera detects the suspicious person), a cooperative function using a fire alarm (for example, a cooperative function having contents of processing for performing fire extinguishing processing or causing a robot to travel to a place where a fire alarm is operated), a recording function, or the like. These functions are to be executed during set execution periods, in terms of urgency, importance, and the like. Therefore, priority levels of these functions are set higher than those of other functions. In the case where such a cooperative function is already set or about to be set as a new function, the function management unit 30 changes the execution period of a different function with a lower priority level, without changing the execution period of the cooperative function. Accordingly, a situation in which a function for which change of the execution period is not permitted does not operate normally may be prevented.

Furthermore, the function management unit 30 may determine execution or non-execution of each function in accordance with priority of the function. The controller 26C controls execution of a function as an execution target and controls a function as a non-execution target not to be executed. More particularly, the function management unit 30 determines execution or non-execution of each function in accordance with priority of the function such that the total sum of electric power is less than or equal to the threshold. For example, in the case where the cooperative function A has the highest priority level, the cooperative function B has the second highest priority level, and the cooperative function C has the third highest priority level, the controller 26C causes the cooperative functions A and B to be executed and causes the cooperative function C not to be executed. Accordingly, a situation in which a function does not operate normally due to consumed electric power may be prevented. The cooperative function C as a non-execution target may be registered in the cooperative function management table.

Specific Example 4

Figure 33:
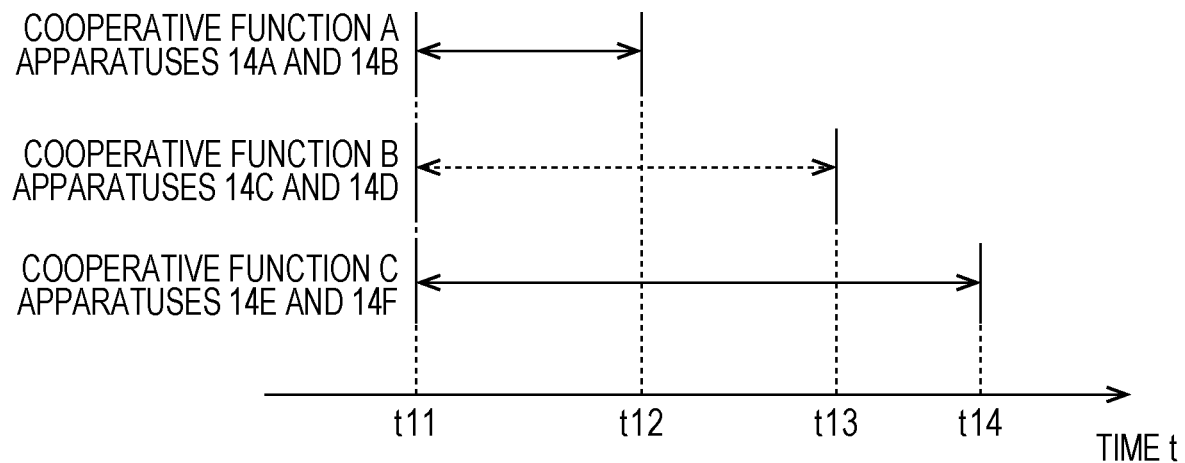
FIG. 33 is a diagram illustrating execution periods of cooperative functions.

A specific example 4 will be explained with reference to FIG. 33. FIG. 33 illustrates cooperative functions according to the specific example 4. The horizontal axis represents time. As in the specific example 1, the cooperative function A is already set for the apparatuses 14A and 14B, the cooperative function B is already set for the apparatuses 14C and 14D, and the cooperative function C is about to set as a new cooperative function for the apparatuses 14E and 14F.

Furthermore, execution periods are set for individual cooperative functions. The execution period of the cooperative function A is a period from time t11 to time t12. The execution period of the cooperative function B is a period from time t11 to time t13. The execution period of the cooperative function C is a period from time t11 to t14.

Between the time t11 and time t12, the execution periods of the cooperative functions A, B, and C overlap. Between the time t12 and t13, the execution periods of the cooperative functions B and C overlap. As in the specific examples 2 and 3, the electric power management unit 104 calculates electric power consumed in overlapping parts of the execution periods of the cooperative functions.

In the specific example 4, the total sum of electric power is calculated using statistics of electric power. For example, expectations are used as statistics. For example, in the case where a trigger occurs and the cooperative function B is executed at a probability of 50% during the execution period (the period from time t11 to time t13) of the cooperative function B, the expectation of the electric power required for the cooperative function B is 5 W(=10 W×0.5). This value is used for calculation of the total sum. The probability that a set cooperative function will be executed (for example, the probability that a trigger will occur) is calculated based on past execution histories of the cooperative function. As a probability that a cooperative function to be set will be executed, the maximum value, which is 100%, may be used. If the cooperative function was previously executed, the probability may be calculated based on the history.

For example, in the case where the expectation of consumed electric power of the cooperative function A is 10 W, the expectation of the consumed electric power of the cooperative function B is 5 W, and the electric power (for example, a theoretical value or a past expectation) of the cooperative function C is 11 W, the total sum of electric power during the period from time t11 to time t12 is 26 W. This value is less than or equal to the threshold. Therefore, the controller 260 does not perform warning processing. The new cooperative function C is registered in the function management table.

With the use of statistics as described above, control close to actual operation may be achieved.

Specific Example 5

Figure 34:
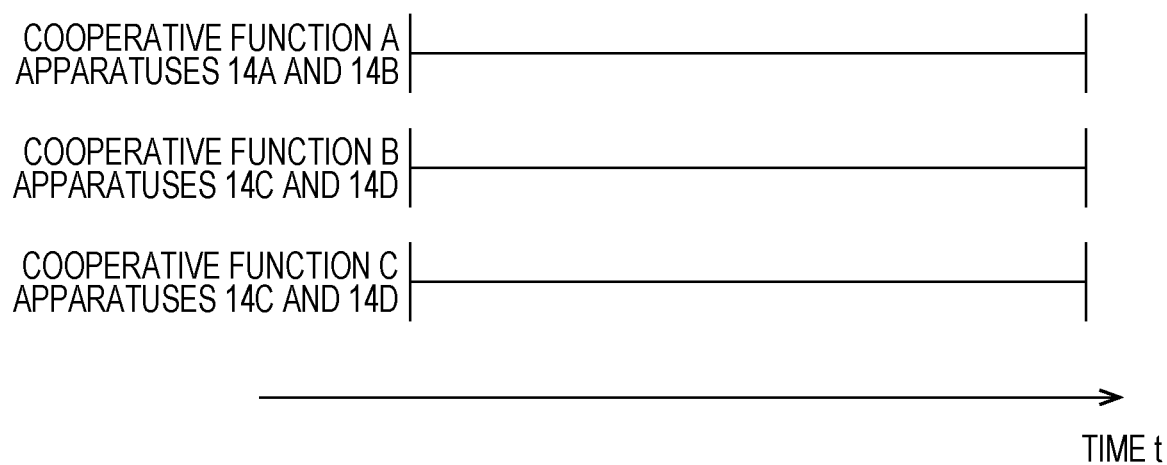
FIG. 34 is a diagram illustrating cooperative functions.

A specific example 5 will be explained with reference to FIG. 34. FIG. 34 illustrates cooperative functions according to the specific example 5.

In the specific example 5, the cooperative function A is already set for the apparatuses 14A and 14E, the cooperative function B is already set for the apparatuses 14C and 14D, and the cooperative function C is about to be set as a new cooperative function for the apparatuses 14C and 14D. Furthermore, execution periods are not set for individual functions.

As described above, the cooperative functions B and C are functions to be executed using the same apparatuses 14C and 14D. In this case, the electric power management unit 104 calculates the total sum of electric power, on the basis of electric power consumed when the cooperative functions B and C are executed using the same apparatuses 14C and 14D.

For example, the apparatus 14C is a PC, and the apparatus 14D is a multifunction apparatus. The cooperative function B is a function that uses document creation software installed in the apparatus 14C and a print function of the apparatus 14D. The cooperative function C is a function that uses electronic mail software installed in the apparatus 14C and a facsimile function of the apparatus 14D.

The consumed electric power of the apparatuses 14C and 14D in the case where only the cooperative function B is executed is 10 W, and the consumed electric power of the apparatuses 14C and 14D in the case where only the cooperative function C is executed is 10 W.

The total sum of consumed electric power of the apparatuses 14C and 14D in the case where the cooperative functions B and C are executed at the same time is less than 20 W(=10 W+10 W). For example, electric power required to activate the apparatus 14C and execute the document creation software is 5 W, and electric power required to execute the electronic mail software in the state in which the document creation software is being executed is 0.1 W. That is, electric power required to activate the apparatus 14C to execute the electronic mail software overlaps with electric power required to activate the apparatus 14C to execute the document creation software. Therefore, overlapping electric power does not need to be calculated as consumed electric power. Accordingly, consumed electric power for the case where both the document creation software and the electronic mail software are executed at the apparatus 14C is 5.1 W.

Furthermore, electric power required to activate the apparatus 14D to execute the print function is 5 W, and electric power required to execute the facsimile function in the state in which the print function is being executed is 1 W. Also in this case, electric power required to activate the apparatus 14D to execute the facsimile function overlaps with electric power required to activate the apparatus 14D to execute the print function. Therefore, overlapping electric power does not need to be calculated as consumed electric power. Accordingly, consumed electric power for the case where both the print function and the facsimile function are executed at the apparatus 14D is 6 W. Therefore, the total sum of consumed electric power for the case where the cooperative functions B and C are executed at the same time is 11.1 W(=5.1+6).

Electric power required for the cooperative function A is 10 W, and therefore, the total sun of electric power required for the cooperative functions A, B, and C is 21.1 W. This value is less than or equal to the threshold. Therefore, the controller 26C does not perform warning processing.

Also in the case where part of plural apparatuses 14 to be used for a cooperative function is used for another cooperative function, the total sum of electric power is calculated as described above.

By calculating electric power as described above, control close to actual operation may be achieved.

A screen for setting a function will be explained below.

Figure 35:
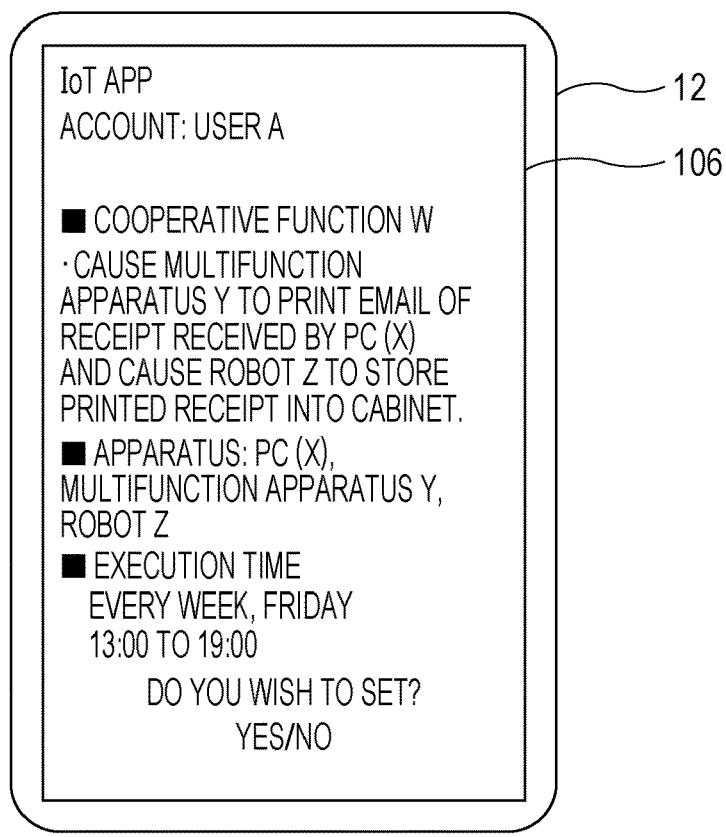
FIG. 35 is a diagram illustrating a function setting screen.

FIG. 35 illustrates a function setting screen 105. The function setting screen 106 is a screen (a reception screen for receiving a function) for setting a function (a single function or a cooperative function). On the function setting screen 106, a function, an apparatus 14 to be used for the function, and an execution period of the function are set. Execution periods are not necessarily set.

For example, in the case where the user A operates the UI unit 34 of the terminal apparatus 12 to issue an instruction to execute function setting software, the controller 38 of the terminal apparatus 12 executes a function setting program. Accordingly, the function setting screen 106 is displayed on the UI unit 34. In the example illustrated in FIG. 35, a PC (X), a multifunction apparatus Y, and a robot Z are specified as apparatuses 14, and a function of "causing the multifunction apparatus Y to print electronic mail of a receipt received by the PC (X) and causing the robot Z to store the printed receipt into the cabinet" is set as a cooperative function W to be executed using the PC (X), the multifunction apparatus Y, and the robot Z. Furthermore, "every Friday, from 13:00 to 19:00" is set as the execution period of the cooperative function W.

When the user A issues an instruction to set a function on the function setting screen 106 (for example, the user A presses a "Yes" button), the terminal apparatus 12 transmits function setting instruction information to the relay apparatus 10C. The setting instruction information includes information indicating a cooperative function, apparatus identification information of the apparatuses 14 (the PC (X), the multifunction apparatus Y, and the robot Z) to be used for the cooperative function, information indicating the execution period, and user identification information of the user A.

When the relay apparatus 10C receives the setting instruction information, the function management unit 30 of the relay apparatus 10C registers each piece of information included in the setting instruction information into the function management table. Accordingly, the cooperative function and the execution period are registered in the function management table, so that the user A is able to execute the cooperative function.

Furthermore, the electric power management unit 104 calculates the total sum of electric power required for a set function and electric power required for the cooperative function W, which is newly received. The electric power management unit 104 determines whether or not the total sum exceeds a threshold and determines whether or not at least one function is able to operate normally. In the case where the total sum exceeds the threshold and at least one function is not able to operate normally, the controller 26C performs warning operation. In this case, information indicating a warning is transmitted from the relay apparatus 10C to the terminal apparatus 12 that is linked with the user A, and the information is displayed on the UI unit 34 of the terminal apparatus 12.

Figure 36:
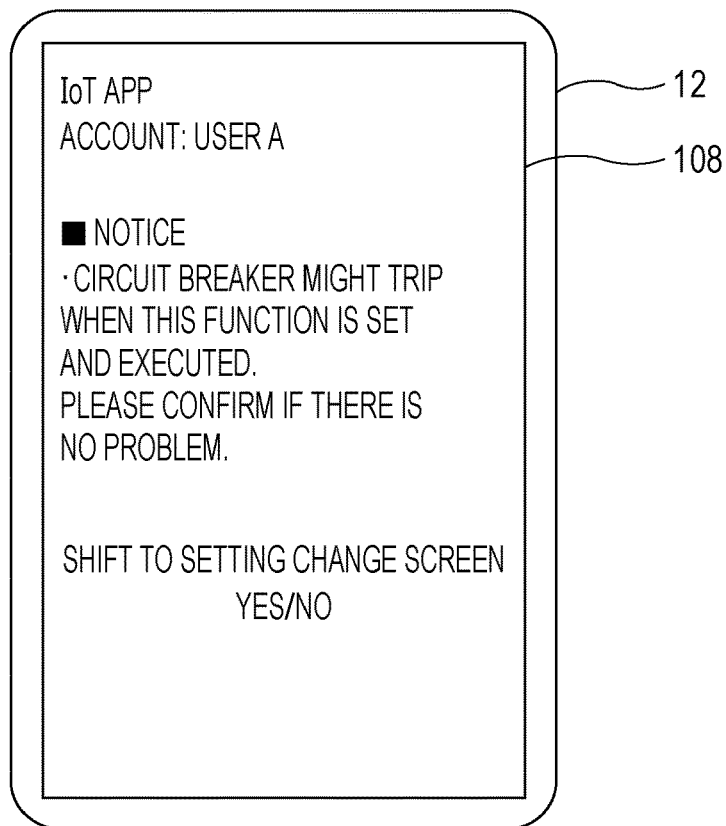
FIG. 36 is a diagram illustrating a warning screen.

FIG. 36 illustrates a display example of a warning. When the terminal apparatus 12 receives information indicating a warning, the controller 38 of the terminal apparatus 12 causes a warning screen 108 to be displayed on the UI unit 34 on the basis of the information. On the warning screen 108, for example, a message indicating that a circuit breaker might trip (a shutoff function will be executed by a circuit breaker) if the newly received cooperative function W is set for the PC (X), the multifunction apparatus Y, and the robot Z and is executed, is displayed. Furthermore, a message for prompting a user to confirm setting for the function is displayed.

When the user A issues an instruction to change setting for the function (for example, the user A presses a "Yes" button to issue an instruction for shift to a setting change screen) on the warning screen 108, the controller 38 of the terminal apparatus 12 causes the function setting screen 106 to be displayed on the UI unit 34. On the function setting screen 106, the user A is able to change the function. In the case where the function is changed, the changed function is registered in the function management table, and the original function (for example, the cooperative function W) is deleted from the function management table. Accordingly, execution of the changed function becomes enabled, whereas execution of the original function before the change becomes disabled.

Furthermore, in the case where an execution period is set for a function, a period during which the total sum of electric power in the case where a new function to be set is executed is less than or equal to a threshold may be recommended as an execution period. In this case, as in the calculation method described above, the electric power management unit 104 calculates the total sum of electric power required for the new function to be set and electric power required for the set function, and searches for a period during which the total sum is less than or equal to the threshold. The controller 26C notifies the user of the period as a recommended execution period. Specifically, the controller 26C transmits information indicating the period (recommended execution period) to the terminal apparatus 12. Information indicating the period is displayed on the terminal apparatus 12.

Figure 37:
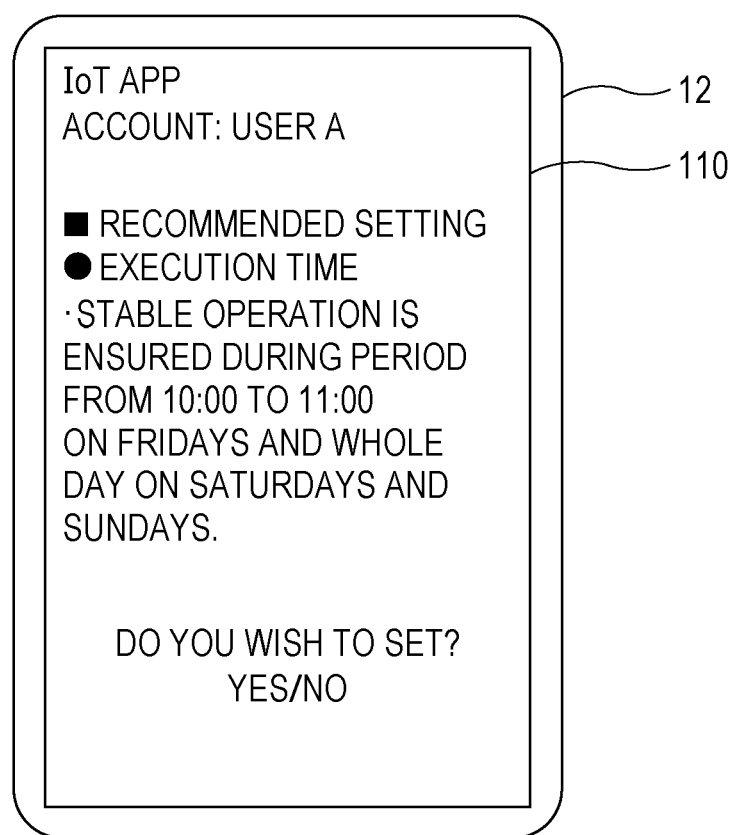
FIG. 37 is a diagram illustrating a recommendation notification screen.

FIG. 37 illustrates a display example of a recommended execution period. The controller 38 of the terminal apparatus 12 causes a recommendation notification screen 110 to be displayed on the UI unit 34 on the basis of information indicating a recommended execution period. On the recommendation notification screen 110, information indicating an execution period during which electric power is less than or equal to a threshold. In the example illustrated in FIG. 37, a period from 10:00 to 11:00 on Friday and the whole day on Saturday and Sunday is displayed as a recommended execution period. When the user A issues an instruction to set a recommended execution period (for example, when the user A presses a "Yes" button) on the recommendation notification screen 110, information indicating the instruction is transmitted from the terminal apparatus 12 to the relay apparatus 10C. In response to the instruction, the function management unit 30 of the relay apparatus 10C sets the recommended execution period for the cooperative function W.

By notifying a user of a recommended execution period as described above, the user may be prompted to set a period during which a function operates normally.

(Fourth Modification)

A fourth modification will be explained below. The fourth modification is a modification according to the fourth exemplary embodiment. In the fourth modification, an apparatus 14 includes a battery to supply electric power to the apparatus 14. All the apparatuses 14 connected to the relay apparatus 10C may include a battery or part of the apparatuses 14 may include a battery.

In the case where an apparatus 14 includes a battery, the electric power management unit 104 calculates the total sum of electric power based on electric power charged in the battery as electric power to be used for the apparatus 14. A charger is used for charging a battery. For example, the charger charges a battery by supplying electric power to be supplied to a management area to the battery. Charging may be performed automatically. For example, when a timing for charging arrives, an apparatus 14 of a self-propelled type travels to a charger and is connected to the charger. Accordingly, electric power is supplied to the battery from the charger, and the battery is thus charged. Obviously, charging may be performed by a user. For example, when a timing for charging arrives, a lamp (a lamp provided at the apparatus 14) to prompt a user for charging may be turned on, a warning sound may be produced, or information for prompting the user for charging may be displayed on a terminal apparatus 12 that is linked with the user. Furthermore, the battery may be charged by wireless power supply (non-contact power supply).

The fourth modification will be explained in detail below. The electric power management unit 104 communicates with the apparatus 14 to obtain from the apparatus 14 information indicating the remaining amount of a battery included in the apparatus 14 and information indicating an operation state of the apparatus 14, and presumes, based on the remaining amount of the battery and the operation state, a timing at which charging is to be performed, the length of a period during which charging is to be performed (the length of a charging period), and electric power to be charged in the battery during the charging period. For example, in the case where contents in which charging starts when the remaining amount of a battery reaches a value less than or equal to the remaining amount threshold are set, the electric power management unit 104 estimates the timing at which charging is to be performed, the length of the charging period, and electric power to be charged in the battery during the charging period, based on the current remaining amount, the operation state of the apparatus 14, and the remaining amount threshold.

The apparatus 14 that includes a battery normally operates by electric power supplied from the battery. Therefore, electric power consumed by the apparatus 14 does not affect operation of other apparatuses 14, and does not affect a shutoff operation of a circuit breaker. In contrast, electric power supplied to a battery during charging affects operation of other apparatuses 14 and a shutoff operation of a circuit breaker. Thus, in the fourth modification, the electric power management unit 104 calculates the total sum of electric power, based on electric power charged in the battery included in the apparatus 14 as electric power to be used for the apparatus 14. Furthermore, the electric power management unit 104 calculates the total sum of electric power, based on the charging period as an execution period of a function to be executed by the apparatus 14. In the case where the total sum exceeds the threshold and it is presumed that at least one function is not able to operate normally, warning processing is performed.

According to the fourth modification, even in the case where an apparatus 14 that operates by a battery is used, may be determined whether or not a function operates normally, taking into consideration electric power required for charging the battery.

(Fifth Modification)

A fifth modification will be explained below. The fifth modification is a modification according to the fourth exemplary embodiment. In the fifth modification, in the case where the total sum of electric power exceeds a threshold and it is presumed that at least one function does not operate normally, the controller 26C may control execution of the function by reducing electric power to be consumed by at least one function. Hereinafter, this control will be referred to as "electric power reduction mode".

More particularly, the controller 260 reduces electric power to be consumed by at least one function such that the total sum of electric power is less than or equal to a threshold. The function for which electric power is reduced may be a new function that is to be set, a function that is already set, a function that is presumed not to operate normally, both an already set function and a new function to be set, or a function that is presumed to consume more electric power.

The controller 260 may reduce electric power for plural functions. In this case, the controller 260 may evenly allocate electric power to be reduced to the plural functions such that electric power to be consumed by the plural functions is evenly reduced. As another example, the controller 260 may apply weighting processing to electric power to be reduced. For example, the controller 260 may reduce more electric power for an apparatus that is presumed to consume more electric power among the plural functions. Furthermore, the controller 260 may apply weighting processing according to priority. For example, the controller 260 may reduce more electric power for an apparatus with a lower priority level.

For example, it is assumed that in the case where the cooperative functions A and B are already set, when the cooperative function C is newly set, the total sum of electric power exceeds the threshold and it is presumed that at least one of the cooperative functions A, B, and C does not operate normally. In this case, the controller 26C reduces electric power to be consumed by at least one of the cooperative functions A, B, and C such that the total sum of the electric power is less than or equal to the threshold.

The electric power reduction mode is executed, for example, when a user issues an instruction to execute the electric power reduction mode. For example, in the case where a warning is displayed as illustrated in FIG. 36 and a user issues an instruction to execute the electric power reduction mode on the warning screen 108, the controller 26C executes the electric power reduction mode. As another example, execution of the electric power reduction mode may be set in advance. In this case, the controller 26C executes the electric power reduction mode even when a user does not issue an instruction to execute the electric power reduction mode. Even in this case, information indicating that the electric power reduction mode is to be executed or information indicating that the electric power reduction mode is being executed may be displayed on the UI unit 34 of the terminal apparatus 12.

According to the fifth modification, even in a case where it is presumed that at least one function does not operate normally, each function is able to be executed while electric power being reduced.

(Sixth Modification)

A sixth modification will be explained below. The sixth modification is a modification according to the fourth exemplary embodiment. In the sixth modification, in the case where an apparatus 14 is connected to the relay apparatus 10C, the function management unit 30 searches for a function (g single function or a cooperative function) that is able to be executed using the apparatus 14. For example, information indicating a function that is able to be executed using an apparatus 14 is stored in a memory of the relay apparatus 10C or an external apparatus, and the function management unit 30 refers to the information to search for a function that is able to be executed using the apparatus 14 connected to the relay apparatus 10C. The electric power management unit 104 calculates electric power required to execute the found function using the apparatus 14, and calculates the total sum of electric power including the calculated electric power. In the case where the total sum does not exceed the threshold, the controller 26C notifies a user of recommendation of the found function. For example, information indicating the function is displayed on the UI unit 34 of the terminal apparatus 12. Accordingly, in the case where a new apparatus 14 is connected to the relay apparatus 10C, a function that is able to be executed using the apparatus 14 is notified to the user.

Figure 38:
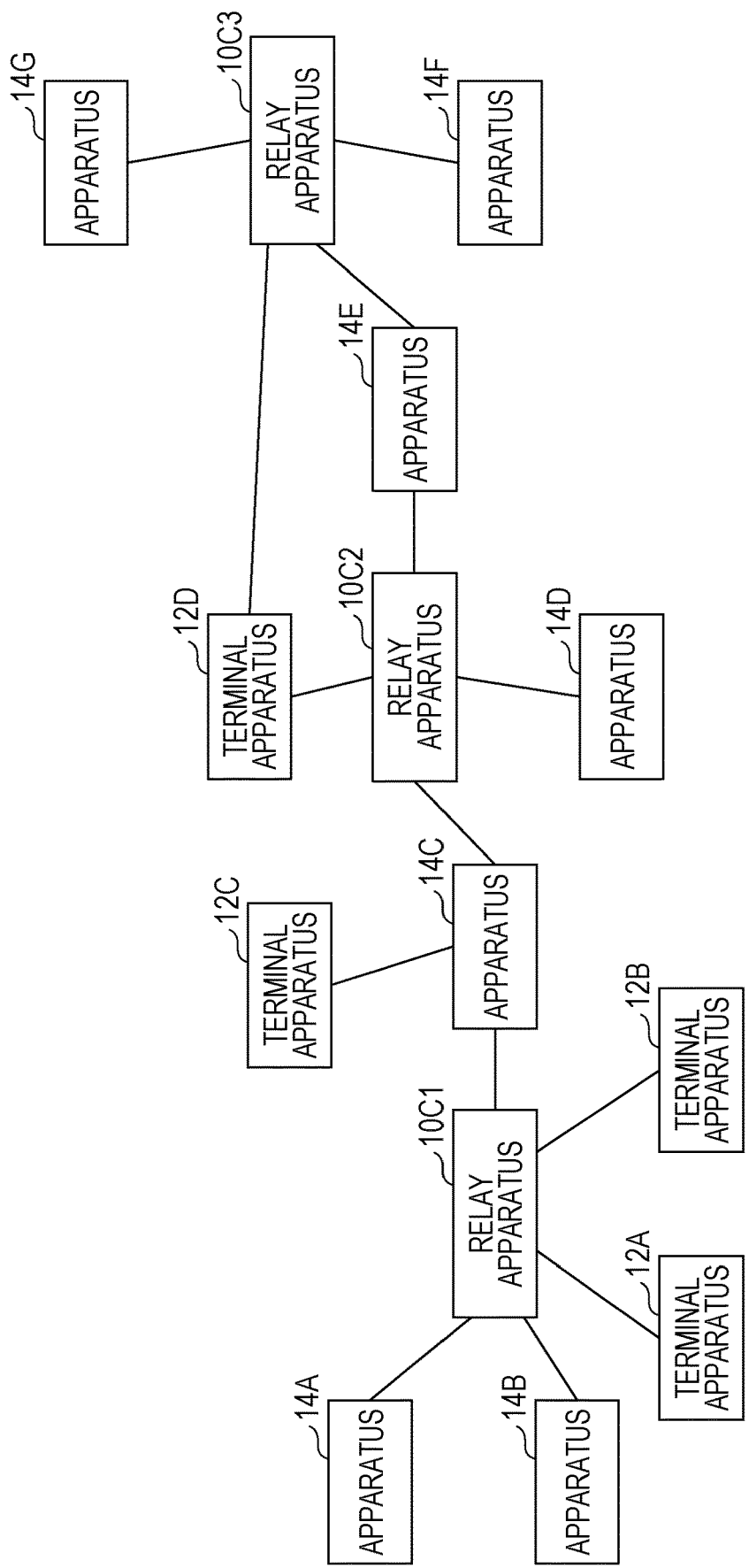
FIG. 38 is a block diagram illustrating a configuration of a system.

The information processing system according to the fourth exemplary embodiment may include plural relay apparatuses 10C. FIG. 38 illustrates an example of such a system. The system includes, for example, relay apparatuses 10C1, 10C2, and 10C as relay apparatuses 10C. Apparatuses 14A, 14B, and 14C as apparatuses 14 and terminal apparatuses 12A and 12B as terminal apparatuses 12 are connected to the relay apparatus 10C1. Furthermore, a terminal apparatus 12C as a terminal apparatus 12 and the relay apparatus 10C2 are connected to the apparatus 14C. Apparatuses 140, 14D, and 14E as apparatuses 14 and a terminal apparatus 12D as a terminal apparatus 12 are connected to the relay apparatus 10C2. Furthermore, a terminal apparatus 12D and the apparatus 14E are connected to the relay apparatus 10C3. The terminal apparatus 12D and apparatuses 14E, 14F, and 14C as apparatuses 14 are connected to the relay apparatus 10C3. Each relay apparatus 10C may manage electric power of an apparatus 14 connected to the relay apparatus, manage electric power of all the apparatuses 14 included in the system, or manage electric power of a different relay apparatus 10C. The fourth exemplary embodiment may be applied to the above system. Obviously, the first to third exemplary embodiments may be applied to the system illustrated in FIG. 38.

Although electric power supplied to an apparatus 14 is sufficient, when an excess amount of current is supplied to the apparatus 14, voltage applied to the apparatus 14 drops, and voltage required for the apparatus 14 to execute a function normally may not be applied to the apparatus 14, as a result. In this case, a defect may occur in the apparatus 14, and a function set for the apparatus 14 may not be executed normally. In order to cope with this, the electric power management unit 104 may detect current supplied to the apparatus 14 to presume whether or not there will be a voltage drop, so that it may be determined whether or not a function set for the apparatus 14 is able to operate normally. In the case where the function is not able to operate normally, warning processing is performed.

Other Exemplary Embodiments

At least two of the first to fourth exemplary embodiments may be combined together.

For example, the second exemplary embodiment and the fourth exemplary embodiment may be combined together. In this case, the recommending unit 80 recommends an apparatus 14 for which the total sum of electric power does not exceed the threshold as a spare apparatus. More particularly, the electric power management unit 104 calculates, for each apparatus 14, electric power required for the apparatus 14 to execute a new function to be set and electric power required for a set function, and selects an apparatus 14 for which the total sum does not exceed the threshold as a spare apparatus. The recommending unit 80 recommends the spare apparatus to a user. Information indicating the spare apparatus is displayed on the UI unit 34 of the terminal apparatus 12. Accordingly, a spare apparatus may be recommended to the user while occurrence of a defect caused by electric power being prevented. Furthermore, in the case where the total sum of electric power exceeds when a spare apparatus specified by a user is used, the recommending unit 80 may notify the user of recommendation for change of the spare apparatus.

Furthermore, the second exemplary embodiment and the third exemplary embodiment may be combined together. The function management unit 30 manages an execution period of each function, and the recommending unit 80 may recommend, as a spare apparatus, an apparatus 14 for which a function whose execution period does not overlap with an execution period of a new function to be set is set. Accordingly, even in the case where a different function is set for a spare apparatus, a newly set function is able to be executed using the spare apparatus while execution periods being prevented from overlapping.

Furthermore, the third exemplary embodiment and the fourth exemplary embodiment may be combined together. The recommending unit 98 may notify a user of recommendation for change of an execution period, based on electric power required for a set function. For example, the electric power management unit 104 estimates the total sum of electric power to be consumed during an execution period specified by a user, in the case where the total sum exceeds the threshold, the recommending unit 98 notifies the user of recommendation for change of the execution period. For example, the recommending unit 98 may recommend an execution period during which the total sum of electric power is less than or equal to the threshold to the user. Accordingly, a defect caused by electric power may be prevented from occurring.

The relay apparatuses 10, 10A, 10B, and 10C, the terminal apparatuses 12, and the apparatuses 14 described above are implemented by cooperation between hardware and software, for example. Specifically, each of the relay apparatuses 10, 10A, 10B, and 10C, the terminal apparatuses 12, and the apparatuses 14 includes one or more processors such as a central processing unit (CPU), which is not illustrated in figures. When the one or more processors read and execute a program stored in a memory device, which is not illustrated in figures, a function of each unit of each of the relay apparatuses 10, 10A, 10B, and 10C, the terminal apparatuses 12, and the apparatuses 14 is implemented. The above-mentioned program is stored in the memory device via a recording medium such as a compact disc (CD) or a digital versatile disc (DVD) or via a communication path such as a network. As another example, each unit of each of the relay apparatuses 10, 10A, 10B, and 10C, the terminal apparatuses 12, and the apparatuses 14 may be implemented by hardware resources such as a processor, an electronic circuit, or an application specific integrated circuit (ASIC). In implementation using hardware resources, a device such as a memory may be used. As still another example, each unit of each of the relay apparatuses 10, 10A, 10B, and 10C, the terminal apparatus 12, and the apparatuses 14 may be implemented by a digital signal processor (DSP), a field programmable gate array (FPGA), or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor programmed to
receive information regarding a first function;
receive information regarding a second function after receipt of the information regarding the first function;
determine whether an amount of electric power to simultaneously execute both the first function and the second function exceeds a threshold; and
in response to determining that the amount of electric power exceeds the threshold, transmit a notification including a warning indicating that if the second function is executed (i) the amount of electric power will exceed the threshold and (ii) at least one of the first function and the second function will not operate normally, wherein
the amount of electric power is a total sum of electric power required for the first function and the second function, and
in a case where the first function and the second function are able to be executed using a same apparatus, the total sum of electric power represents an amount of electric power required for execution of the first function and the second function using the same apparatus.

2. The information processing apparatus according to claim 1,
wherein a case where the at least one function does not operate normally represents a case where the at least one function is not executed in accordance with contents set when the at least one function is received by the processor.

3. The information processing apparatus according to claim 1,
wherein the amount of electric power is a total sum of electric power required for a first part of an execution period of the first function and a second part of an execution period of the second function, the first part and the second part overlapping.

4. The information processing apparatus according to claim 1,
wherein in a case where an apparatus includes a battery to supply electric power to the apparatus, an amount of electric power to be charged into the battery is included in the total sum.

5. The information processing apparatus according to claim 1,
wherein in a case that a value including an expectation of the amount of electric power exceeds the threshold and the at least one function does not operate normally, the processor transmits the notification indicating the warning.

6. The information processing apparatus according to claim 1, wherein the processor is further programmed to reduce an amount of electric power required for at least one of the first function and the second function to control execution of the function in response to determining that the amount of electric power exceeds the threshold.

7. The information processing apparatus according to claim 1, wherein
the processor is further programmed to change an execution period of at least one of the first function and the second function to control execution of functions in response to determining that the amount of electric power exceeds the threshold.

8. The information processing apparatus according to claim 7,
wherein the processor determines at least one of the first function and the second function for which the execution period is to be changed, in accordance with priority of each function.

9. The information processing apparatus according to claim 1, wherein the processor is further programmed to control whether or not the first function and the second function are to be executed in accordance with a priority of each function in response to determining that the amount of electric power exceeds the threshold.

10. The information processing apparatus according to claim 8,
wherein a higher priority level is set for one of the first function and the second function for which change of an execution period is not permitted.

11. The information processing apparatus according to claim 1,
wherein the processor further transmits a notification indicating recommendation of an execution period during which the amount of electric power is less than or equal to the threshold in a case where the second function is executed.

12. The information processing apparatus according to claim 1,
wherein the second function is a cooperative function that is able to be executed using a plurality of apparatuses.

13. A non-transitory computer readable medium storing a program causing a computer to execute a process for information processing, the process comprising:
receiving information regarding a first function;
receiving information regarding a second function after receipt of the information regarding the first function;
determining whether an amount of electric power to simultaneously execute both the first function and the second function exceeds a threshold; and
in response to determining that the amount of electric power exceeds the threshold, transmitting a notification including a warning indicating that if the second function is executed (i) the amount of electric power will exceed the threshold and (ii) at least one of the first function and the second function will not operate normally, wherein
the amount of electric power is a total sum of electric power required for the first function and the second function, and
in a case where the first function and the second function are able to be executed using a same apparatus, the total sum of electric power represents an amount of electric power required for execution of the first function and the second function using the same apparatus.

14. An information processing apparatus comprising:
receiving means for
receiving information regarding a first function; and receiving information regarding a second function after receipt of the information regarding the first function;

determining means for determining whether an amount of electric power to simultaneously execute both the first function and the second function exceeds a threshold; and notifying means for transmitting, in response to determining that the amount of electric power exceeds the threshold, a notification including a warning indicating that if the second function is executed (i) the amount of electric power will exceed the threshold and (ii) at least one of the first function and the second function will not operate normally, wherein the amount of electric power is a total sum of electric power required for the first function and the second function, and in a case where the first function and the second function are able to be executed using a same apparatus, the total sum of electric power represents an amount of electric power required for execution of the first function and the second function using the same apparatus.

* * * * *